United States Patent
Hong et al.

(10) Patent No.: US 9,729,904 B2
(45) Date of Patent: Aug. 8, 2017

(54) APPARATUS FOR TRANSMITTING BROADCASTING SIGNAL, APPARATUS FOR RECEIVING BROADCASTING SIGNAL, AND METHOD FOR TRANSMITTING/RECEIVING BROADCASTING SIGNAL THROUGH APPARATUS FOR TRANSMITTING/RECEIVING BROADCASTING SIGNAL

(71) Applicant: LG ELECTRONICS INC., Seoul (KR)

(72) Inventors: Hotaek Hong, Seoul (KR); Sangchul Moon, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 14/202,962

(22) Filed: Mar. 10, 2014

(65) Prior Publication Data

US 2014/0195879 A1    Jul. 10, 2014

Related U.S. Application Data

(63) Continuation of application No. 13/823,675, filed as application No. PCT/KR2011/006706 on Sep. 9, 2011.

(Continued)

(51) Int. Cl.
G06F 3/00 (2006.01)
G06F 13/00 (2006.01)
(Continued)

(52) U.S. Cl.
CPC ....... *H04N 21/2362* (2013.01); *H04B 7/0413* (2013.01); *H04H 20/42* (2013.01);
(Continued)

(58) Field of Classification Search
None
See application file for complete search history.

(56) References Cited

U.S. PATENT DOCUMENTS 9,438,373 B2    9/2016  Hong et al.
2003/0103571 A1*  6/2003  Meehan .......... H04N 21/23432
                                            375/240.27

(Continued)

FOREIGN PATENT DOCUMENTS

EP    2541927 A2    1/2013
EP    2555510 A2    2/2013
(Continued)

OTHER PUBLICATIONS

Kahn, Joseph, "Spectral Efficiency Limits and Modulation/Detection Techniques for DWDM Systems", Apr. 2004, IEEE Journal of Selected Topics in Quantum Electronics, vol. 10, No. 2.*

(Continued)

*Primary Examiner* — Nathan Flynn
*Assistant Examiner* — William J Kim
(74) *Attorney, Agent, or Firm* — Dentons US LLP

(57) ABSTRACT

A transmitter and method of processing broadcast data are discussed. In one embodiment, the method includes Forward Error Correction (FEC) encoding Physical Layer Pipe (PLP) data at a first code rate; FEC encoding first signaling data at a second code rate; FEC encoding second signaling data at a third code rate; time interleaving the FEC-encoded PLP data; frequency interleaving the time-interleaved PLP data by a pair of consecutive cells; and modulating the frequency-interleaved PLP data, the FEC-encoded first signaling data, and the FEC-encoded second signaling data by an Orthogonal Frequency Division Multiplexing (OFDM) method, wherein the first signaling data include FEC type information of the second signaling data and wherein the (Continued)

second signaling data include FEC type information and the first code rate used by the PLP data.

4 Claims, 40 Drawing Sheets

Related U.S. Application Data

(60) Provisional application No. 61/382,908, filed on Sep. 14, 2010.

(51) Int. Cl.
*H04N 5/445* (2011.01)
*H04N 21/2362* (2011.01)
*H04H 20/42* (2008.01)
*H04N 21/61* (2011.01)
*H04L 1/00* (2006.01)
*H04L 27/26* (2006.01)
*H04N 21/2343* (2011.01)
*H04N 21/2383* (2011.01)
*H04N 21/434* (2011.01)
*H04N 21/438* (2011.01)
*H04N 21/643* (2011.01)
*H04B 7/0413* (2017.01)
*H04W 28/06* (2009.01)

(52) U.S. Cl.
CPC .......... *H04L 1/0041* (2013.01); *H04L 1/0057* (2013.01); *H04L 1/0071* (2013.01); *H04L 1/0072* (2013.01); *H04L 27/2601* (2013.01); *H04L 27/2626* (2013.01); *H04N 21/2383* (2013.01); *H04N 21/234327* (2013.01); *H04N 21/4345* (2013.01); *H04N 21/4382* (2013.01); *H04N 21/6125* (2013.01); *H04N 21/64322* (2013.01); *H04W 28/06* (2013.01)

(56) References Cited

U.S. PATENT DOCUMENTS

| | | | | |
|---|---|---|---|---|
| 2005/0213538 | A1* | 9/2005 | Ebiko | H04N 21/23432 370/331 |
| 2007/0201516 | A1* | 8/2007 | Lee | H04L 1/0047 370/538 |
| 2009/0005095 | A1 | 1/2009 | Chun et al. | |
| 2009/0028079 | A1 | 1/2009 | Song et al. | |
| 2009/0103649 | A1 | 4/2009 | Vare et al. | |
| 2009/0187949 | A1 | 7/2009 | Vare et al. | |
| 2009/0190677 | A1* | 7/2009 | Jokela | H04L 1/0071 375/260 |
| 2009/0328099 | A1 | 12/2009 | Praden et al. | |
| 2010/0002696 | A1* | 1/2010 | Vare | H04L 12/1836 370/390 |
| 2010/0034219 | A1* | 2/2010 | Stadelmeier | H04N 21/4385 370/478 |
| 2010/0115552 | A1 | 5/2010 | Lee et al. | |
| 2010/0250764 | A1* | 9/2010 | Vare | H04N 21/23432 709/231 |
| 2010/0299708 | A1* | 11/2010 | Xu | H04N 21/64322 725/54 |
| 2011/0013732 | A1 | 1/2011 | Atungsiri | |
| 2011/0131464 | A1 | 6/2011 | Ko et al. | |
| 2011/0167464 | A1 | 7/2011 | Yun et al. | |
| 2012/0051320 | A1* | 3/2012 | Vare | H04W 36/0016 370/331 |
| 2013/0219431 | A1 | 8/2013 | Hong et al. | |

FOREIGN PATENT DOCUMENTS

| | | |
|---|---|---|
| KR | 10-2009-0075796 A | 7/2009 |
| KR | 10-2009-0131663 A | 12/2009 |
| KR | 10-2010-0034147 A | 4/2010 |
| KR | 10-2010-0050184 A | 5/2010 |
| WO | 2009075532 A2 | 6/2009 |

OTHER PUBLICATIONS

Vangelista L et al: "Key technologies for 1-15 next-generation terrestrial digital television standard DVB-T2", IEEE Communications Magazine, IEEE Service Center, Piscataway, US, vol. 47, No. 10, Oct. 1, 2009(Oct. 1, 2009), pp. 146-153, XP011283329, ISSN:0163-6804, DOI: 10.1109/MCom.2009.5273822 *the whole document*.

* cited by examiner

FIG. 4
(a)
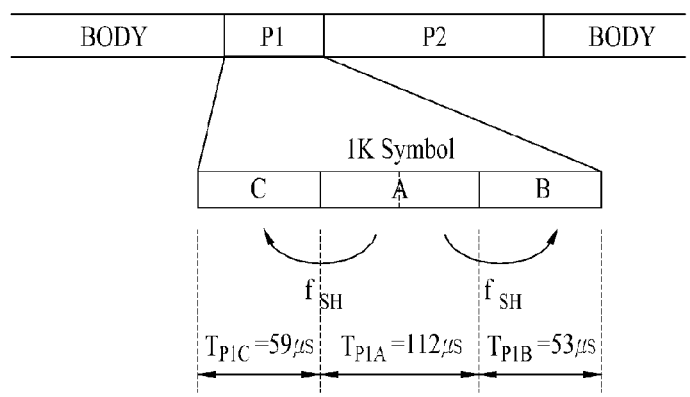
(b)
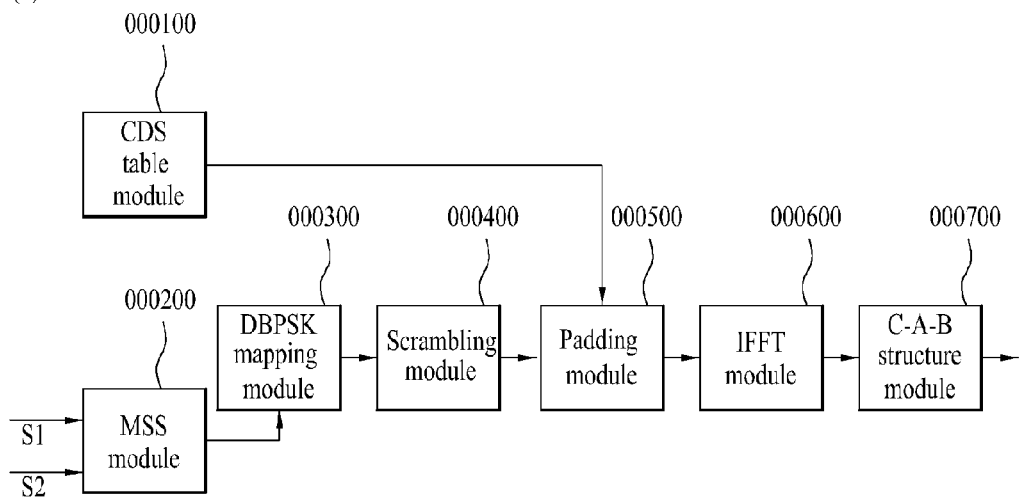

FIG. 18

| Filed    | Bits |
|----------|------|
| S1       | 3    |
| S2 filed 1 | 3  |
| S2 filed 2 | 1  |

FIG. 19

| Filed             | Bits |
|-------------------|------|
| PILOT_PATTERN     | 4    |
| L1_PRE_SPREAD_LENGTH | 3 |

FIG. 20

| Filed | Bits |
|---|---|
| TYPE | 8 |
| BWT_EXT | 1 |
| S1 | 3 |
| S2 | 4 |
| L1_REPETITION_FLAG | 1 |
| GUARD_INTERVAL | 3 |
| PAPR | 4 |
| L1_MOD | 4 |
| L1_COD | 2 |
| L1_FEC | 2 |
| L1_POST_SIZE | 18 |
| L1_POST_INFO_SIZE | 18 |
| PILOT_PATTERN | 4 |
| TX_ID_AVAILABILITY | 8 |
| CELL_ID | 16 |
| NETWORK_ID | 16 |
| NGH_SYSTEM_ID | 16 |
| NUM_NGH_FRAMES | 8 |
| NUM_T2_FRAMES | 8 |
| L1_POST_SPREAD_LENGTH | 12 |
| NUM_DATA_SYMBOLS | 12 |
| NUM_MISO_SYMBOLS | 12 |
| MIMO_SYMBOL_INTERVAL | 12 |
| MIMO_SYMBOL_LENGTH | 12 |
| REGEN FLAG | 3 |
| L1_POST_EXTENSION | 1 |
| NUM_RF | 3 |
| CURRENT_RF_IDX | 3 |
| RESERVED | 10 |
| CRC_32 | 32 |

FIG. 21

| Filed | Bits |
|---|---|
| SUB_SLICES_PER_FRAME | 15 |
| NUM_PLP | 8 |
| NUM_AUX | 4 |
| AUX_CONFIG_RFU | 8 |
|  |  |
| for i = 0..NUM_RF-1 { |  |
| RF_IDX | 3 |
| FREQEUNCY | 32 |
| } |  |
|  |  |
| if S2 == 'xxx1' { |  |
| FEF_TYPE | 4 |
| FEF_LENGTH | 22 |
| FEF_INTERVAL | 8 |
| NEXT_NGH_SUPERFRAME | 8 |
| } |  |
|  |  |
| RESERVED_2 | 32 |
|  |  |
| for i = 0..NUM_AUX-1 { |  |
| AUX_RFU | 32 |
| } |  |

| Filed | Bits |
|---|---|
| for i = 0..NUM_PLP-1 { |  |
| PLP_ID | 8 |
| PLP_TYPE | 3 |
| PLP_PAYLOAD_TYPE | 5 |
| PLP_PROFILE | 2 |
| FF_FLAG | 1 |
| FIRST_RF_IDX | 3 |
| FIRST_FRAME_IDX | 8 |
| PLP_GROUP_ID | 8 |
| PLP_COD | 3 |
| PLP_MOD | 3 |
| PLP_MIMO_TYPE | 2 |
| PLP_ROTATION | 1 |
| PLP_FEC_TYPE | 2 |
| PLP_NUM_BLOCKS_MAX | 10 |
| FRAME_INTERVAL | 8 |
| TIME_IL_LENGTH | 8 |
| TIME_IL_TYPE | 1 |
| IN_BAND_FLAG | 1 |
| RESERVED_1 | 16 |
| } |  |

FIG. 22

| Filed | Bits |
|---|---|
| FRAME_IDX | 8 |
| SUB_SLICE_INTERVAL | 22 |
| TYPE_2_START | 22 |
| L1_CHANGE_COUNTER | 8 |
| START_RF_IDX | 3 |
| RESERVED_1 | 8 |
| | |
| if S2 == 'xxx1' { | |
|    NEXT_NGH_FRAME | 8 |
| } | |
| | |
| for i = 0..NUM_PLP-1 { | |
|    PLP_ID | 8 |
|    PLP_START | 22 |
|    PLP_NUM_BLOCKS | 10 |
|    RESERVED_2 | 8 |
| } | |
| | |
| RESERVED_3 | 8 |
| | |
| for i = 0..NUM_AUX-1 { | |
|    AUX_RFU | 48 |
| } | |

FIG. 24

| Name | No.of bits | Identifier |
|---|---|---|
| IP/MAC_location_descriptor() { | | |
|   descriptor_tag | 8 | uimsbf |
|   descriptor_length | 8 | uimsbf |
|   system_id | 16 | uimsbf |
|   PLP_GROUP_ID | 8 | uimsbf |
|   PLP_ID | 8 | uimsbf |
| } | | |

FIG. 29

| | |
|---|---|
| IP_FORMAT | (1 bit) |
| NUM_PLP_IP_PAIR | (8 bits) |
| for i=0..NUM_PLP_IP_PAIR-1 { | |
| NUM_IP_PORT_ADDR | (8 bits) |
|     for i=0.. IP_PORT_ADDR-1 { | |
|     IP_ADDRESS | (32 or 48 bits) |
|     PORT_NUMBER | (16 bits) |
| } | |
| PLP_ID | (8 bits) |
| } | |

FIG. 30

```
<IP_FORMAT>IP_v4</IP_FORMAT>
<PLP_IP_PAIR>

<IP_PORT>100.1.1.1:9000</IP_PORT>
<IP_PORT>100.1.1.1:9001</IP_PORT>
<IP_PORT>100.1.1.1:9002</IP_PORT>
<PLP_ID>5</PLP_ID>

<IP_PORT>100.1.1.2:9000</IP_PORT>
<PLP_ID>10</PLP_ID>

<IP_PORT>100.1.1.3:9000</IP_PORT>
<IP_PORT>100.1.1.4:9000</IP_PORT>
<PLP_ID>7</PLP_ID>

</PLP_IP_PAIR>
```

FIG. 33

| | |
|---|---|
| ...PLP information part... | |
| PLP_BOOT | (8 bits) |
| FLAG_ESG_PRE_INFO | (1 bit) |
| IF (FLAG_ESG_PRE_INFO) { | (8 bits) |
|   NUM_ESG | |
|   for (NUM_ESG) { | |
|     PROVIDER_ID | (16 bits) |
|     VERSION | (8 bits) |
|     IP_ADDRESS | (32 bits) |
|     PORT_NUMBER | (16 bits) |
|     SESSION_ID | (16 bits) |
|     PLP_ID | (8 bits) |
| }} | |

FIG. 34

| | |
|---|---|
| ...IP-PLP mapping information part... | |
| PLP_BOOT | (8 bits) |
| FLAG_ESG_PRE_INFO | (1 bit) |
| IF (FLAG_ESG_PRE_INFO) { | (8 bits) |
|   NUM_ESG | |
|   for (NUM_ESG) { | |
|     PROVIDER_ID | (16 bits) |
|     VERSION | (8 bits) |
|     IP_ADDRESS | (32 or 48 bits) |
|     PORT_NUMBER | (16 bits) |
|     SESSION_ID | (16 bits) |
|     PLP_ID | (8 bits) |
| }} | |

FIG. 35

| Name | No. of bits | Identifier |
|---|---|---|
| simple_bootstrap_descriptor() { | | |
|   descriptor_tag | 8 | uimsbf |
|   descriptor_length | 8 | uimsbf |
|   bootstrap_PLP | 8 | uimsbf |
|   ESG_info_flag | 1 | bslbf |
|   IPv6_flag | 1 | bslbf |
|   reserved | 6 | bslbf |
|   if (ESG_info_flag) { | | |
|     num_ESG | 8 | uimsbf |
|     for (num_ESG) { | | |
|       provider_id | 16 | uimsbf |
|       version | 8 | uimsbf |
|       ip_address | 32 or 48 | uimsbf |
|       port | 16 | uimsbf |
|       session_id | 16 | uimsbf |
|       PLP_id | 8 | uimsbf |
|     } | | |
|   } | | |
| } | | |

FIG. 36

```
<BOOT_PLP_INFO>

<BOOTSTRAP_INFO>
<PLP_BOOT> 0x01 </PLP_BOOT>
<IP_ADDRESS> 127.1.1.1 <IP_ADDRESS>
<PORT_NUMBER> 5000 <PORT_NUMBER>
<SESSION_ID> 0x00 <SESSION_ID>
<PLP_ID> 0x01 <PLP_ID>
</BOOTSTRAP_INFO>

<ESG_PRE_INFO>
<PROVIDER_ID> 0x03 </PROVIDER_ID>
<PROVIDER_NAME> LG U+ myLGTV ESG </PROVIDER_NAME>
<VERSION> 1.0.0 <VERSION>
<IP_ADDRESS> 127.1.1.100 <IP_ADDRESS>
<PORT_NUMBER> 5000 <PORT_NUMBER>
<SESSION_ID> 0x02 <SESSION_ID>
<PLP_ID> 0x01 <PLP_ID>
</ESG_PRE_INFO>

</BOOT_PLP_INFO>
```

| ...PLP mapping loop... | |
| --- | --- |
| SISO/MIMO | (2 bits) |
| BANDWIDTH | (4 bits) |
| GUARD_INTERVAL | (3 bits) |
| FFT_SIZE | (3 bits) |

| | |
|---|---|
| ...PLP mapping loop... | |
| ...system information... | (16 bits) |
| NUM_CELL | (32 bits) |
| for (NUM_CELL) { | (8 bits) |
|   CELL_ID | |
|   CENTRE_FREQUENCY | |
|   NUM_SUBCELL | (8 bits) |
|   for (NUM_SUBCELL) { | (32 bits) |
|     CELL_ID_EXTENSION | |
|     TRANSPOSER_FREQUENCY | |
| }} | |

FIG. 45

| | |
|---|---|
| PLP_BOOT | (8 bits) |
| FLAG_ESG_PRE_INFO | (1 bit) |
| IF (FLAG_ESG_PRE_INFO) { | (8 bits) |
|   NUM_ESG | |
|   for (NUM_ESG) { | |
|     PROVIDER_ID | (16 bits) |
|     VERSION | (8 bits) |
|     IP_ADDRESS | (32 or 48 bits) |
|     PORT_NUMBER | (16 bits) |
|     SESSION_ID | (16 bits) |
|     PLP_ID | (8 bits) |
| }} | |
| L2_IP_ADDRESS | (32 or 48 bits) |
| L2_PORT_NUMBER | (16 bits) |
| L2_SESSION_ID | (16 bits) |
| L2_PLP | (8 bits) |

APPARATUS FOR TRANSMITTING BROADCASTING SIGNAL, APPARATUS FOR RECEIVING BROADCASTING SIGNAL, AND METHOD FOR TRANSMITTING/RECEIVING BROADCASTING SIGNAL THROUGH APPARATUS FOR TRANSMITTING/RECEIVING BROADCASTING SIGNAL

CROSS-REFERENCE TO RELATED APPLICATIONS

This application is a Continuation of co-pending U.S. patent application Ser. No. 13/823,675 filed Mary 7, 2013, which is the National Phase of PCT/KR2011/006706 filed on Sep. 9, 2011, which claims priority under 35 U.S.C. 119(e) to U.S. Provisional Application No. 61/382,908 filed on Sep. 14, 2010, all of which are hereby expressly incorporated by reference into the present application.

FIELD OF THE INVENTION

The present invention relates to a broadcast signal transmitting apparatus for transmitting a broadcast signal, a broadcast receiving apparatus for receiving a broadcast signal, and a method of transmitting and receiving a broadcast signal and, most particularly, to an apparatus and method for transmitting and receiving a mobile broadcast signal.

BACKGROUND ART

As the time has neared to end (or terminate) the transmission of analog broadcast signals, diverse technologies for transmitting and receiving digital broadcast signals are being researched and developed. Herein, a digital broadcast signal may include high capacity video/audio data as compared to an analog broadcast signal, and, in addition to the video/audio data, the digital broadcast signal may also include diverse additional data.

More specifically, a digital broadcasting system for digital broadcasting may provide HD (High Definition) level images, multiple-channel sound (or audio), and a wide range of additional services. However, a data transmission efficiency for transmitting high capacity data, a robustness of transmitting and receiving network, and flexibility in a network considering mobile receiving equipments are still required to be enhanced.

DETAILED DESCRIPTION OF THE INVENTION

Technical Objects

Accordingly, an object of the present invention is to provide a broadcast signal transmitting apparatus and a broadcast receiving apparatus that can transmit and receive additional broadcast signals, a method for transmitting and receiving additional broadcast signals, by using an RF signal of a conventional broadcasting system without having to ensure any additional frequency.

Another object is to provide a broadcast signal transmitting apparatus and a broadcast receiving apparatus that can transmit and receive mobile broadcast signals, a method for transmitting and receiving mobile broadcast signals, by using an RF signal of a conventional broadcasting system without having to ensure any additional frequency.

Yet another object of the present invention is to provide a broadcast signal transmitting apparatus, a broadcast signal receiving apparatus, and a method for transmitting/receiving a broadcast signal using the same that can distinguish data corresponding to a service for each component, and transmit the corresponding data to each component through separate PLPs, so that the transmitted data can be received and processed.

Yet another object of the present invention is to provide a broadcast signal transmitting apparatus, a broadcast signal receiving apparatus, and a method for transmitting/receiving a broadcast signal using the same that can signal signaling information required for servicing a broadcast signal.

Yet another object of the present invention is to provide a broadcast signal transmitting apparatus, a broadcast signal receiving apparatus, and a method for transmitting/receiving a broadcast signal using the same that can signal signaling information, so that a broadcast signal can be received in accordance with a receiver characteristic.

Yet another object of the present invention is to provide a broadcast signal transmitting apparatus, a broadcast signal receiving apparatus, and a method for transmitting/receiving a broadcast signal that can reduce an overhead of a data packet by compressing a header of the data packet, when performing an IP-based transmission of a broadcast signal, and transmitting the compressed header, and by having a receiver release the compression (or perform decompression).

Yet another object of the present invention is to provide a broadcast signal transmitting apparatus, a broadcast signal receiving apparatus, and a method for transmitting and receiving a broadcast signal, which enable fast reception of bootstrap signaling information and Electronic Service Guide (ESG) signaling information, when an Internet Protocol (IP)-based broadcast signal is received.

Technical Solutions

In order to achieve the above-described technical objects of the present invention, a method for receiving a broadcast signal includes receiving a plurality of broadcast signals including a transmission frame for transmitting a broadcast service and Orthogonal Frequency Division Multiplexing (OFDM)-demodulating the plurality of broadcast signals, parsing the transmission frame included in the demodulated broadcast signals, the transmission frame including a preamble having signaling information and a plurality of Physical Layer Pipes (PLPs) having PLP data that includes a base layer and an enhancement layer of the broadcast service, the signaling information including signaling information about a bootstrap, and at least one of the plurality of PLPs carrying a bootstrap Internet Protocol (IP) packet, decoding the signaling information about the bootstrap included in the signaling information by decoding the signaling information included in the preamble of the parsed transmission frame, the signaling information about the bootstrap including an Identifier (ID) that identifies a PLP carrying the bootstrap IP packet, and receiving the bootstrap and an Electronic Service Guide (ESG) by selecting and decoding PLPs using the decoded signaling information.

Effects of the Invention

According to the present invention, a transmitter may perform transmission by generating a PLP for each component configuring a service, and a receiver may identify and decode the PLP, which is received for each component.

Thus, the present invention may respond to the mobile broadcast communication environment with more flexibility.

The transmitter of the present invention may distinguish one component as a component of a base layer and as a component of at least one enhancement layer, and may transmit the distinguished component. And, the receiver may decode only the component of the base layer so as to provide an image with basic picture quality, or the receiver may decode the component of the base layer along with the component of at least one enhancement layer so as to provide an image with higher picture quality. Thus, the present invention may provide images having diverse picture qualities in accordance with the receiver characteristic.

By compressing a header of the data packet, when performing an IP-based transmission of a broadcast signal, and transmitting the compressed header, and by having the receiver recover the compressed header, the present invention may reduce the overhead of an IP-based data packet. Thus, IP-based broadcasting may be efficiently supported in a mobile environment.

By using a MIMO system, the present invention may increase data transmission efficiency and may enhance robustness in broadcast signal transmission/reception.

In addition, since bootstrap signaling information and ESG signaling information are transmitted in specific PLPs, a receiver can provide a fast service by acquiring a bootstrap and an ESG rapidly according to the present invention.

Therefore, according to the present invention, the present invention may provide a method and apparatus for transmitting/receiving a broadcast signal that can receive a digital broadcast signal without any error even in a mobile receiving equipment or an indoor environment.

BRIEF DESCRIPTION OF THE DRAWINGS

FIG. 18 illustrates an exemplary syntax structure of P1 signaling information according to an embodiment of the present invention, FIG. 19 illustrates an exemplary syntax structure of AP1 signaling information according to an embodiment of the present invention, FIG. 20 illustrates an exemplary syntax structure of L1-pre signaling information according to an embodiment of the present invention, FIG. 21 illustrates an exemplary syntax structure of configurable L1-post signaling information according to an embodiment of the present invention, FIG. 22 illustrates an exemplary syntax structure of dynamic L1-post signaling information according to an embodiment of the present invention, FIG. 24 illustrates an exemplary syntax structure of an IP/MAC_location_descriptor according to the fourth embodiment of the present invention, FIG. 29 illustrates a syntax of a binary data format including IP-PLP mapping information according to an embodiment of the present invention, FIG. 30 illustrates a syntax of an XML format including IP-PLP mapping information according to an embodiment of the present invention, FIG. 33 illustrates a syntax structure of an L1 signaling information region according to an embodiment of the present invention, FIG. 34 illustrates a syntax of a binary data format including bootstrap and ESG signaling information according to an embodiment of the present invention, FIG. 35 illustrates a syntax of a PSI/SI data format including bootstrap and ESG signaling information according to an embodiment of the present invention, FIG. 36 illustrates a syntax of an XML data format including bootstrap and ESG signaling information according to an embodiment of the present invention, FIG. 45 illustrates a syntax of L2 signaling information according to an embodiment of the present invention.

DETAILED DESCRIPTION OF EMBODIMENTS

Reference will now be made in detail to the preferred embodiments of the present invention, examples of which are illustrated in the accompanying drawings. Wherever possible, the same reference numbers will be used throughout the drawings to refer to the same or like parts. And, the scope and spirit of the present invention will not be limited only to the exemplary embodiments presented herein.

Although the terms used in the present invention are selected from generally known and used terms, the detailed meanings of which are described in relevant parts of the description herein. It should be noted that the terms used herein may vary depending upon the intentions or general practice of anyone skilled in the art and also depending upon the advent of a novel technology. Some of the terms mentioned in the description of the present invention have been selected by the applicant at his or her discretion, terms used herein. Furthermore, it is required that the present invention is understood, not simply by the actual terms used but by the meaning of each term lying within.

The present invention relates to an apparatus and method for transmitting and receiving an additional broadcast signal, while sharing an RF frequency band with related art broadcast system, such as a conventional terrestrial broadcast system (or also referred to as a T2 system), e.g., DVB-T2. In the present invention, the additional broadcast signal may correspond to an extension (or enhanced) broadcast signal and/or a mobile broadcast signal.

In the description of the present invention, an additional broadcast signal refers to as signal that is processed and transmitted in accordance with a non-MIMO (Multi Input Multi Output) method or a MIMO method. Herein, a MISO (Multi Input Single Output) method, a SISO (Single Input Single Output) method, and so on, may correspond to the non-MIMO method.

Hereinafter, 2 antennae may be given as an example of the multi antennae of the MISO method or the MIMO for simplicity of the description of the present invention. And, such description of the present invention may be applied to all types of systems using 2 or more antennae.

Figure 1:
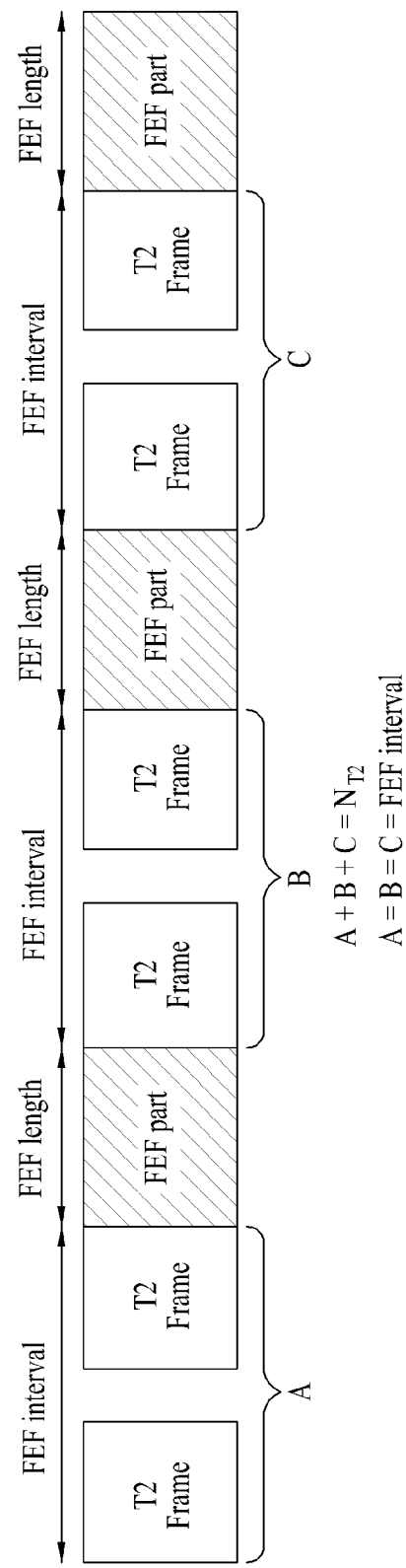
FIG. 1 illustrates a structure of a super frame according to an embodiment of the present invention.

FIG. 1 illustrates an exemplary super frame structure according to the present invention. The super frame of FIG. 1 transmits an additional broadcast signal (e.g., mobile broadcast signal). A super frame may be configured of a plurality of frames, and the frames belonging to one super frame may be transmitted by using the same transmission method. The super frame according to the embodiment of the present invention may be configured of multiple T2 frames (also referred to as a terrestrial broadcast frame) and additional non-T2 frames for the additional broadcast signal. Herein, a non-T2 frame may include an FEF (Future Extension Frame) part being provided by the related art T2 system. The FEF part may not be contiguous and may be inserted in-between the T2 frames. The additional broadcast signal may be included in the T2 frame or FEF part, so as to be transmitted.

When a mobile broadcast signal is transmitted through FET part, the FEF part will be referred to as an NGH (Next Generation Handheld) frame.

At this point, 1 NGH frame may be transmitted for each N number of T2 frames (i.e., NGH-T2 frame ratio=1/N or N:1), and the T2 frame and the NGH frame may be alternately transmitted (i.e., NGH-T2 frame ratio=1/2 or 1:1). If the NGH-T2 frame ratio is equal to 1/N, the time consumed by the receiver in order to receive an NGH frame after receiving a previous NGH frame is equivalent to the time corresponding to N number of T2 frames.

Meanwhile, among the components configuring a broadcast service, the present invention may divide a video component to multiple video components and may transmit the divided video components. For example, a video component may be divided into a basic video component and an extension video component, and may then be transmitted accordingly.

According to an embodiment of the present invention, in order to enhance transmission stability, the basic video component may be transmitted in a non-MIMO method, and the extension video component may be transmitted in an MIMO method in order to provide an enhanced throughput.

In the present invention, the basic video component will hereinafter be referred to as a video component of a base layer, and the extension video component will hereinafter be referred to as a video component of an enhancement layer. Additionally, for simplicity of the description, in the present invention, the video component of the base layer will be used in combination with video data of the base layer (or data of the base layer), and the video component of the enhancement layer will be used in combination with video data of the enhancement layer (or data of the enhancement layer).

According to an embodiment of the present invention, the present invention may encode video data by using an SVC (Scalable Video Coding) method, thereby dividing the encoded video data into video data of the base layer (or base layer video data) and video data of the enhancement layer (or enhancement layer video data). Herein, the SVC method is merely exemplary. And, therefore, other arbitrary video coding methods having scalability may also be used herein.

The data of the base layer (or the base layer data) correspond to data for images having basic picture quality. Herein, although the base layer data are robust against the communication environment, the base layer data have low picture quality. And, the data of the enhancement layer (or the enhancement layer data) correspond to additional data for images of higher picture quality and may, therefore, provide images having high picture quality. However, the enhancement layer data are weak against the communication environment.

In the present invention, video data for terrestrial broadcasting may be divided into base layer data and enhancement layer data, and video data for mobile broadcasting may be divided into base layer data and enhancement layer data in order to flexibly respond to the mobile broadcasting communication environment.

The receiver may decode only video layer of the base data (or base layer video data), so as to provide an image having basic picture quality, or the receiver may decode both the base layer video data and the video layer of the enhancement data (or enhancement layer video data), so as to provide an image having a higher picture quality.

According to an embodiment of the present invention the enhancement layer video data may be transmitted through an FEF, and the base layer data may be transmitted through the T2 frame and/or FEF.

In the present invention, an audio component may include an audio component of a base layer (or base layer audio component) for providing basic sound quality, such as 2 channel or 2.1 channel, and an audio component of an enhancement layer (or enhancement layer audio component) for providing additional sound quality, such as 5.1 channel or MPEG-Surround.

According to an embodiment of the present invention, a signal frame may refer to any one of a T2 frame, an FEF transmitting a mobile broadcast signal (i.e., NGH frame), a T2 frame transmitting base layer video data, and an FEF transmitting enhancement layer video data. In the description of the present invention, the signal frame and the transmission frame will be used to have the same meaning.

In the present invention, a PLP (physical layer pipe) corresponding to an identifiable data (or stream) unit. Also, the PLP may be considered as a physical layer TDM (Time Division Multiplex) channel, which transmits (or delivers) one or more services. More specifically, each service may be transmitted and received through multiple RF channels. Herein, the PLP may represent a path through which such service is being transmitted or may represent a stream being transmitted through such path. The PLP may also be located in slots being distributed to multiple RF channels at predetermined time intervals, and the PLP may also be distributed in a single RF channel at predetermined time intervals. Therefore, signal frame may transmit a PLP, which is distributed to a single RF channel based upon a time reference. In other words, one PLP may be distributed to a single RF channel or multiple RF channels based upon a time reference.

In the present invention, one service may be transmitted to one PLP, and components configuring a service may be divided (or differentiated), so that each of the differentiated components can be transmitted to a different PLP. If service components configuring a single service are differentiated from one another so as to be respectively transmitted to a different PLP, the receiver may gather (or collect) the multiple components, so as to combine the collected components to a single service. In the present invention, the service component and the component will be used to have the same meaning.

Figure 2:
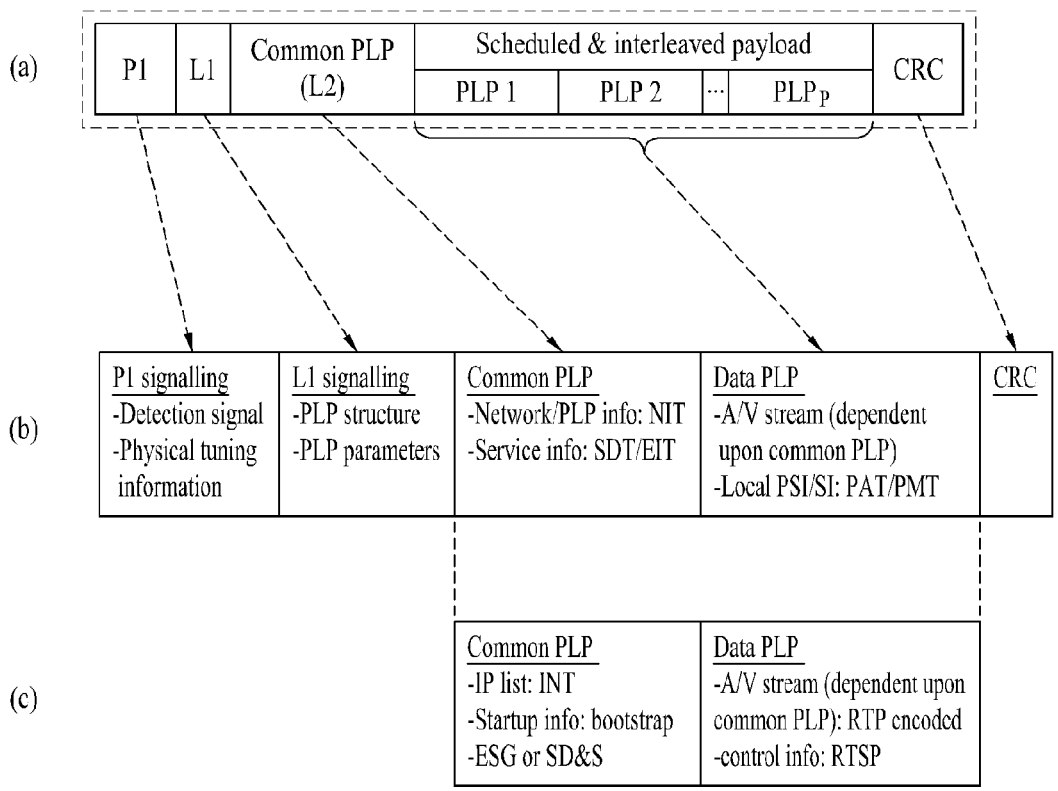
FIG. 2 illustrates a structure of a signal frame according to an embodiment of the present invention.

FIG. 2 illustrates a structure of a signal frame according to an embodiment of the present invention.

The signal frame of FIG. 2 represents a structure of a signal frame over a physical layer. The signal frame includes a P1 signaling information region (or part), an L1 signaling information region, and a PLP region. More specifically, the P1 signaling information region may be allocated to a foremost portion of the corresponding signal frame, and, then, the L1 signaling information region and the PLP region may be sequentially allocated after the P1 signaling information region. In the description of the present invention, only the information being included in the L1 signaling information region may be referred to as L1 signaling information, or signaling information being included in the P1 signaling information region and signaling information being included in the L1 signaling information region may be collectively referred to as the L1 signaling information.

As shown in FIG. 2, P1 signaling information that is being transmitted to the P1 signaling information region may be used for detecting a signal frame (or NGH broadcast signal) and may include tuning information and information for identifying preamble itself.

Based upon the P1 signaling information, the subsequent L1 signaling information region is decoded, so as to acquire information on the PLP structure and the signal frame configuration. More specifically, the L1 signaling information includes L1-pre-signaling information and L1-post-signaling information. Herein, the L1-pre-signaling information includes information required by the receiver to receive and decode L1-post-signaling information. And, the L1-post-signaling information includes parameters required by the receiver for accessing the PLP. The L1-post-signaling information may then include Configurable L1-post-signaling information, Dynamic L1-post-signaling information, Extension L1-post-signaling information, and CRC information, and the L1-post-signaling information may further include L1 padding data. In the present invention, configurable L1-post signaling information has the same meaning as the L1-post configurable signaling information. Moreover, dynamic L1-post signaling information has the same meaning as the L1-post dynamic signaling information Meanwhile, in the signal frame, the PLP region is configured of at least one common PLP and at least one data PLP.

A common PLP may include PSI/SI (Program and System Information/Signaling Information).

Specifically, when a broadcast signal corresponds to an IP format, the common PLP may include an IP information table, such as n INT (IP/MAC notification table). In addition, the common PLP may further include start information such as bootstrap and meta data for service guide such as ESG or SD&S. In the description of the present invention, information being included in the common PLP may be referred to as L2 signaling information. The L2 signaling information may be transmitted in the common PLP or PLP data, which depends on a designer's intention.

If the L2 signaling information is transmitted in the common PLP, a region carrying the L2 signaling information may be referred to as an L2 signaling information region. The L2 signaling information region may include the common PLP.

More specifically, L1 signaling information includes information required by the broadcast signal receiver for processing a PLP within a signal frame, and the L2 signaling information includes information that can be commonly applied to multiple PLPs. Accordingly, the broadcast signal receiver may use P1 signaling information included in a P1 signaling information region, so as to decode an L1 signaling information region, thereby acquiring information on the structure of PLP included in the signal frame and information a frame structure. Most particularly, the broadcast signal receiver may be capable of knowing through which PLP each of the service components being included in the corresponding service is being transmitted by referring to the L1 signaling information and/or the L2 signaling information. Additionally, the BICM module of the broadcast signal transmitter may encode signaling information associated with a broadcast service and may transmit L1/L2 signaling information, so that the broadcast signal receiver can perform decoding. Moreover, the MICM decoder of the broadcast signal receiver may decode the L1/L2 signaling information.

At this point, when the L1 signaling information includes information on the service components, the broadcast signal receiver may recognize the information on the service components at the same time the broadcast signal receiver receives the signal frame, and the broadcast signal receiver may then apply the corresponding information. However, since the size of the L1 signaling information is limited, the size (or amount) of the information on the service components that can be transmitted from the broadcast signal transmitter may also be limited. Accordingly, the L1 signaling information region is most adequate for recognizing the information on the service components at the same time the broadcast signal receiver receives the signal frame and for transmitting information that can be applied to the broadcast signal receiver.

If the L2 signaling information includes information on the service components, the broadcast signal receiver may acquire information on the service components after the decoding of the L2 signaling information is completed. Therefore, the broadcast signal receiver may not be capable of recognizing the information on the service components at the same time the broadcast signal receiver receives the signal frame and may not be capable of modifying the corresponding information. However, since the size of the region transmitting the L2 signaling information is larger than the L1 signaling information region, the L2 signaling information region may transmit a larger amount (or size) of service component data. Accordingly, the L2 signaling information is adequate for transmitting general information on service components.

According to an embodiment of the present invention the L1 signaling information may be used along with the L2 signaling information. More specifically, the L1 signaling information may include information that can be modified (or changed) at the same time the broadcast signal receiver receives the signal frame in a PLP level, such as a high mobile performance and a high-speed data communication characteristic, or may include information of service components that can be modified (or changed) at any time during the broadcast signal transmission. Additionally, the L2 signaling information may include information on the service components and general information on channel reception, which are included in a service.

Meanwhile, if the broadcast signal corresponds to a TS format, a data PLP, which is included in the signal frame, may include audio, video, and data TS streams. Furthermore, the TS-based data PLP may include PSI/SI information such as a PAT (Program Association Table) and a PMT (Program Map Table). If the broadcast signal corresponds to an IP format, the data PLP may include audio, video, and data IP streams. At this point, IP packets, which configure each of the IP streams, may be packetized by using an RTP (Real Time Protocol) or FLUTE (File Delivery over Unidirectional Transport). Additionally, IP-based data PLP may include control information, which is packetized by using an RTSP (Real Time Streaming Protocol) method. In the present invention, a data PLP including PAT/PMT or a data PLP including control information may also be referred to a base PLP. The data PLP may include a Type1 data PLP, which is transmitted by one sub-slice for each signal frame, and a Type2 data PLP, which is transmitted by multiple sub-slices. In the description of the present invention, for simplicity of the description, P number of data PLPs will hereinafter be indicated as PLP1~PLPp. More specifically, audio, video, and data TS streams and PSI/SI information (or control information), such as PAT/PMT, are transmitted through PLP1~PLPp. The data PLPs of FIG. 2 correspond to examples after scheduling and interleaving.

In the present invention the common PLP may be decoded along with a data PLP, and the data PLP may be selectively (or optionally) decoded. More specifically, a common PLP+ data PLP may always be decoded. However, in some cases data PLP1+data PLP2 may not be decoded. Information being included in the common PLP may include the PSI/SI information. Additionally, Auxiliary Data may be added to the signal frame. Moreover, CRC data may be added to the signal frame.

Figure 3:
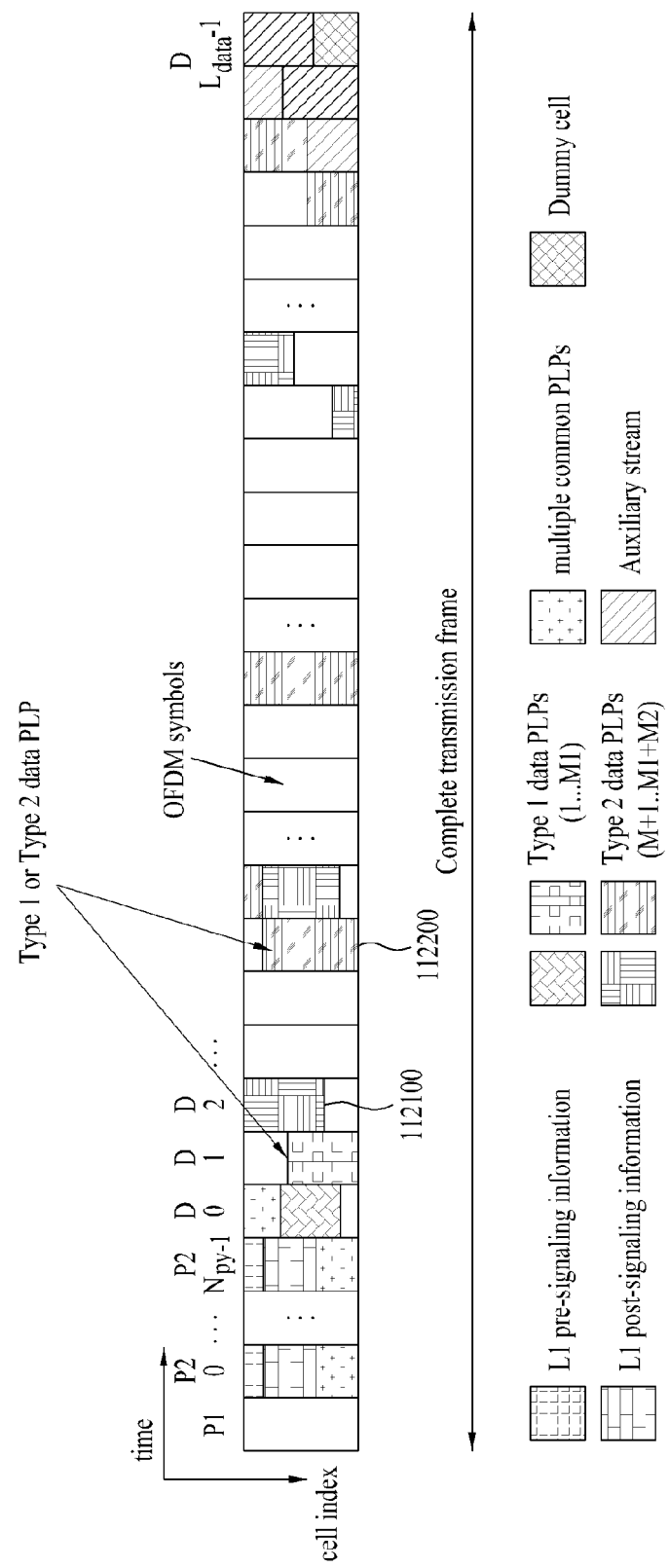
FIG. 3 illustrates a structure of a PLP-based signal frame according to an embodiment of the present invention, (*a*) of FIG. 4 illustrates a P1 symbol structure according to the present invention and (*b*) of FIG. 4 illustrates a block diagram showing an exemplary structure of a P1 symbol generator according to the present invention.

FIG. 3 illustrates a structure of a PLP-based signal frame according to an embodiment of the present invention.

The signal frame of FIG. 3 is a structure of a signal frame at a symbol level according to an embodiment of the present invention.

In light of the symbol level, the signal frame according to the present invention is divided into a preamble region and a data region. The preamble region is configured of a P1 symbol and at least one or more P2 symbols, and the data region is configured of a plurality of data symbols.

Herein, the P1 symbol transmits P1 signaling information. The at least one or more P2 symbols transmit L1-pre-signaling information, L1-post-signaling information, and signaling information being included in the common PLP (i.e., L2 signaling information). The signaling information being included in the common PLP may be transmitted through a data symbol. Therefore, in light of the signal frame over a physical layer, the preamble region includes a P1 signaling information region, an L1 signaling information region, and a portion or an entire portion of the common PLP region. In the description of the present invention a PLP transmitting PSI/SI and, more particularly, PAT/PMT will hereinafter be referred to a base PLP.

Data PLPs being transmitted through multiple data symbols may include a Type1 data PLP being transmitted, which is transmitted by one sub-slice for each signal frame, and a Type2 data PLP, which is transmitted by multiple sub-slices. According to an embodiment of the present invention, when both the Type 1 data PLP and the Type2 data PLP exist in a signal frame, the Type1 data PLP is first allocated, and the Type2 data PLP is allocated afterwards.

The Type1 data PLP refers to having one sub-slice within a signal frame, i.e., one PLP being continuously transmitted within a signal frame. For example, when it is assumed that 2 type1 data PLPs (PLP1, PLP2) are being transmitted, when all of the data of PLP1 are first allocated to the corresponding signal frame, then all of the data of PLP2 are allocated afterwards, and, thereafter, the data are transmitted.

The Type2 data PLP refers to a PLP having two or more sub-slices within the signal frame. More specifically, the data of each PLP are divided into as many sections as the number of sub-slices. And, then, the divided data are distributed and transmitted to each sub-slice. For example, when it is assumed that 2 Type2 data PLP (PLP3, PLP4) exist in a single signal frame, and when it is assumed that each Type2 data PLP has 2 sub-slices, the data of PLP3 and the data of PLP4 are each divided into 2 equal sections, and the divided data are sequentially allocated to the 2 sub-slices of the corresponding PLP. At this point, according to the embodiment of the present invention, the sub-slice for PLP3 and the sub-slice for PLP4 are alternately positioned so as to be transmitted accordingly. In order to gain higher time diversity, the present invention uses the Type2 data PLP.

In the description of the present invention, one data PLP may correspond to one service, and one data PLP may also correspond to any one of the service components configuring a service, such as a video component (or also referred to as a base layer video component), an extension video component (or also referred to as an enhancement layer video component), and audio component, and a data component other than the video and audio components.

Meanwhile, the present invention may transmit separate signaling information from the transmitter, so that the receiver can identify additional broadcast signal frame, such as an NGH frame, and process the identified frame. The present invention transmits separate signaling information through a P1 symbol. And, herein, the P1 symbol will be referred to as a new_system_P1 symbol.

The new_system_P1 symbol may be different from the P1 symbol, and a plurality of new_system_P1 symbols may be used herein. At this point, according to the embodiment of the present invention, the new_system_P1 symbol is located at the beginning of the signal frame, i.e., located at a front portion of a first P2 symbol within a preamble region. In this case, the preamble region may be configured of at least one or more new_system_P1 symbols and at least one or more P2 symbols.

(a) of FIG. 4 illustrates a P1 symbol structure according to an embodiment of the present invention and (b) of FIG. 4 illustrates a block diagram of a P1 symbol generator according to an embodiment of the present invention. (a) of FIG. 4 illustrates a P1 symbol structure according to the present invention. In (a) of FIG. 4, the P1 symbol and P2 symbol portion will be referred to as a preamble region, and a body region will be referred to as a data region. The data region may be configured of a plurality of data symbols (also referred to as data OFDM symbols).

In (a) of FIG. 4, P1 symbol is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion. In the description of the present invention, such P1 symbol structure will also be referred to as a C-A-B structure. At this point, according to the present invention, the P1 symbol corresponds to 1K OFDM symbol. And, according to the embodiment of the present invention, the A portion ($T_{P1A}$) may have the length of 112 us, the C portion ($T_{P1C}$) may have the length of 59 us, and the B portion ($T_{P1B}$) may have the length of 53 us.

(b) of FIG. 4 illustrates a block diagram showing an exemplary structure of a P1 symbol generator according to the present invention. Herein, (b) of FIG. 4 includes a CDS (Carrier Distribution Sequence) table module 000100, an MSS (Modulation Signaling Sequence) module 000200, a DBPSK (Differential Binary Phase Shift Keying) mapping module 000300, a scrambling module 000400, a padding module 000500, an IFFT module 000600, and a C-A-B structure module 000700. After being processed with the operations of each block included in the P1 symbol generator shown in (b) of FIG. 4, the P1 symbols shown in (a) of FIG. 4 is finally outputted from the C-A-B structure module 000700.

According to the embodiment of the present invention, the structure of the P1 symbol, shown in (a) of FIG. 4, may be modified, or the P1 symbol generator, shown in (b) of FIG. 4 may be modified, so as to generate a new_system_P1 symbol.

If the new_system_P1 symbol is generated by modifying the P1 symbol shown in (a) of FIG. 4, the new_system_P1 symbol may be generated by using at least one of the following methods. For example, the new_system_P1 symbol may be generated by modifying a frequency shift (or displacement) value ($f_{SH}$) for a prefix and a postfix. In another example, the new_system_P1 symbol may be generated by modifying (or changing) the length of the P1 symbol (e.g., $T_{P1C}$ and $T_{P1B}$ lengths). In yet another example, the new_system_P1 symbol may be generated by replacing the length of the P1 symbol from 1K to 512,256, 128, and so on. In this case, the parameters (e.g., $f_{SH}$, $T_{P1C}$, $T_{P1B}$) that are used in the P1 symbol structure should be adequately corrected.

If the new_system_P1 symbol is generated by modifying the P1 symbol generator shown in (b) of FIG. 4, the new_system_P1 symbol may be generated by using at least one of the following methods. For example, the new_system_P1 symbol may be generated by using a method of changing the distribution of active carriers (e.g., a method of having the CDS table module 000100 use another CSS (Complementary Set of Sequence), which are used for the P1 symbol, through the CDS table module 000100, the MSS module 000200, and the C-A-B structure module 000700. In another example, the new_system_P1 symbol may be generated by using a method of changing a pattern for transmitting information to the P1 symbol (e.g., a method of having the MSS module 000200 use another CSS), and so on.

Meanwhile, the present invention may additionally allocate a preamble symbol to the preamble region within a signal frame, particularly an NGH frame. Hereinafter, the additional preamble signal will be referred to as an AP1 symbol (Additional Preamble symbol) for simplicity in the description of the present invention. In order to enhance the detection performance for detecting a mobile broadcast (i.e., NGH) signal, in a considerably low SNR condition or a time-selective fading condition, at least one or more AP1 symbol is added to the signal frame.

At this point, according to the embodiment of the present invention, the AP1 symbol is located between a P1 symbol and a first P2 symbol within the preamble region of a signal frame. More specifically, the P1 symbol and the AP1 symbol are consecutively transmitted. According to the embodiment of the present invention, if the P2 symbol is not transmitted to the signal frame, the AP1 symbol may be located between the P1 symbol and the first data symbol within the preamble region of the signal frame. According to another embodiment of the present invention, the P1 symbol and the AP1 symbol may be allocated to non-consecutive positions within a single signal frame, so as to be transmitted.

For example, when a signal frame includes an AP1 symbol, the preamble region of the signal frame is configured of a P1 symbol, at least one or more AP1 symbols, and at least one or more P2 symbols. And, the data region may be configured of a plurality of data symbols (or data OFDM symbols).

As described in the embodiments for generating the new_system_P1 symbol, according to the embodiment of the present invention, the AP1 symbol may be generated by modifying the structure of the P1 symbol, shown in (a) of FIG. 4, or by modifying the P1 symbol generator, shown in (b) of FIG. 4. According to the embodiment of the present invention, the AP1 symbol may be generated by modifying both the structure of the P1 symbol, shown in (a) of FIG. 4, and the P1 symbol generator, shown in (b) of FIG. 4.

As described in the embodiment of the present invention, when at least 2 or more preamble symbols are used, the present invention is advantageous in that the present invention can be more robust against a burst fading effect, which may occur in a mobile fading environment, and that a signal detection performance can be enhanced.

Figure 5:
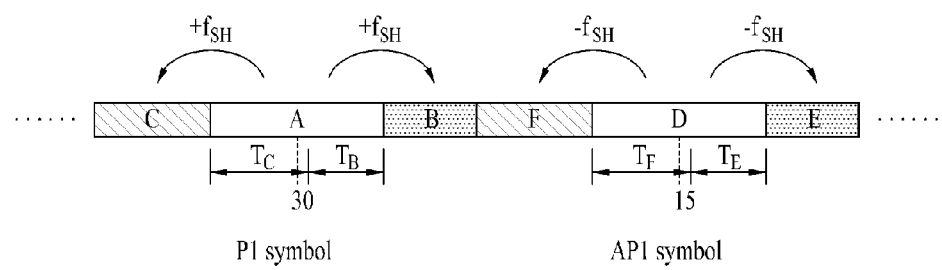
FIG. 5 illustrates a structure of a P1 symbol and a structure of an AP1 symbol according to an embodiment of the present invention.

FIG. 5 illustrates a structure of a P1 symbol and a structure of an AP1 symbol according to an embodiment of the present invention.

More specifically, FIG. 5 shows an example of generating an AP1 symbol by modifying the P1 symbol.

In FIG. 5, P1 symbol, which is shown on the left side, is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion.

In FIG. 5, AP1 symbol, which is shown on the right side, is generated by having each of a front portion and an end portion of an effective (or valid) symbol copied, by having a frequency shift performed as much as $-f_{sh}$, and by having the frequency-shifted copies respectively positioned at a front portion (F) and an end portion (E) of the effective symbol (D). In the present invention, the F portion will be referred to as a prefix, and the E portion will be referred to as a postfix. More specifically, AP1 symbol is configured of a prefix portion, an effective symbol portion, and a postfix portion.

Herein, the two frequency-shift values $+f_{sh}$, $-f_{sh}$, which are used in the P1 symbol and the AP1 symbol, may have the same absolute value yet be given opposite signs. More specifically, the frequency-shift is performed in opposite directions. And, the lengths C and F, which are copied to the front portion of the effective symbol, may be set to have different values. And, the lengths B and E, which are copied to the end portion of the effective symbol, may be set to have different values. Alternatively, the lengths C and F may be set to have different values, and the lengths B and E may be set to have the same value, or vice versa. According to another embodiment of the present invention, an effective symbol length of the P1 symbol and an effective symbol length of the AP1 symbol may be differently determined. And, according to yet another embodiment of the present invention, a CSS (Complementary Set Sequence) may be used for tone selection and data scrambling within the AP1 may be scrambled by AP1.

According to the embodiment of the present invention, the lengths of C and F, which are copied to the front portion of the effective (or valid) symbol, may be set to have different values, and the lengths of B and E, which are copied to the end portion of the effective (or valid) symbol, may also be set to have different values.

The C, B, F, E lengths according to the present invention may be obtained by using Equation 1 shown below.

Length of $C(T_C)$={Length of $A(T_A)/2+30$}

Length of $B(T_B)$={Length of $A(T_A)/2-30$}

Length of $F(T_F)$={Length of $D(T_D)/2+15$}

Length of $E(T_E)$={Length of $D(T_D)/2-15$}  [Equation 1]

As shown in Equation 1, P1 symbol and AP1 symbol have the same frequency shift value. However, each of the P1 symbol and the AP1 symbol are given opposite signs. Additionally, in order to determine the lengths of C and B, the present invention determines an offset value being added to or subtracted from a value corresponding to the length of A $(T_A)/2$. And, in order to determine the lengths of F and E, the present invention determines an offset value being added to or subtracted from a value corresponding to the length of D $(T_D)/2$. Herein, each of the offset values is set up differently. According to the embodiment of the present invention, the offset value of P1 symbol is set to 30, and the offset value of AP1 symbol is set to 15. However, the values given in the above-described examples are merely exemplary. And, therefore, it will be apparent that the corresponding values may easily be varied or changed by anyone skilled in the art. Thus, the present invention will not be limited only to the values presented herein.

According to the present invention, by generating AP1 symbol and an AP1 symbol to configure the structure shown in FIG. 5, and by inserting the generated symbols to each signal frame, the P1 symbol does not degrade the detection performance of the AP1 symbol, and, conversely, the AP1 symbol does not degrade the detection performance of the P1 symbol. Additionally, the detection performance of the P1 symbol is almost identical to the detection performance of the AP1 symbol. Furthermore, by configuring the symbols so that the P1 symbol and the AP1 symbol have similar symbol structures, the complexity level of the receiver may be reduced.

At this point, the P1 symbol and the AP1 symbol may be transmitted consecutively, or each of the symbols may be allocated to different positions within the signal frame and may then be transmitted. And, in case the P1 symbol and AP1 symbol are each allocated to a different position within the signal frame, so as to be transmitted, a high time diversity effect may be gained with respect to the preamble symbol. According to the embodiment of the present invention, the P1 symbol and the AP1 symbol are consecutively transmitted.

Figure 6:
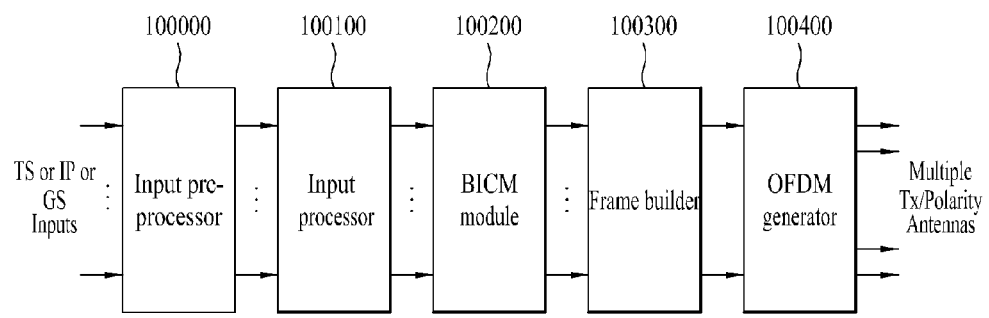
FIG. 6 illustrates a block diagram showing a broadcast signal transmitting apparatus according to an embodiment of the present invention.

FIG. 6 illustrates a block diagram showing a broadcast signal transmitting apparatus according to an embodiment of the present invention.

In the present invention, the broadcast signal transmitting apparatus may be referred to as a broadcast signal transmitter or a transmitter.

As shown in FIG. 6, the broadcast signal transmitting apparatus may include an input pre-processor 100000, an input processor 100100, a BICM module 100200, a frame builder 100300, and an OFDM generator 100400. Herein, the BICM module 100200 is also referred to as a BICM encoder.

The input stream may include at least one of a TS stream, an internet protocol (IP) stream, and a GSE (General Stream Encapsulation) stream (or also referred to as a GS stream).

The input pre-processor 100000 may receive at least one the TS stream, the IP stream, and the GS stream, so as to generate at least one or more PLPs in service units (or service component units) in order to provide robustness.

The input processor 100100 generates a BB frame including at least one or more of the PLPs generated from the input pre-processor 100000. In case the input processor 100100 receives a PLP corresponding to a service, the input processor 100100 may categorize the received PLP as PLPs corresponding to the service components and may, then, generate the BB frame.

The BICM module 100200 adds redundancy to the output of the input processor 100100, so that any error occurring over the transmission channel can be corrected, and then the BICM module 100200 performs interleaving.

The frame builder 100300 maps the plurality of PLPs to the transmission frame is cell units, so as to complete the transmission frame (or signal frame) structure.

The OFDM generator 100400 performs OFDM modulation on the input data, so as to generate a baseband signal that can be transmitted to the antenna.

Figure 7:
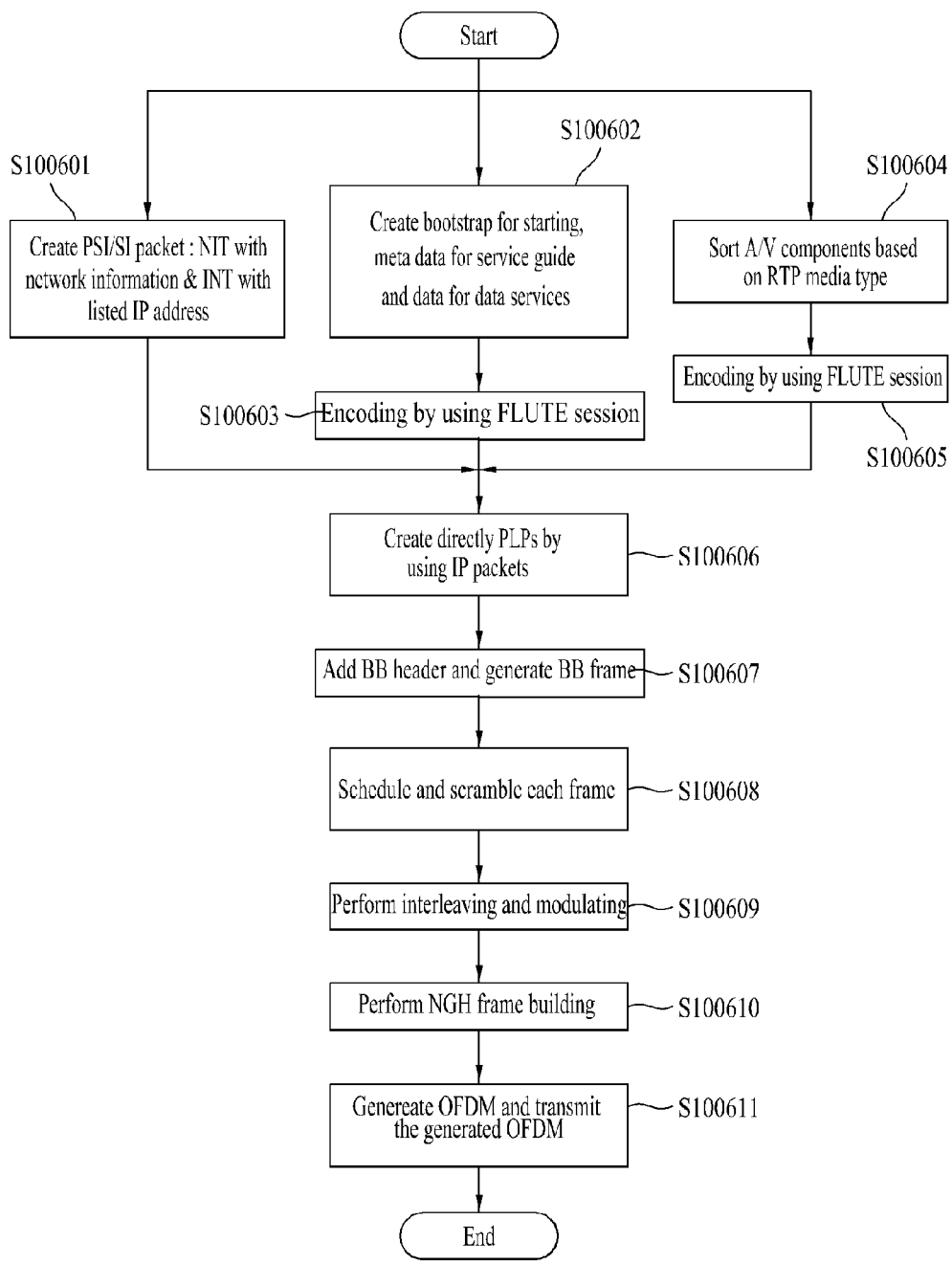
FIG. 7 illustrates a flow chart showing a method of transmitting an IP-based broadcast signal according to an embodiment of the present invention.

FIG. 7 illustrates a flow chart of a method for transmitting an IP-based broadcast signal according to an embodiment of the present invention.

More specifically, FIG. 7 illustrates a method for inputting an IP stream in an IP packet unit, sorting (or categorizing) the input IP stream with respect to each component, and transmitting the sorted (or categorized) IP stream in component PLP units.

In order to do so, IP packets including IP service information are created (or generated) (S100601). The IP service information may include an NIT, which signals network information, and may include an INT, which includes a listed IP address. The IP service information may correspond to a binary type, and FLUTE encoding or RTP encoding may be omitted. The IP service information is transmitted to a common PLP.

After creating (or generating) bootstrap information for initiation, meta data for service guide, and data for data services (S100602), the created information and data are encoded by using a FLUTE session, thereby being outputted in an IP packet format (S100603). Thereafter, the audio/video (A/V) components are sorted (or differentiated) based upon the RTP media type (S100604), then each of the differentiated (or sorted) components is encoded by using a FLUTE session or an RTP session, thereby being outputted in an IP packet format (S100605).

The process steps S100601~S100605 may be performed by the input pre-processor 100000, or may be performed in another block (not shown) and then delivered to the input pre-processor 100000.

The input processor 100100 may create PLPs by directly using IP packets that are FLUTE encoded or RTP encoded, or by directly using IP packets bypassing the FLUTE encoding or RTP encoding processes (S100606). More specifically, by omitting the GSE encapsulating process, the overhead may be reduced.

Subsequently, the input processor 100100 slices each IP stream into a predetermined number of bit units, so as to map the sliced bit units to a BB frame payload, and, then, the input processor 100100 inserts a BB header to the BB frame payload, so as to generate a BB frame (S100607).

Moreover, the input processor 100100 performs scheduling in order to map multiple PLPs to the transmission frame, and then the input processor 100100 performs scrambling on the data (i.e., bit stream) within the BB frame (S100505).

The BICM module 100200 adds redundancy to the output of the input processor 100100, so that any error occurring within the transmission channel can be corrected, and then, the BICM module 100200 performs interleaving (S100609).

The frame builder 100300 maps the multiple PLPs being outputted from the BICM module 100200 to the transmission frame in cell units in accordance with the scheduling information, thereby completing the transmission frame (NGH frame) structure (S100610). The OFDM generator 100400 performs OFDM modulation on the data within the transmission frame, thereby transmitting the OFDM-modulated data to the antenna (S100611).

The input pre-processor 100000 of FIG. 6 may categorize the data corresponding to the service to each component, and, then, the input pre-processor 100000 may perform data processing, so that the data corresponding to each component can be transmitted to a separate PLP.

The broadcast signal transmitting apparatus according to the present invention may be transmitted to one or more services in PLP units. However, the components being included in one service may be separated and transmitted in PLP units. In this case, the broadcast signal receiving apparatus may identify and process the PLPs including each component, so as to be capable of providing a single service. In order to do so, the input pre-processor 100000 according to the present invention processes data in component units.

Hereinafter, the input pre-processor processing data having an IP stream format will hereinafter be described in detail.

In case of an IP stream, unlike the description presented above, the data corresponding to the component may be divided in IP packet units. And, the PSI/SI included in the TS may correspond to service information, and the IP service information may include ESG (Electronic Service Guide; ESG) information, provider information, bootstrap information, and so on. The ESG information may include IP address information, port number information, and so on of the service component and it may be referred to as meta data. According to the embodiment of the present invention, the IP stream may be inputted/outputted in GSE (Generic Stream Encapsulation) stream units.

Figure 8:
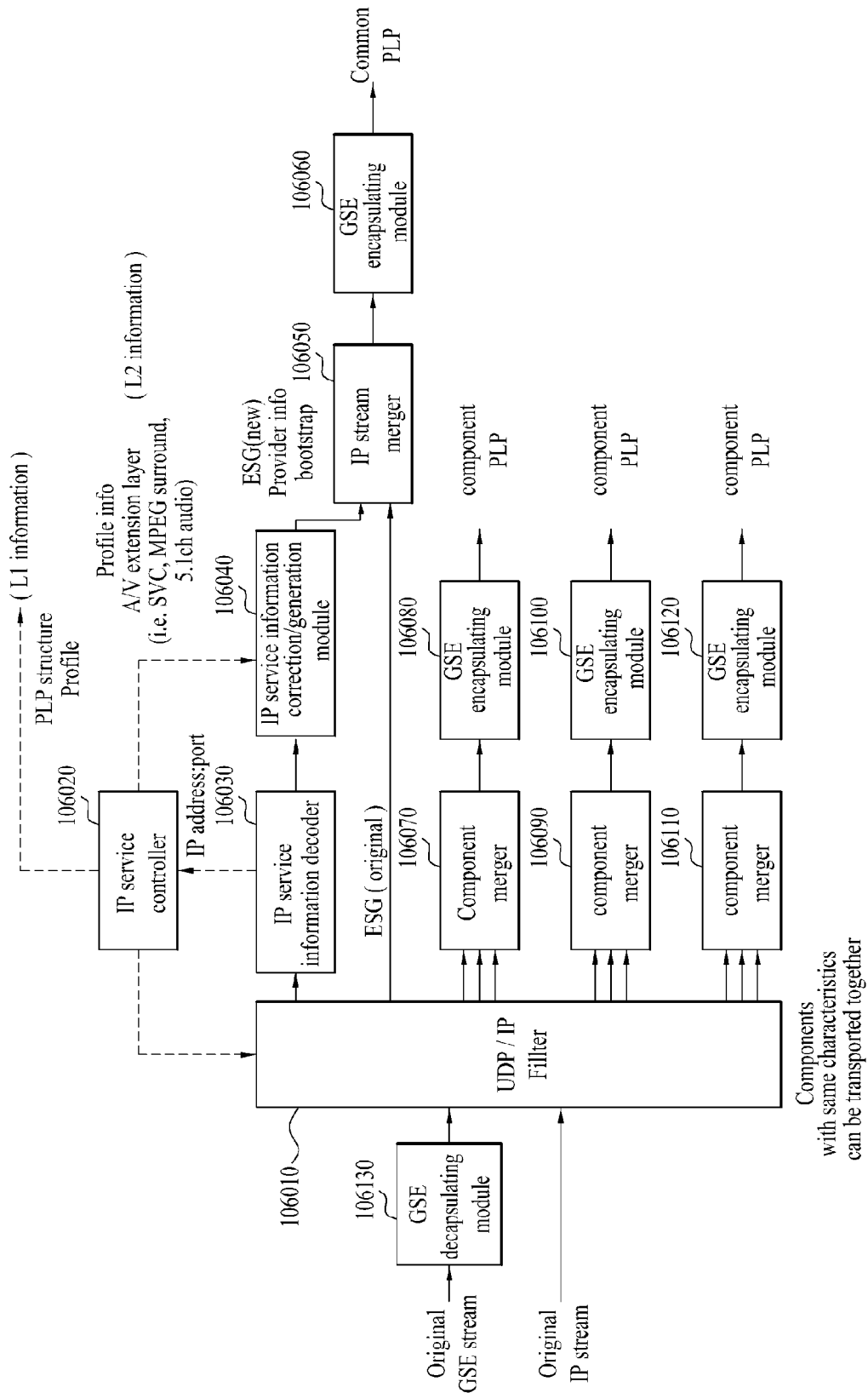
FIG. 8 illustrates a block diagram showing an input pre-processor according to an embodiment of the present invention, (*a*) to (*c*) of FIG. 9 illustrate an example of configuring a PLP in component units in an input pre-processor according to the present invention.

FIG. 8 illustrates a block diagram showing an input pre-processor according to an embodiment of the present invention.

The input pre-processor 100000 of FIG. 8 includes a UDP/IP filter 106010, an IP service controller 106020, an IP service information decoder 106030, an IP service information modifying/generating module 106040, an IP stream merger 106050, GSE encapsulating modules 106060, 106080, 106100, 106120, component mergers 106070, 106090, 106110, and a GSE decapsulating module 106130.

The input pre-processor 100000 of FIG. 8 receives a GSE stream or IP stream and differentiates the data included in the received stream for each component, thereby outputting the differentiated data to a different PLP. At this point, a PLP including IP service information may be referred to as a common PLP, and the common PLP may also be referred to as L2 signaling information or L2 information/data. The L1 signaling information may also be referred to as L1 information.

In the present invention, the GSE stream is inputted to the GSE decapsulation module 106130, and the IP stream is inputted to the UDP/IP filter 106010. The GSE decapsulation module 106130 performs GSE decapsulation on the GSE stream, so as to extract an IP stream, thereby outputting the extracted IP stream to the UDP/IP filter 106010.

The UDP/IP filter 106010 may use a UDP port number and an IP address, and so on, so as to perform filtering on the IP packets, which are included in the IP stream, for each component, thereby outputting the filtered IP packets. Since a UDP port number and an IP address are assigned (or allocated) to each of the IP packets for each component, which are included in the IP stream, the UDP/IP filter 106010 may use the UDP port number and IP address so as to identify the IP packet corresponding to each component, thereby outputting each of the identified IP packets to a separate PLP path. Hereinafter, such UDP port number and IP address may also be collectively referred to as an address or address information.

However, since a UDP port number and an IP address should be known in order to perform such filtering process, the UDP/IP filter 106010 first filters the IP service information included in the IP stream. Then, the IP service information decoder 106030 decodes the IP service information, which is filtered by the UDP/IP filter 106010, so as to acquire address information. At this point, the address information may be acquired from the ESG information among the IP service information. Additionally, the IP service controller 106020 may use the address information, which is acquired from the IP service information decoder 106030, so as to control the UDP/IP filter 106010 and to filter the IP packet corresponding to a desired component for each address, thereby outputting the filtered IP packet. Since the IP service information, which is included in the IP stream, is transmitted to a predetermined address, an immediate filtering process may be performed without any separate settings of the UDP/IP filter 106010.

The UDP/IP filter 106010 first filters the IP packets included in the IP stream for each component and then outputs the filters IP packets to a respective component merger through each PLP path. For example, IP packets corresponding to the video component are outputted to the component merger 106070, IP packets corresponding to the audio component are outputted to the component merger 106090, and IP packets corresponding to the data component are outputted to the component merger 106110. The component mergers 106070, 106090, 106110 merge the IP packets of the corresponding component. If the stream being inputted to the input pre-processor corresponds to a stream having a GSE format, the output of the component mergers 106070, 106090, 106110 is outputted as a GSE stream, after being GSE encapsulated by each GSE encapsulating module. And, if the corresponding stream has an IP format, the GSE encapsulating process may be omitted.

When configuring the PLP for each component as described above, the receiver may not be capable of searching all of the data corresponding to a single service, even when the channel is scanned. More specifically, unlike the method of configuring a PLP for each service and identifying the configured PLP as IP service information, since the PLP is configured for each component configuring a service, a component PLP that does not include any IP service information may exist in the present invention. Therefore, in the present invention, service configuration information is added to the IP service information so that the component PLPs corresponding to a service can be located and found.

The IP service information modifying/generating module 106040 may modify or generate IP service information that should be modified or added, such as ESG information, service provider information, bootstrap information, and so on and may, then, output the modified or generated IP service information. For example, service configuration information configuring a PLP for each component may be signaled to the ESG information.

The IP stream merger 106050 merges IP service information modified/generated by the IP service information modifying/generating module 106040 and IP service information, such as supplemental information, which does not require any modification, thereby outputting the merged IP service information to a common PLP path.

As shown in FIG. 8, the input pre-processor may receive an IP stream (or GSE stream) and may output data including IP service information to a common PLP path and may output data corresponding to each component to a component PLP path. Accordingly, as described above, the data corresponding to each PLP path may also be referred to as PLP data or PLP.

The input pre-processor may signal information on the components, which are configured as described above, to the L1 signaling information, so that components can be extracted in PLP units in accordance with the receiver type. More specifically, when a service type is selected in accordance with the receiver, the receiver shall process the components corresponding to the selected service. In the present invention, since a PLP is configured for each component, the information on such PLP configuration is signaled to the L1 signaling information, thereby allowing the receiver to extract the components corresponding to the selected service and to process the extracted components. Accordingly, the input pre-processor may generate information on the PLP configuration, so as to perform control operations enabling the generated information to be included in the L1 signaling information.

Figure 9:
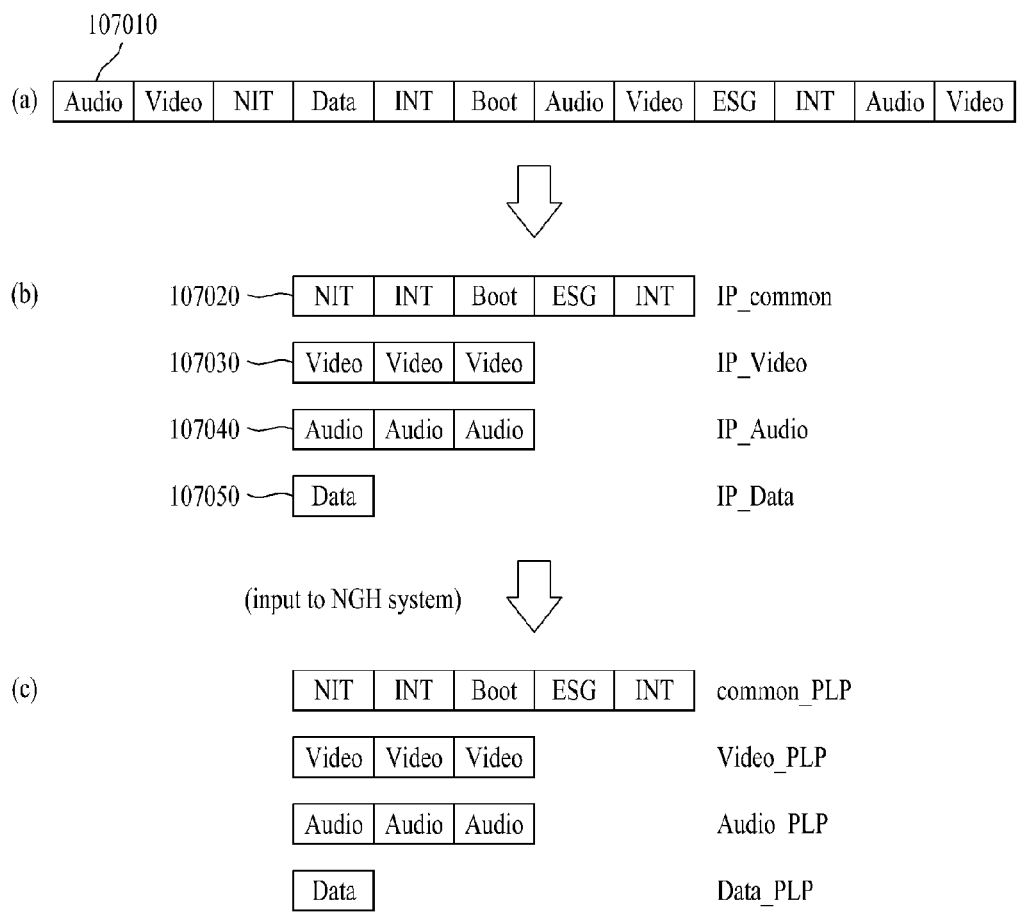

(*a*) to (*c*) of FIG. 9 illustrate an example of configuring a PLP in component units in an input pre-processor according to the present invention.

In (*a*) of FIG. 9, an IP stream 107010 being configured of IP packets indicates an IP stream being inputted to the UDP/IP filter 106010 of the input pre-processor shown in FIG. 8. And, each IP packet includes one of audio component data, video component data, data component data, and IP service information component data.

The input pre-processor of FIG. 9 performs the above-described pre-processing procedure on the IP packets included in the IP stream 107010, so as to differentiate the pre-processed IP packets for each component, thereby outputting each of the differentiated IP packets through a different PLP path.

Figure 14:
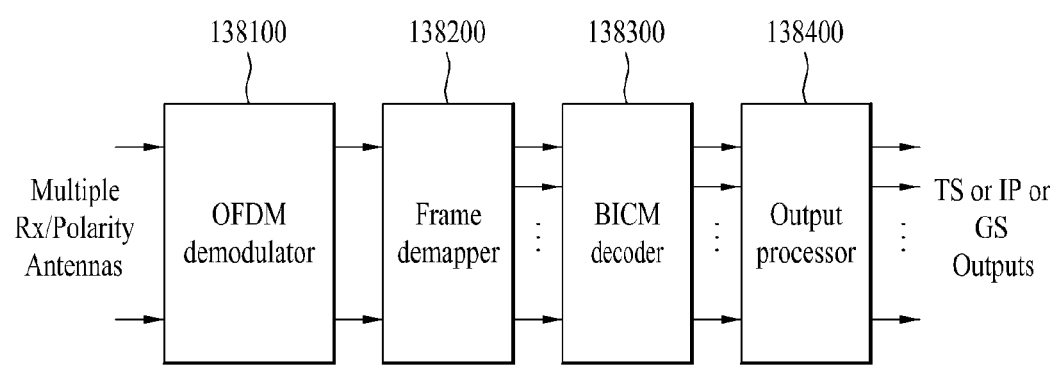
FIG. 14 illustrates a block diagram showing a broadcast signal receiving apparatus according to an embodiment of the present invention.

For example, in (*b*) of FIG. 14, IP packets including NIT, INT, bootstrap, ESG information are outputted through a common PLP path, thereby configuring a common IP (107020, IP_Common), and IP packets including data of the video component are outputted through a video component PLP path, thereby configuring a video component IP (107030, IP_Video). Additionally, the IP packets including data of the audio component are outputted through an audio component PLP path, thereby configuring an audio component IP (107040, IP_Audio), and the IP packets including data of the data component are outputted through a data component PLP path, thereby configuring a data component IP (107050, IP_Data). In another example, IP packets including data of 2 or more components may be outputted through a single PLP path, so as to configure a single IP. In yet another example, IP packets including data of a specific component respective to multiple services may be outputted through a single PLP path, so as to configure a single IP.

At this point, unlike in the TS-based broadcasting, in the IP-based broadcasting, a PLP is directly configured without performing null packet inserting or deleting processes. This is because a null packet is not required in the IP stream.

For simplicity in the description of the present invention, a common IP stream 107020 may be referred to as a common PLP (or PLP data), and a video component IP stream 107030 may be referred to as a video component PLP (or PLP data) like (c) of FIG. 9. Additionally, an audio component IP stream 107040 may be referred to as an audio component PLP (or PLP data), and a data component IP stream 107050 may be referred to as a data component PLP (or PLP data).

Based upon the characteristics of the IP streams, the IP streams of each PLP path of FIG. 9 are not required to maintain the same synchronization or order.

Figure 10:
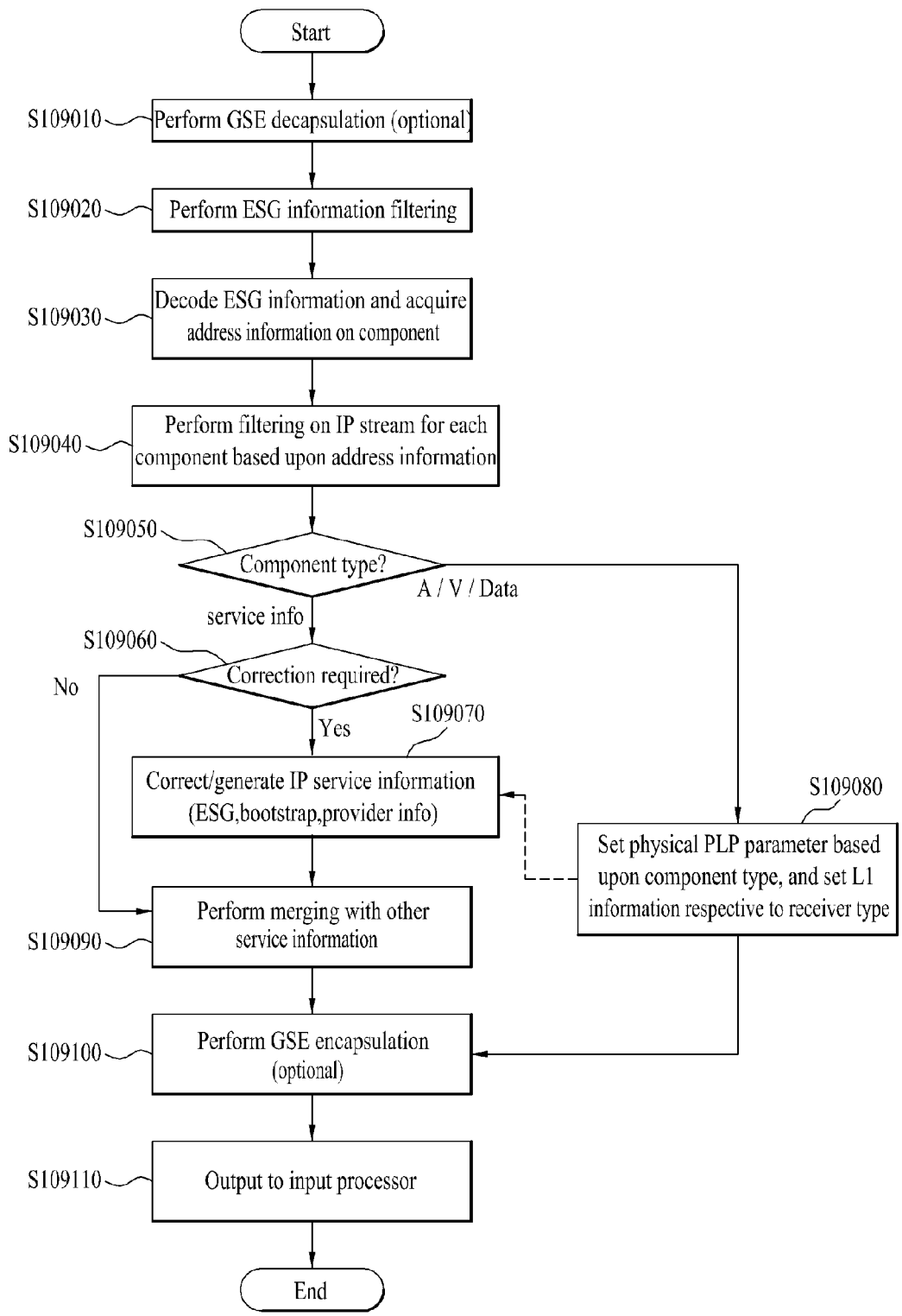
FIG. 10 illustrates a flow chart showing a pre-processing method of a broadcast signal according to an embodiment of the present invention.

FIG. 10 illustrates a flow chart showing a pre-processing method of a broadcast signal according to another embodiment of the present invention.

FIG. 10 shows a processing method of the above-described input pre-processor 100000 of FIG. 8, so that an IP stream can be divided in component units, and so that each set of component unit data can be outputted to a different PLP path.

In case the input stream corresponds to a GSE stream, the input pre-processor 100000 may use the GSE decapsulating module 106130, so as to decapsulate the GSE stream to an IP stream (S109010). In case the input stream corresponds to an IP stream, this process step (S109010) may be omitted.

The input pre-processor 100000 may use the UDP/IP filter 106010, so as to filter the ESG information of the input IP stream (S109020). Since the ESG information is transmitted from an IP stream to a predetermined address, a filtering procedure may be performed without any separate filter set-up.

The input pre-processor 100000 may use the IP service information decoder 106030, so as to decode the ESG information, which is filtered by the UDP/IP filter 106010 and to acquire address information respective to each component included in the IP stream (S109030). Thereafter, the IP service controller 106020 may set up the UDP/IP filter 106010 by using the address information, which is acquired in step (S109030), so as to filter data for each component and to output the filtered data (S109040).

The input pre-processor 100000 performs another operation in accordance with the component type of the corresponding data (S109050).

In case the component type corresponds to IP service information, i.e., when the component type corresponds to common PLP data, the input pre-processor 100000 may determine whether or not the IP service information requires modification (S109060). Thereafter, when modification is required, the corresponding IP service information (ESG information, bootstrap information, provider information, and so on) may be generated or modified (S109070). Then, by using the IP stream merger 106050, IP service information that are to be included in the data, which are transmitted to the common PLP, are merged (S109090).

In case the component type does not correspond to IP service information, i.e., in case the component type corresponds to component PLP data, the input pre-processor 100000 sets up a physical parameter based upon the component type, thereby enabling the physical parameter to be signaled to the L1 signaling information (S109080). In other words, the input pre-processor 100000 may signal information on a component PLP structure to the L1 signaling information, so that the receiver can process the component PLP corresponding to the service in accordance with the component structure of the present invention.

In case the output data format corresponds to a GSE stream, the input pre-processor 100000 performs GSE encapsulation on the processed PLP data in accordance with the component type (S109100). In case the output data format corresponds to an IP GSE stream, this step may also be omitted. Each set of the component PLP data may be outputted to a different PLP path (S109110).

The output of the input pre-processor 100000 is outputted to the input processor 100100.

In the description of the present invention, TS or IP or GSE streams may be converted to n+1 number of streams that can be independently processed through the input pre-processor 100000 or the input processor 100100. At this point, the stream that is to be independently processed may correspond to a complete (or whole) TS stream including a plurality of service components, and may also correspond to a TS stream of a minimum unit including only one service component (e.g., video or audio, and so on). Similarly, the stream that is to be independently processed may correspond to a complete (or whole) GSE stream including a plurality of service components or a GSE stream including only one service component. Furthermore, the stream that is to be independently processed may also correspond to a complete (or whole) IP stream including a plurality of service components or an IP stream including only one service component.

Meanwhile, in the present invention, the MISO method may be independently applied for each set of PLP data, and the MIMO method may also be applied.

According to an embodiment of the present invention, the BICM module 100200 may perform MIMO encoding on MIMO PLP data to be transmitted in MIMO and may perform MISO encoding on MISO PLP data to be transmitted in MISO. According to another embodiment of the present invention, the BICM module 100200 may perform MIMO encoding on MIMO PLP data to be transmitted in MIMO and the OFDM generator 10040 may perform MISO encoding on MISO PLP data to be transmitted in MISO.

Specifically, a broadcast signal transmitter and receiver for performing MISO processing and MIMO processing on a plurality of signals transmitted and received through a plurality of antennas may be considered in four embodiments. The embodiments are differentiated according to whether MISO/MIMO processing is performed on a PLP basis and the position of MISO/MIMO processing. Each embodiment will be described below in brief.

A first embodiment relates to a broadcast signal transmitter for performing MISO processing and MIMO processing independently on an input PLP data basis during BCIM encoding and a broadcast signal receiver corresponding to the broadcast signal transmitter.

A second embodiment relates to another broadcast signal transmitter for performing MISO processing and MIMO processing independently on an input PLP data basis during BCIM encoding and a broadcast signal receiver corresponding to the broadcast signal transmitter.

A third embodiment relates to a broadcast signal transmitter for performing MISO processing and MIMO processing on PLP data mapped to a frame during OFDM generation and a broadcast signal receiver corresponding to the broadcast signal transmitter.

A fourth embodiment relates to a broadcast signal transmitter for performing MIMO processing independently on MIMO PLP data to be MIMO-processed among input PLP data during BICM encoding and performing MISO processing on MISO PLP data and L1-signaling information to be MISO-processed during OFDM generation and a broadcast signal receiver corresponding to the broadcast signal transmitter.

To be more specific, according to the first embodiment, the BICM module 100200 of the broadcast signal transmitter may perform MISO encoding or MIMO encoding on input PLP data after constellation mapping, cell interleaving, and time interleaving. A BICM decoder 138300 of the broadcast signal receiver may perform the BICM encoding of the broadcast signal transmitter in a reverse order.

According to the second embodiment, the BICM module 100200 of the broadcast signal transmitter may perform MISO encoding or MIMO encoding on each input PLP data after constellation mapping and then perform cell interleaving and time interleaving on the encoded PLP data. The BICM decoder 138300 of the broadcast signal receiver may perform the BICM encoding of the broadcast signal transmitter in a reverse order.

According to the third embodiment, the OFDM generator 100400 of the broadcast signal transmitter may perform MISO encoding or MIMO encoding on PLP data received from the frame builder 100300. An OFDM demodulator 138100 of the broadcast signal receiver may perform the operation of the OFDM generator 100400 of the broadcast signal transmitter in a reverse order.

According to the fourth embodiment, the BICM module 100200 of the broadcast signal transmitter may perform MIMO encoding on MIMO PLP data to be MIMO-processed after time interleaving or constellation mapping. The OFDM generator 10040 may perform MISO encoding on MISO PLP data and L1-signaling information to be MISO-processed, mapped to a frame and perform MIMO encoding on MIMO PLP data. The BICM decoder 138300 and the OFDM demodulator 138100 of the broadcast signal receiver may perform the operations of the BICM module 100200 and the OFDM generator 100400 of the broadcast signal transmitter in a reverse order.

The following description centers on the BCIM module 100200 of the broadcast signal transmitter according to the first embodiment of the present invention.

The broadcast signal transmitter and receiver of the present invention may perform MISO processing and MIMO processing on a plurality of signals transmitted and received through a plurality of antennas. Hereinafter, a broadcast signal transmitter and receiver for processing two signals transmitted and received through two antennas will be described.

Figure 11:
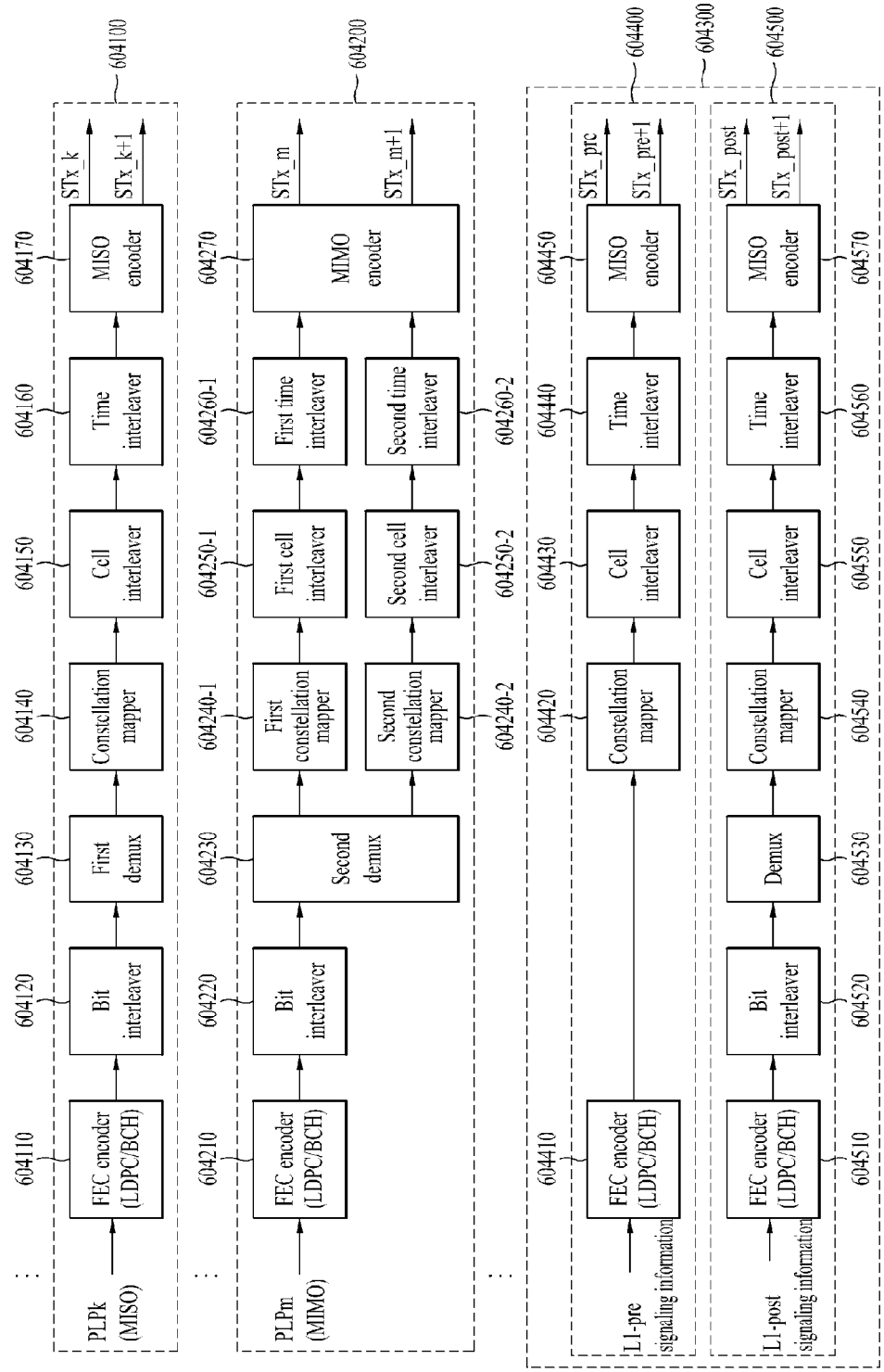
FIG. 11 illustrates a block diagram showing a BICM module according to an embodiment of the present invention.

FIG. 11 is a block diagram of a BICM module according to an embodiment of the present invention.

The BICM module illustrated in FIG. 11 is the aforedescribed BICM module according to the first embodiment. The BICM module may perform bit interleaving and errorcorrection encoding on a plurality of input-processed PLP data, input-processed L1-presignaling information, and input-processed L1-post signaling information.

For the operation, the BICM encoder illustrated in FIG. 11 may apply a MISO scheme or a MIMO scheme to every PLP data independently. That is, the BICM encoder of FIG. 11 may include a first BICM encoding block 604100 for processing PLP data in MISO, a second BICM encoding block 604200 for processing PLP data in MIMO, and a third BICM encoding block 604300 for processing signaling information in MISO. The third BICM encoding block 604300 may process the signaling information in MIMO. However, since the signaling information includes information required for the receiver to recover PLP data included in a transmission frame, the signaling information requires stronger transmission-reception robustness than the PLP data. Accordingly, the signaling information is processed in MISO in an embodiment of the present invention.

Hereinafter, the data processing method of each block will be described.

The first BICM encoding block 604100 includes an FEC (Forward Error Correction) encoder 604110, a bit interleaver 604120, a first demux 604130, a constellation mapper 604140, a cell interleaver 604150, a time interleaver 604160, and an MISO encoder 604170.

The FEC encoder 604110 adds a redundancy to an input bit stream, so that the receiver can perform correction on an error occurring on the transmission channel with respect to input processed PLP data and may, then, perform bit stream encoding at a coding rate, such as ¼, ⅓, ⅖. For example, the FEC encoder 604110 may use a BCH (Bose-Chaudhuri-Hocquengham)/LDPC (Low Density Parity Check) code, so as to add redundancy for error correction and to perform encoding.

The bit interleaver 604120 may perform bit interleaving in a single FEC block unit on the PLP data, which are processed with FEC encoding, so that the error can have robustness against a burst error, which may occur during transmission. In this case, the bit interleaver 604120 may perform bit interleaving by using two FEC block units. And, as described above, when bit interleaving is performed by using two FEC block units, cells forming a pair in the frame builder, which will be described later on, may each be generated from a different FEC block. Therefore, the broadcast signal receiver may ensure diversity so as to enhance the receiving performance.

The first demux 604130 performs demultiplexing in a single FEC block unit. In this case, the first demux 604130 may perform demultiplexing by using two FEC blocks. As described above, when demultiplexing is performed by using two FEC blocks, the cells configuring a pair in the frame builder, may each be generated from a different FEC block. Therefore, the receiver may ensure diversity, so as to gain a more enhanced receiving performance.

The constellation mapper 604140 maps the demultiplexed bit unit PLP data to the constellation. In this case, the constellation mapper 604140 may rotate the constellation by a predetermined angle in accordance with the modulation type. The rotated constellations may be expressed as an I-phase (In-phase) element and a Q-phase (Quadrature-phase) element, and the constellation mapper 604140 may delay only the Q-phase element by an arbitrary value. Thereafter, the constellation mapper 604140 may use the In-phase element and the delayed Q-phase element, so as to remap the demultiplexed PLP data to a new constellation.

The cell interleaver 604150 may perform interleaving in cell units on the PLP data mapped or remapped to the constellation, and the time interleaver 604160 may perform interleaving on the cell-interleaved PLP data in time units, so as to output the time-interleaved PLP data to the frame builder. In this case, the time interleaver 604160 may perform interleaving by using 2 FEC blocks. By performing this procedure, since the cells configuring a pair in the frame builder, which will be described later on, may each be generated from a different FEC block, the receiver may ensure diversity so as to enhance the receiving performance.

An MISO encoder 604170 may perform MISO encoding on the time-interleaved PLP data using an MISO encoding matrix and output MISO PLP data in two paths STX_k and STX_k+1. As a consequence, transmit diversity can be achieved. In an embodiment of an MISO encoding method according to the present invention, an Orthogonal Space-Time Block Code (OSTBC)/Orthogonal Space Frequency Block Code/Alamouti code (OSFBC) may be included.

The second BICM encoding block 604200 includes an FEC encoder 604210, a bit interleaver 604220, a second demux 604230, a first constellation mapper 604240-1 and a second constellation mapper 604240-2, a first cell interleaver 604250-1, a second cell interleaver 604250-2, a first time interleaver 614260-1, a second time interleaver 614260-2, and an MIMO encoder 604270.

The FEC encoder 604210 and the bit interleaver 604510 perform the same functions as the FEC encoder 604110 and the bit interleaver 604120 of the MISO method.

The second demux 604230 may perform the same functions as the first demux 604130 of the MISO method and may additionally perform demultiplexing on the PLP data, so as to output the demultiplexed PLP data through 2 input paths, which are required for the MIMO transmission. In this case, the transmission characteristics of the data being transmitted through each input path may be different from one another. Accordingly, the second demux may assign the bit-interleaved PLP data to each input path at random.

The first constellation mapper 604240-1 and the second constellation mapper 604240-2 may perform the same functions as the constellation mapper 604140 of the MISO method.

According to an embodiment of the present invention, the first cell interleaver 604250-1 and the second cell interleaver 604250-2 may perform cell interleaving only on the PLP data corresponding to half the size of an FEC block, among the PLP data inputted through each path. Accordingly, the cell interleaving process performed by the first cell interleaver 604250-1 and the second cell interleaver 604250-2 may have the same effect as the interleaving procedure performed by the cell interleaver 604140 of the MISO method. Additionally, the first cell interleaver 604250-1 and the second cell interleaver 604250-2 are advantageous in that additional memory are not assigned (or allocated) to the first cell interleaver 604250-1 and the second cell interleaver 604250-2, in order to process the data of multiple paths, and that cell interleaving may be performed by using the memory settings of the cell interleaver 604140.

The first time interleaver 614260-1 and the second time interleaver 614260-1 perform the same functions as the time interleaver 604160 of the MISO method. Also, the first time interleaver 614260-1 and the second time interleaver 614260-2 may perform time interleaving on the PLP data being inputted through each path by using the same method, or may perform time interleaving by using different methods.

An MISO encoder 604270 may perform MIMO encoding on the 2-path time-interleaved PLP data using an MIMO encoding matrix and output MIMO PLP data in two paths STX_m and STX_m+1. The MIMO encoding matrix according to the present invention may include spatial multiplexing, a Golden Code (GC), a full-rate full diversity code, a linear dispersion code, etc.

L1-signaling information may include L1-presignaling information and L1-post signaling information. The MISO scheme may be applied independently to each of the L1-presignaling information and the L1-post signaling information.

Accordingly, the third BICM encoding block 604300 may include a first encoding block 604400 for processing L1-pre-signaling information and a second encoding block 604500 for processing L1-post-signaling information.

The first encoding block 604400 may include an FEC encoder 604410, a constellation mapper 604420, a cell interleaver 604430, a time interleaver 604440, and an MISO encoder 604450. The second encoding block 604500 may include an FEC encoder 604510, a bit interleaver 604520, a demux 604530, a constellation mapper 604540, a cell interleaver 604550, a time interleaver 604560, and an MISO encoder 604570.

The L1-presignaling information may include information needed to decode the L1-post signaling information, and the L1-post signaling information may include information needed for the receiver to recover data transmitted from the transmitter.

That is, the receiver may need to decode the L1-presignaling information fast and accurately in order to decode the L1-signaling information and data. Therefore, the L1-presignaling information is not subject to bit interleaving and demultiplexing so that the receiver may fast decode the L1-presignaling information in an embodiment of the present invention.

Each block of the first and second encoding blocks 604400 and 604500 is the same as its counter part of the first BICM encoding block 604100 in terms of function and thus its detailed description will not be provided herein.

Eventually, the first encoding block 604400 for processing the L1-presignaling information may perform MISO encoding on the L1-presignaling information and thus output the L1-presignaling data in two paths STX_pre and STX_pre+1. The second encoding block 604500 for processing the L1-post signaling information may perform MISO encoding on the L1-post signaling information and thus output the L1-post signaling data in two paths STX_post and STX_post+1.

For the convenience' sake of description, the paths STX_k, STX_m, STX_pre, and STX_post are collectively referred to as a first path and the paths STX_k+1, STX_m+1, STX_pre+1, and STX_post+1 are collectively referred to as a second path in the present invention.

Figure 12:
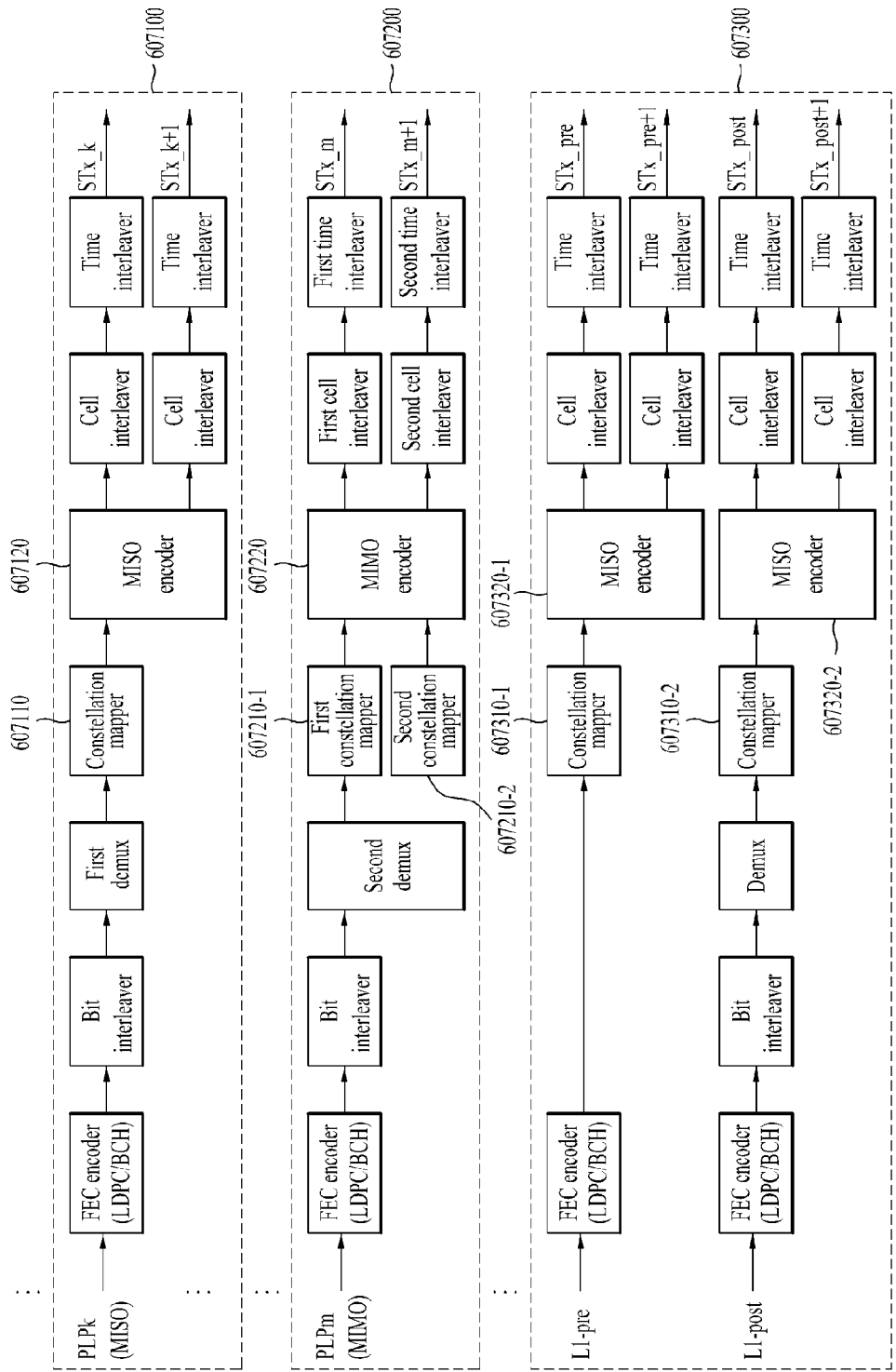
FIG. 12 illustrates a block diagram showing a BICM module according to another embodiment of the present invention.

FIG. 12 is a block diagram of a BICM module according to another embodiment of the present invention.

The BICM module illustrated in FIG. 12 is the aforedescribed BICM module according to the second embodiment. The BICM module may perform bit interleaving and error-correction encoding on a plurality of input-processed PLP data, input-processed L1-presignaling information, and input-processed L1-post signaling information.

The BICM encoder according to the second embodiment of the present invention may apply the MISO scheme or the MIMO scheme independently to every PLP data.

As illustrated in FIG. 12, the BICM encoder may include a first BICM encoding block 607100 for processing PLP data in MISO, a second BICM encoding block 607200 for processing PLP data in MIMO, and a third BICM encoding block 607300 for processing signaling information in MISO.

The BICM encoding blocks of FIG. 12 according to the second embodiment operate in the same manner as the BICM encoding blocks of FIG. 11 according to the first embodiment and thus their detailed description is not provided herein. However, the BICM encoding blocks according to the second embodiment are different from the BICM encoding blocks according to the first embodiment in that MISO encoders 607120, 607320-1, and 607320-2 and an MIMO encoder 607220 of the BICM encoding blocks are positioned at the rear ends of constellation mappers 607110, 607210-1, 607210-2, 607310-1, and 607310-2.

The PLP data or the signaling data may be processed on a symbol basis after constellation mapping. Therefore, cell interleavers, time interleaves, MISO encoders, and MIMO encoders included in the BICM encoding blocks illustrated in FIG. 11 according to the first embodiment or the BICM encoding blocks illustrated in FIG. 12 according to the second embodiment may process input data on a symbol basis. The broadcast signal receiver may perform BICM decoding on received data by reversely performing the BICM encoding of the BICM encoding blocks according to the first embodiment or the second embodiment. In addition, MISO decoders, an MIMO decoder, time interleavers, and cell deinterleavers of the broadcast signal receiver may process received data on a symbol basis.

However, the BICM decoder of the broadcast signal receiver according to the first embodiment first performs MISO decoding or MIMO decoding on each set of data and, then, outputs the data processed with MISO decoding or MIMO decoding in bit units. At this point, the data being outputted from the MISO decoder or the MIMO decoder correspond to bit-unit likelihood (or probability) information. Accordingly, hereinafter, the BICM decoder of the broadcast signal receiver may perform time deinterleaving and cell deinterleaving procedures. However, since data that are outputted in bit units are being inputted, information of symbol-unit data is also required. Therefore, since the broadcast signal receiver is required to store information on symbol mapping of the input bits, which is required for the deinterleaving procedures, the complexity level in the memory of the broadcast signal receiver may be increased.

In the BICM encoder of the second embodiment as shown in FIG. 12, MISO encoders 607100, 607300, 607400 and MIMO encoder 607200 are located at the end of the constellation mapper. Therefore, the BICM decoder of the broadcast signal receiver according to the second embodiment may perform MISO/MIMO decoding after performing both time deinterleaving and cell deinterleaving in symbol units. Accordingly, the complexity level of the memory included in the broadcast signal receiver of the first embodiment may be decreased as compared to the broadcast signal receiver of the first embodiment.

Figure 13:
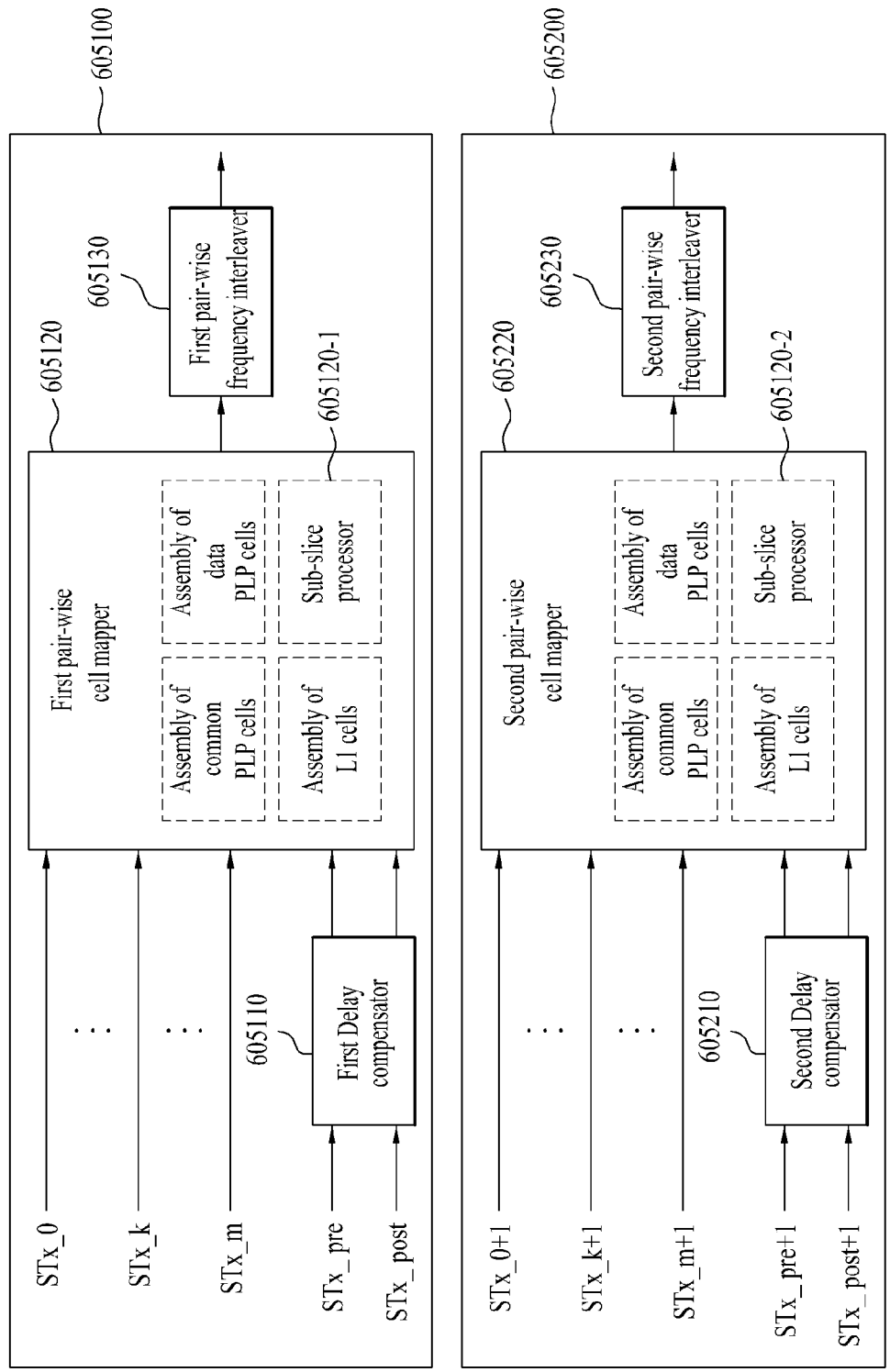
FIG. 13 illustrates a block diagram showing a frame builder according to an embodiment of the present invention.

FIG. 13 is a block diagram of a frame builder according to an embodiment of the present invention.

The frame builder illustrated in FIG. 13 is applicable to both the first and second embodiments and the following description is given in the context of the first embodiment.

As described before, the first BICM encoding block 604100 may output MISO PLP data in the two paths STX_k and STX_k+1 and the second BICM encoding block 604200 may output MIMO PLP data in the two paths STX_m and STX_m+1. The third BICM encoding block 604300 may output each of L1-presignaling information and L1-post signaling information in the two paths STX_pre and STX_pre+1 or STX_post and STX_post+1.

Each data is input to the frame builder. In this case, the frame builder may receive BICM encoder output data in the first path being the paths STX_0 to STX_post and in the second path being the paths STX_0+1 to STX_post+1, as illustrated in FIG. 13. The data received through the first path may be transmitted through a first antenna Tx_1 and the data received through the second path may be transmitted through a second antenna Tx_2.

As illustrated in FIG. 13, the frame builder according to the first embodiment of the present invention may include a first frame building block 605100 for processing the data received through the first path and a second frame building block 605200 for processing the data received through the second path. The first frame building block 605100 may include a first delay compensator 605110, a first pair-wise cell mapper 605120, and a first pair-wise frequency interleaver 605130. The second frame building block 605200 may include a second delay compensator 605210, a second pair-wise cell mapper 605220, and a second pair-wise frequency interleaver 605230.

The first pair-wise cell mapper 605120 and the first pair-wise frequency interleaver 605130 and the second pair-wise cell mapper 605220 and the second pair-wise frequency interleaver 605230 may be identically operated with respect to each of the first path and the second path and may also be independently operated.

Hereinafter, the data processing method of the blocks included in each of the first frame building block 605100 and the second frame building block 605200 will be described in detail.

The first delay compensator 605110 and the second delay compensator 605210 compensates for both the delay by one transmission frame applied to the L1-pre-signaling data or L1-post-signaling data and the delay caused by the encoding process of the BICM module. The L1 signaling information may include the information on the current transmission frame as well as the information on the next transmission frame. Therefore, during the above-described input processing procedure, the L1 signaling information is delayed by one frame as compared to the PLP data, which are currently being inputted. By performing this procedure, one transmission frame may be capable of transmitting the L1 signaling information including information on the current transmission frame and information on the next transmission frame.

The first pair-wise cell mapper 605120 and the second pair-wise cell mapper 605220 map respectively map the symbol unit PLP data and the L1 signaling data, which are inputted through each path, in cell units to the subcarrier of the OFDM symbol within the transmission frame.

In this case, the PLP data being inputted through each path may include common PLP data and MISO-MIMO-encoded PLP data. And, a sub-slice processor modules 605120-1~2 may perform sub-slicing on the PLP data cells and map the sub-sliced PLP data cells to the transmission frame, so as to gain diversity.

Additionally, the first pair-wise cell mapper 605120 and the second pair-wise cell mapper 605220 may pair 2 consecutive input cells and may map the paired cells to the transmission frame.

In order to increase the MISO signal recovery performance of the receiver, when performing MISO encoding, the MISO transmission channel is required to ensure coherence between the channels. Accordingly, in order to ensure coherence between the channels, the first pair-wise cell mapper 605120 and the second pair-wise cell mapper 605220 may respectively pair cells, which are generated from the same PLP data, and may map the paired cells to the subcarrier of the OFDM modulation, thereby maximizing the coherence between the channels.

Moreover, as described above, when bit interleaving or time interleaving is performed by the bit interleaver 604120 and the time interleaver 604160 by using two FEC blocks, since the two input cells that are grouped to form a pair may be generated from different FEC blocks, the receiver may be capable of ensuring diversity and may gain high reception performance. The first pair-wise frequency interleaver 605130 and the second pair-wise frequency interleaver 605230 may perform frequency interleaving in cell units on the data being inputted through each path. Then, the first pair-wise frequency interleaver 605130 and the second pair-wise frequency interleaver 605230 may output the frequency interleaved data to the OFDM generator through each path.

In this case, the first pair-wise frequency interleaver 605130 and the second pair-wise frequency interleaver 605230 may group 2 consecutive input cells in pairs and may process each cell pair as a single interleaving unit, thereby performing frequency interleaving. This is for maximizing the coherence between the channels.

FIG. 14 illustrates a block diagram showing a broadcast signal receiving apparatus according to an embodiment of the present invention.

In the present invention, the broadcast signal receiving apparatus may be referred to as a broadcast signal receiver or a receiver.

The broadcast signal receiving apparatus according to the present invention may include an OFDM demodulator 138100, a frame demapper 138200, a BICM decoder 138300, and an output processor 138400. The OFDM demodulator 138100, the frame demapper 138200, the BICM decoder 138300, and the output processor 138400 illustrated in FIG. 14 may perform the operations of the OFDM generator 10040, the frame builder 100300, the BICM module 100200, and the input-preprocessor 100100 in a reverse order.

The frame demapper 138200 may also be referred to as a frame parser. The OFDM demodulator 138100 converts time domain signals to frequency domain signals. Herein, the time domain signals correspond to signals being received through multiple reception antennae and then being converted to digital signals. Among the signals being converted to frequency domain signals, the frame demapper 138200 outputs the PLPs designated to required services. The BICM decider 138300 corrects errors that occur due to the transmission channel, and the output processor 138300 performs procedures required for generating an output TS or IP or GS stream.

Figure 15:
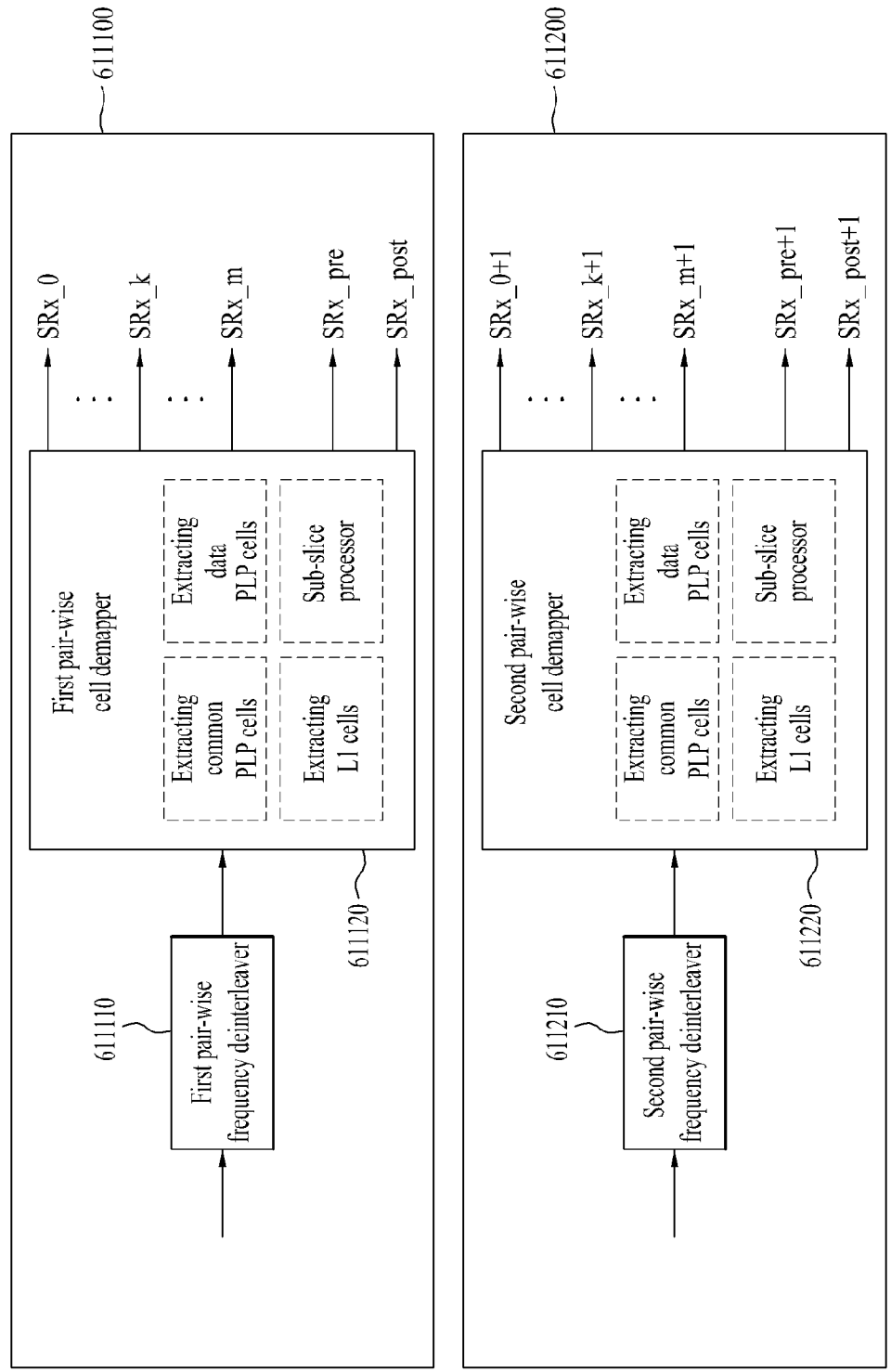
FIG. 15 illustrates a block diagram showing a frame demapper according to an embodiment of the present invention.

FIG. 15 is a block diagram of a frame demapper according to an embodiment of the present invention.

The frame demapper illustrated in FIG. 15 is applicable to both the afore-described first and second embodiments. The frame demapper may perform the operation of the frame builder illustrated in FIG. 13 in a reverse order. The following description will be given in the context of the first embodiment.

Referring to FIG. 15, the frame demapper according to the first embodiment of the present invention may include a first frame demapping block 611100 for processing data received through the first path and a second frame demapping block 611200 for processing data received through the second path. The first frame demapping block 611100 may include a first pair-wise frequency deinterleaver 611110 and a first pair-wise cell demapper 611120, and the second frame demapping block 611200 may include a second pair-wise frequency deinterleaver 611210 and a second pair-wise cell demapper 611220.

The first pair-wise frequency deinterleaver 611110 and the first pair-wise cell demapper 611120 may operate independently in the same manner with respect to the first path as the second pair-wise frequency deinterleaver 611210 and the second pair-wise cell demapper 611220 operate with respect to the second path.

Methods for processing data in blocks included in the first and second frame demapping blocks 611100 and 611200 will be described below.

The first and second pair-wise frequency deinterleavers 611110 and 611210 may deinterleave the data received through the first and second paths on a cell basis in the frequency domain. In this case, the first and second pair-wise frequency deinterleavers 611110 and 611210 may perform frequency deinterleaving by pairing two consecutive cells and using the pair as one deinterleaving unit. The deinterleaving is the reverse operation of the interleaving performed in the transmitter. The frequency-deinterleaved data is recovered in the original data order and then output.

The first and second pair-wise cell demappers 611120 and 611220 may extract common PLP data, PLP data, and L1-signaling information on a cell basis from the deinterleaved data. The extracted PLP data may include MISO PLP data to be processed in MISO and MIMO PLP data to be processed in MIMO. The extracted L1-signaling data may include information about a current transmission frame and the following transmission frame. In addition, if the transmitter performs subslicing on the PLP data, the first and second pair-wise cell demappers 611120 and 611220 may generate one stream by merging sliced PLP data.

The first and second pair-wise cell demappers 611120 and 611220 may extract two consecutive cells as a pair.

The extracted data, that is, data output through the first path may be input to the BICM decoder through paths SRx_0 to SRx_post and data output through the second path may be input to the BICM decoder through paths SRx_0+1 to SRx_post+1.

Figure 16:
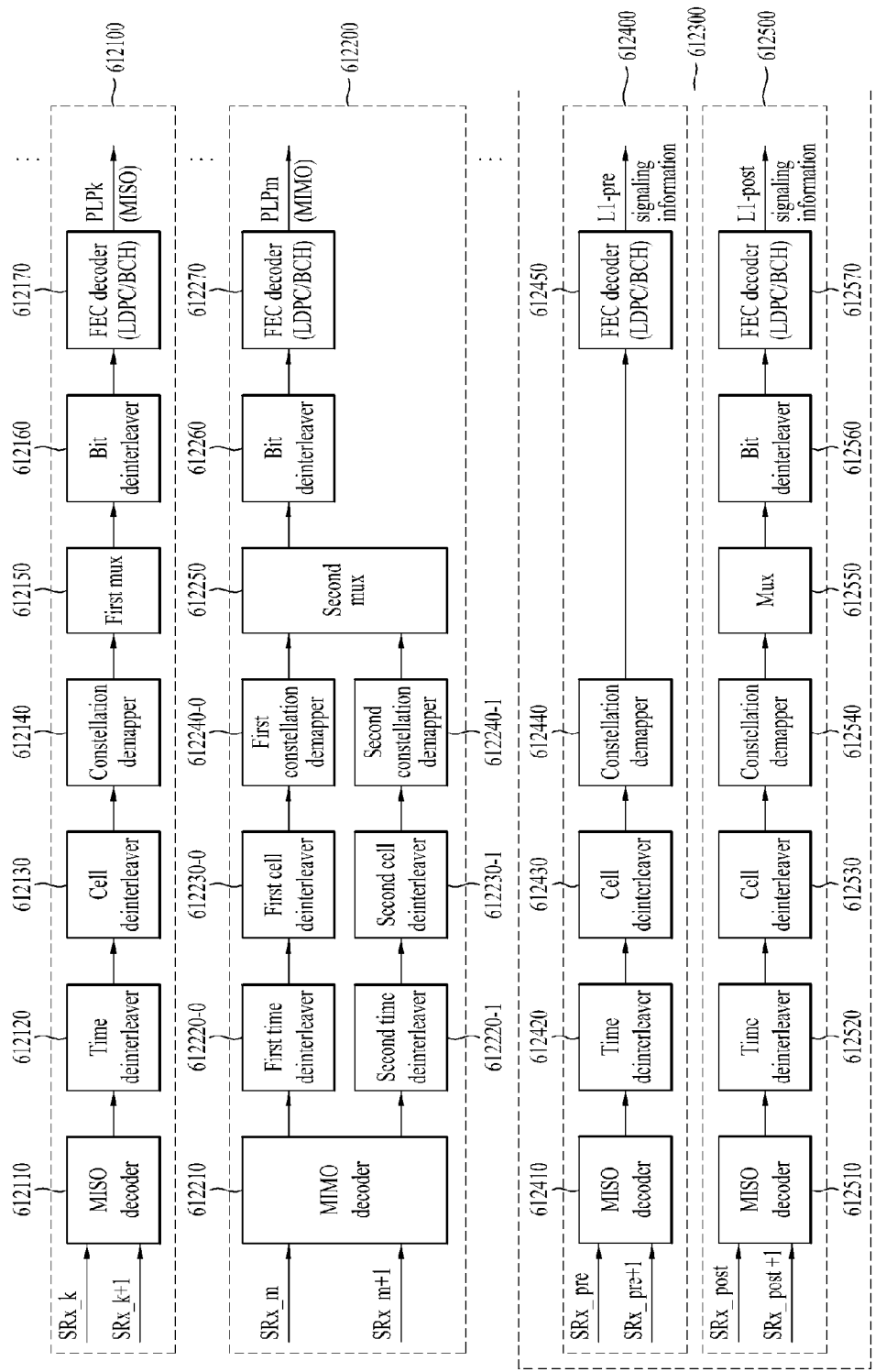
FIG. 16 illustrates a block diagram showing a BICM decoder according to an embodiment of the present invention.

FIG. 16 is a block diagram of a BICM decoder according to an embodiment of the present invention.

The BICM decoder according to the first embodiment of the present invention may receive the data output through the first path from the frame demapper through the paths SRx_0 to SRx_post and may receive the data output through the second path from the frame demapper through the paths SRx_0+1 to SRx_post+1. Then the BICM decoder may perform BICM decoding on the received data.

Further, the BICM decoder according to the first embodiment of the present invention may apply the MISO scheme or MIMO scheme dependently to the data received through each path.

That is, the BICM decoder of FIG. 13 may include a first BICM decoding block 612100 for receiving MISO PLP data to be MISO-processed through two paths SRx_k and SRx_k+1 and processing the MISO PLP data, a second BICM decoding block 612200 for receiving MIMO PLP data to be MIMO-processed through two paths SRx_m and SRx_m+1 and processing the MIMO PLP data, and a third BICM decoding block 612300 for receiving L1-signaling data to be MISO-processed through four paths SRx_pre, SRx_pre+1, SRx_post, and SRx_post+1 and processing the L1-signaling data.

The BICM decoder according to the first embodiment of the present invention may perform the operation of the BICM encoder of FIG. 11 according to the first embodiment of the present invention in a reverse order.

Now a description will be given of a method for processing data in each block.

The first BICM decoding block 612100 may include an MISO decoder 612110, a time deinterleaver 612120, a cell deinterleaver 612130, a constellation demapper 612140, a first MUX 612150, a bit deinterleaver 612160, and an FEC decoder 612170.

The MISO decoder 612110 may perform MISO decoding on MISO PLP data. The MISO decoder 612110 of the present invention may perform 4 different operations. Each operation will hereinafter be described.

First of all, when the channel estimation modules 610800-1~2 included in the OFDM demodulator do not perform channel equalization, the MISO decoder 612110 may apply a channel estimation effect on all reference points that can be transmitted, thereby being capable of calculating an LLR value. Accordingly, the same effect as channel equalization may be gained.

Secondly, the MISO decoder 612110 may perform the following operations in accordance with the operations of the constellation mapper, which is included in the BICM encoder of the broadcast signal transmitter. When the constellation mapper, which is included in the BICM encoder of the broadcast signal transmitter, rotates the constellation by a predetermined angle, and delays only the Q-phase element of the constellation by an arbitrary value, the MISO decoder 612110 may delay only the I-phase element of the constellation by an arbitrary value and may calculate the 2D-LLR value based upon the constellation rotation angle.

According to another embodiment of the present invention, when the constellation mapper, which is included in the BICM encoder of the broadcast signal transmitter, does not rotate the constellation, and does not delayed only the Q-phase element of the constellation by the arbitrary value, the MISO decoder 612110 may be capable of calculating the 2D-LLR value based upon a normal QAM.

Thirdly, the MISO decoder 612110 may select a decoding matrix, so that an inverse process of the MISO encoder, which is included in the BICM encoder of the broadcast signal transmitter, can be performed in accordance with the encoding matrix used by the MISO encoder. And, then, the MISO decoder 612110 may perform MISO decoding.

Finally, the MISO decoder 612110 may merge signals, which are received through 2 reception antennae. The signal merging method according to the present invention may include maximum ratio combining, equal gain combining, selective combining, and so on. In this case, the MISO decoder 612110 may maximize the SNR of the merged signal, so as to gain a diversity effect.

Additionally, the MISO decoder 612110 may perform MISO decoding on a signal, which is processed with signal merging. Then, after performing MISO decoding on the input of the two antennae, the MISO decoder 612110 may merge the MISO decoded signals.

The time deinterleaver 612120 performs deinterleaving in a time domain on the MISO-decoded data so as to recover the data to the initial position, and the cell deinterleaver 612130 may perform deinterleaving on the time-deinterleaved data in cell units.

The constellation demapper 612140 may perform the following functions in accordance with the operations of the MISO decoder 612110.

First of all, in case the MISO decoder 612110 performs only MISO-decoding without directly outputting the LLR value, the constellation demapper 612140 may calculate the LLR value. More specifically, a detailed description will hereinafter be made. When constellation rotation and Q-phase element delay are performed by the constellation demapper, which is included in the BICM encoder of the broadcast signal transmitting apparatus, the constellation demapper 612140 may first delay an I-phase element and may then calculate the LLR value. If the constellation demapper, which is included in the BICM encoder of the broadcast signal transmitting apparatus, does not perform constellation rotation and Q-phase element delay, the constellation demapper 612140 may calculate an LLR value based upon a normal QAM standard.

The method for calculating the LLR value may include a method for calculating a 2-D LLR and a method for calculating a 1-D LLR value. In case of calculating the 1-D LLR value, any one of the input to the first path and the input to the second path is performed, so as to reduce the complexity in the LLR calculation.

The first mux 612150 may recover the demapped data to a bit stream format.

The bit deinterleaver 612160 performs deinterleaving on the inputted bit stream, and the FEC decoder 612170 performs FEC-decoding on the data processed with deinterleaving, so as to perform error correction over the transmission channel, thereby outputting the MISO PLP data.

The second BICM decoding block 612200 may include an MIMO decoder 612210, a first time deinterleaver 612220-0 and a second time deinterleaver 612220-1, a first cell deinterleaver 612230-0 and a second cell deinterleaver 612230-1, a first constellation demapper 612240-0 and a second constellation demapper 612240-1, a second mux 612250, a bit deinterleaver 612260, and an FEC decoder 612270.

The MIMO decoder 612210 may perform MIMO decoding on the MIMO PLP data received through the two paths SRx_m and SRx_m+1. The MIMO decoder 612210 may perform the other operations except for the fourth operation, that is, signal combining among four operations of the MISO decoder 612110 in the same manner as the MISO decoder 612110.

The first time deinterleaver 612220-0 and the second time deinterleaver 612220-1 may perform deinterleaving in a time domain on the MIMO decoded data in cell units, so as to recover data by the initial (or original) data order. In this case, the first cell deinterleaver 612230-0 and the second cell deinterleaver 612230-1 may perform cell deinterleaving only on the data corresponding to half the size of a cell included in an FEC block, among the data being inputted through each path. Eventually, the cell deinterleaving performed by the first cell deinterleaver 612230-0 and the second cell deinterleaver 612230-1 may have the same effect as the deinterleaving performed by the MISO type cell deinterleaver 612130 by using one FEC block.

The first constellation demapper 612240-0, the second constellation demapper 612240-1, the second mux 612250, the bit deinterleaver 612260, and the FEC decoder 612270 may perform the same functions as the MISO method.

The third BICM decoding block 612300 includes a first decoding block 612400 for processing L1-pre-signaling data and a second decoding block 612500 for processing L1-post-signaling data.

The first decoding block 612400 may include an MIMO decoder 612410, a time deinterleaver 612420, a cell deinterleaver 612430, a constellation demapper 612440, and an FEC decoder 612450, and the second decoding block 612500 may include an MIMO decoder 612510 a time deinterleaver 612520, a cell deinterleaver 612530, a constellation demapper 612540, a mux 612550, a bit deinterleaver 612560, and an FEC decoder 612570.

Hereinafter, since the functions of each block included in the first decoding block 612400 and the second decoding block 612500 are identical to the respective blocks included in the first BICM decoding block 612100, a detailed description of the same will be omitted.

Eventually, the first BICM decoding block 612100 may output the BICM-decoded MISO PLP data to the output processor, and the second BICM decoding block 612200 may output the BICM-decoded MIMO PLP data to the output processor. Also, the first decoding block 612400 included in the third BICM decoding block 612300 may perform MISO decoding on L1-pre-signaling data to output L1-pre-signaling information, and the second decoding block 612500 of the third BICM decoding block 612300 may perform MISO decoding on L1-post-signaling data to output single L1-post-signaling information.

Figure 17:
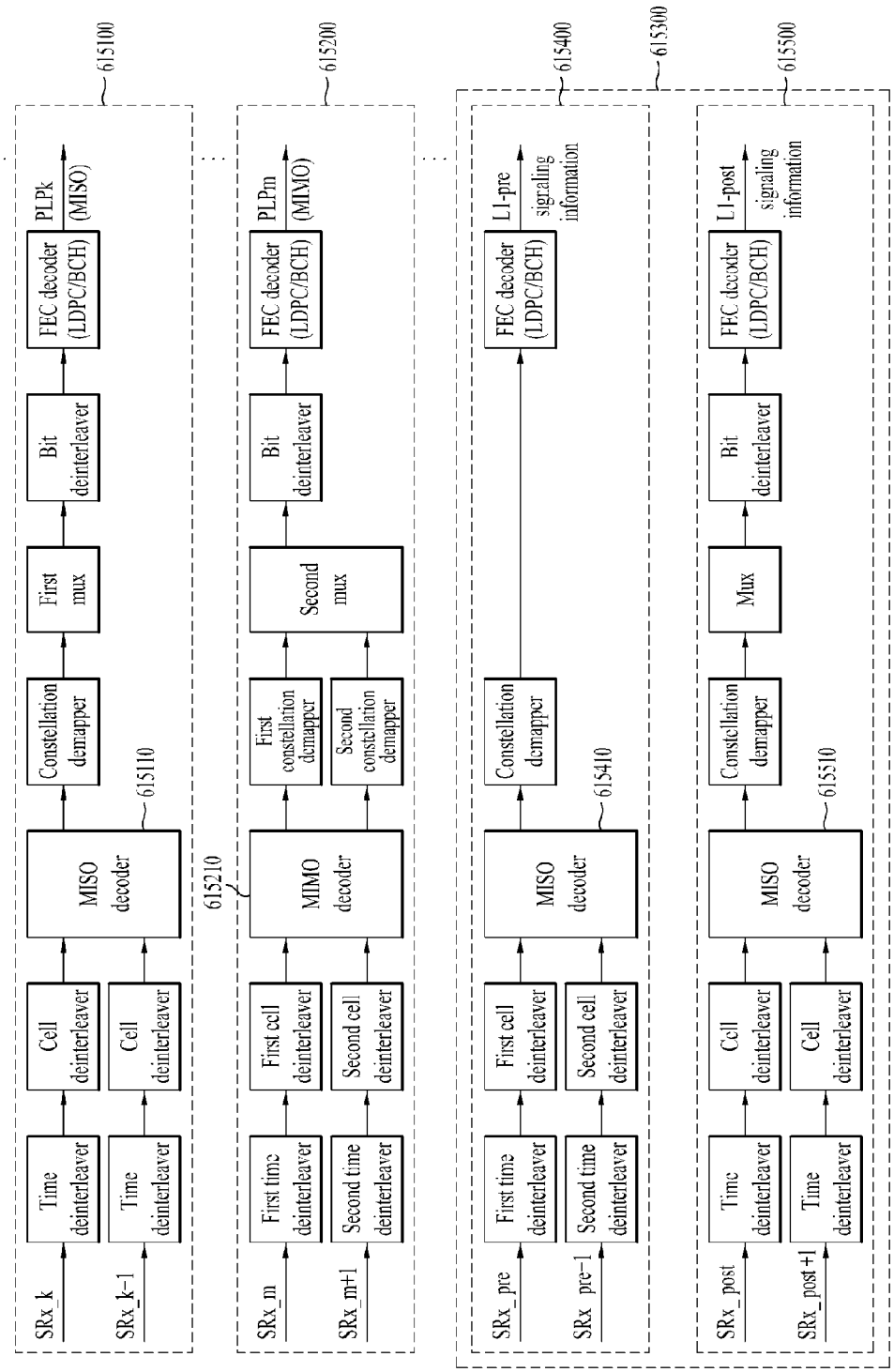
FIG. 17 illustrates a block diagram showing a BICM decoder according to another embodiment of the present invention.

FIG. 17 illustrates a block diagram showing a BICM decoder according to another embodiment of the present invention.

The BICM decoder according to a second embodiment of the present invention receives data SRx_0 to SRx_post output through the first path from the frame demapper and data SRx_0+1 to SRx_post+1 output through the second path from the frame demapper. Furthermore, the BICM decoder according to a second embodiment of the present invention may apply independently the MISO method or the MIMO method on the data being inputted from each path.

That is, the BICM decoder of FIG. 17 includes a first BICM decoding block 615100 receiving MISO PLP data to which the MISO method is applied from 2 paths (SRx_k, SRx_k+1) and processing the received MISO PLP data, a second BICM decoding block 615200 receiving MIMO PLP data to which the MIMO method is applied from 2 paths (SRx_m, SRx_m+1) and processing the received MIMO PLP data, and a third BICM decoding block 615300 receiving L1 signaling data from 4 paths (SRx_pre, SRx_pre+1, SRx_post, SRx_post+1) and processing the received L1 signaling data.

Moreover, the third BICM decoding block 615300 may include a first decoding block 615400 for processing L1-pre-signaling data and a second decoding block 615500 for processing L1-post-signaling data.

In addition, the BICM decoder according to a second embodiment of the present invention may perform inverse operation processes of the BICM encoder according to the second embodiment shown in FIG. 14.

The BICM decoding blocks of FIG. 17 according to the second embodiment operate in the same manner as the BICM decoding blocks of FIG. 16 according to the first embodiment and thus they will not be described in detail. However, the BICM decoder according to the second embodiment differs from the BICM decoder according to the first embodiment in that MISO decoders 615110, 615410, and 615510 and an MIMO decoder 615210 are disposed at the rear end of cell deinterleavers.

As described before with reference to FIG. 12, because the BICM decoder according to the second embodiment performs MISO/MIMO decoding after performing time deinterleaving and cell deinterleaving on a symbol basis, the memory complexity of the broadcast signal receiver can be reduced.

Consequently, the first BICM decoding block 615100 may output the BICM-decoded MISO PLP data to the output processor and the second BICM decoding block 615200 may output the BICM-decoded MIMO PLP data to the output processor. The first decoding block 615400 of the third BICM decoding block 615300 may output L1-presignaling information by performing MISO decoding on the L1-presignaling data. The second decoding block 615500 of the third BICM decoding block 615300 may output L1-post signaling information by performing MISO decoding on the L1-post signaling data.

Hereinafter, a signaling method of the signaling method according to the present invention will be described in detail.

The signal frame according to the present invention may be divided into a preamble region and a data region, and the preamble region may be configured of a P1 symbol and one or more P2 symbols, and the data region may be configured of multiple data symbols. At this point, the preamble region may further include an AP1 symbol after the P1 symbol. And, in this case, the P1 symbol and the AP1 symbol may be consecutively transmitted.

Herein, the P1 symbol transmits P1 signaling information, the AP1 symbol transmits AP1 signaling information, and the one or more P2 symbol each transmits L1 signaling information and signaling information included in the common PLP (i.e., L2 signaling information). The signaling information being included in the common PLP may be transmitted through a data symbol. Therefore, in light of a signal frame over a physical layer, the preamble region may include a P1 signaling information region to which the P1 signaling information is signaled, an L1 signaling information region to which the L1 signaling information is signaled, and an entire portion or a partial portion of a common PLP region to which the L2 signaling information is signaled. Herein, the common PLP region may also be referred to as an L2 signaling information region and the common PLP may be included in the L2 signaling information region. If a signal frame includes an AP1 symbol, the preamble region includes the P1 signaling information region, the AP1 signaling information region, the L1 signaling information region, and an entire portion or a partial portion of the common PLP region.

The L1 signaling information includes L1-pre-signaling information and L1-post-signaling information. The L1-post-signaling information then includes Configurable L1-post-signaling information, Dynamic L1-post-signaling information, Extension L1-post-signaling information, and CRC information, and may further include L1 padding data.

FIG. 18 illustrates an exemplary syntax structure of P1 signaling information according to an embodiment of the present invention.

According to the embodiment of the present invention, in FIG. 18, the P1 signaling information is assigned with 7 bits and includes a 3-bit S1 field and a 4-bit S2 field. In the S2 field, among the 4 bits, the first 3 bits are described as S2 field1 and the 1 bit is described as S2 field2.

The S1 field signals a preamble format. For example, when the S1 field value is equal to 000, this indicates that the preamble corresponds to a T2 preamble, and that data are transmitted in an SISO format (T2_SISO). When the S1 field value is equal to 001, this indicates that the preamble corresponds to a T2 preamble, and that data are transmitted in an MISO format (T2_MISO). When the S1 field value is equal to 010, this indicates that the preamble corresponds to a non-T2 preamble.

The S2 field signals FFT size information. According to the embodiment of the present invention, the FFT size may correspond to 1 k, 2 k, 4 k, 8 k, 16 k, and the GI size may correspond to 1/128, 1/32, 1/16, 19/256, 1/8, 19/128, 1/4. The FFT size signifies a number of subcarriers configuring a single OFDM symbol. When the S2 filed2 value is equal to 0, this indicates that, in the current transmission, all preambles are being transmitted as the same type, and when the field value is equal to 1, this indicates that the preambles are each transmitted as different types.

FIG. 19 illustrates an exemplary syntax structure of AP1 signaling information according to an embodiment of the present invention.

According to the embodiment of the present invention, in FIG. 19, the AP1 signaling information is assigned with 7 bits and includes a 4-bit PILOT_PATTERN field and a 3-bit L1_PRE_SPREAD_LENGTH field.

The PILOT_PATTERN field indicates a pilot pattern of the corresponding signal frame. In the present invention, by transmitting pilot pattern information through the AP1 symbol, even when the P2 symbol is not transmitted, and even when the L1 signaling information is spread to data symbols of the data region, the receiver may be aware of the pilot pattern prior to decoding the L1 signaling information of the data region.

The L1 PRE_SPREAD_LENGTH field indicates a length of a section within the data region in which the L1-pre-signaling information is spread. More specifically, among the data symbols of the signal frame, this field indicates a number of data symbols included in a section to which the L1-pre-signaling information is being spread. In the present invention, the section to which the L1-pre-signaling information is being spread will be referred to as an L1 pre spread section. If the L1_PRE_SPREAD_LENGTH field value is equal to '000', this indicates that the L1 signaling information is not spread in the data region of the corresponding signal frame.

In FIG. 19, since the fields included in the AP1 signaling information and significance of the values of each field are merely examples given to facilitate the understanding of the present invention, and since the fields that can be included in the AP1 signaling information and the significance of the respective field values may be easily modified by anyone skilled in the art, the present invention will not be limited only to the examples given herein.

FIG. 20 illustrates an exemplary syntax structure of L1-pre-signaling information according to an embodiment of the present invention.

The L1-pre-signaling information includes information required for decoding the L1-post-signaling information.

The fields being included in the L1-pre-signaling information of FIG. 20 will hereinafter be described in detail.

A TYPE field may be assigned with 8 bits and may indicate the type of an input stream being transmitted in a super frame. More specifically, the input stream may correspond to TS, GS, TS+GS, IP, and so on, and such identification may use the TYPE field.

A BWT_EXT field is assigned with 1 bit and may indicate whether or not a bandwidth extension of an OFDM symbol is to be performed.

An S1 field is assigned with 3 bits and performs the same role as the S1 field included in the P1 signaling information of FIG. 18. An S2 field is assigned with 4 bits and performs the same role as the S2 field included in the P1 signaling information of FIG. 18. According to the embodiment of the present invention, an L1_REPETITION_FLAG field is assigned with 1 bit and may indicate whether or not L1-post-signaling information related to the current frame is signaled to the P2 symbol. If the L1 signaling information of the next signal frame is configured to have a structure to which the data symbols of the current signal frame are spread, the L1_REPETITION_FLAG field may also be used in order to indicate whether or not the L1 signaling information of the next signal frame has been spread to the current signal frame. For example, when the L1_REPETITION_FLAG field is equal to 1, this indicates that the L1 signaling information has been spread to the current signal frame, and when the corresponding field is equal to 0, this indicates that the L1 signaling information has not been spread to the current signal frame.

A GUARD_INTERVAL field is assigned with 3 bits and indicates a GI size of the current transmission frame. The GI size indicates an occupation ratio of the GI within a single OFDM symbol. Accordingly, the OFDM symbol length may vary depending upon the FFT size and the GI size.

A PAPR field is assigned with 4 bits and indicates a PAPR reduction method. The PAPR method used in the present invention may correspond to an ACE method or a TR method.

An L1_MOD field is assigned with 4 bits and may indicate a QAM modulation type of the L1-post-signaling information.

An L1_COD field is assigned with 2 bits and may indicate a code rate of the L1-post-signaling information.

An L1_FEC_TYPE field is assigned with 2 bits and may indicate an FEC type of the L1-post-signaling information.

An L1_POST_SIZE field is assigned with 18 bits and may indicate the size of the coded and modulated L1-post-signaling information.

An L1_POST_INFO_SIZE field is assigned with 18 bits and may indicate the size of the L1-post-signaling information in bit units.

A PILOT_PATTERN field is assigned with 4 bits and may indicate a distributed pilot pattern that is inserted in the current signal frame.

A TX_ID_AVAILABILITY field is assigned with 8 bits and may indicate a transmitting apparatus identification capability within the current geographical cell range.

A CELL_ID field is assigned with 16 bits and may indicate an identifier identifying a geographical cell within a network for mobile broadcasting (NGH).

A NETWORK_ID field is assigned with 16 bits and may indicate an identifier identifying the current network.

A SYSTEM_ID field is assigned with 16 bits and may indicate an identifier identifying the system.

A NUM_NGH_FRAMES field is assigned with 8 bits and may indicate a number of NGH frame within the current super frame.

A NUM_T2_FRAMES field is assigned with 8 bits and may indicate a number of T2 frame within the current super frame. This field is useful for determining the super frame structure and may be used for calculating the information for directly hopping to the next NGH frame.

A L1_POST_SPREAD_LENGTH field is assigned with 12 bits and may indicate the length of a section within the data region to which the L1-post-signaling information is being spread. More specifically, among the data symbols of the signal frame, this field may indicate the number of data symbols being included in the section to which the L1-post-signaling information is being spread. In the present invention, the section to which the L1-post-signaling information is being spread will be referred to as an L1 post spread section. If all of the L1 POST_SPREAD_LENGTH field value is equal to 0, this signifies that the L1-post-signaling information is not spread to the data region of the corresponding signal frame.

A NUM_DATA_SYMBOLS field is assigned with 12 bits and may indicate a number of data symbols included in the current signal frame, with the exception for the P1, AP1, P2 symbols.

A NUM_MISO_SYMBOLS field is assigned with 12 bits and may indicate a number of MISO symbols among the diverse data symbols.

An MIMO_SYMBOL_INTERVAL field is assigned with 12 bits and may indicate a number of MISO symbols between two MIMO symbol parts.

An MIMO_SYMBOL_LENGTH field is assigned with 12 bits and may indicate a number of MIMO symbols in one MIMO symbol part.

A REGEN_FLAG field is assigned with 3 bits and may indicate and may indicate a number of signal regeneration performed by the repeater.

An L1_POST_EXTENSION field is assigned with 1 bit and may indicate whether or not an extension field exits in the L1-post-signaling information.

A NUM_RF field is assigned with 3 bits and may indicate a number of RFs within the current system.

A CURRENT_RF_IDX field is assigned with 3 bits and may indicate an index of the current RF channel.

A RESERVED field is assigned with 10 bits and corresponds to a field that is reserved for future usage.

A CRC-32 field is assigned with 32 bits and may indicate a CRC error extraction code of the 32 bits.

In FIG. 20, since the fields included in the L1-pre-signaling information and significance of the values of each field are merely examples given to facilitate the understanding of the present invention, and since the fields that can be included in the L1-pre-signaling information and the significance of the respective field values may be easily modified by anyone skilled in the art, the present invention will not be limited only to the examples given herein.

FIG. 21 illustrates an exemplary syntax structure of configurable L1-post-signaling information according to an embodiment of the present invention.

The configurable L1-post-signaling information may include parameters required by the receiver for decoding a PLP and, more particularly, configurable L1-post-signaling information may include diverse information that can be equally applied during a signal frame.

The fields being included in the configurable L1-post-signaling information of FIG. 21 will hereinafter be described in detail.

A SUB_SLICES_PER_FRAME field is assigned with 15 bits and may indicate a number of sub-slices included in a signal frame.

A NUM_PLP field is assigned with 8 bits and may indicate a number of PLPs within the current super frame.

A NUM_AUX field is assigned with 4 bits and may indicate a number of auxiliary streams.

An AUX_CONFIG_RFU field is assigned with 8 bits and corresponds to a region reserved for a future usage.

Subsequently, a "for loop" (hereinafter referred to as a frequency loop), which is repeated as many times as the number of RFs within the current system, is signaled. The NUM_RF field is signaled to the L1-pre-signaling information.

Hereinafter, fields being included in the frequency loop will be described in detail.

An RF_IDX field is assigned with 3 bits and may indicate an index of each frequency within an RF channel.

A FREQUENCY field is assigned with 32 bits and may indicate a center frequency of the RF channel.

An FEF_TYPE field, an FEF_LENGTH field, and an FEF_INTERVAL field, which are shown below, correspond to fields that are used only when the LSB of the S2 field is equal to 1, i.e., when the S2 field is expressed as S2='xxx1'.

The FEF_TYPE field is assigned with 4 bits and may indicate an FEF (Future extension frame) type.

The FEF_LENGTH field is assigned with 22 bits and may indicate a number of elementary periods of a related FEF part.

The FEF_INTERVAL field is assigned with 8 bits and may indicate a number of T2 frames existing between two FRF parts.

A NEXT_NGH_SUPERFRAME field is assigned with 8 bits and may indicate a number of super frames existing between the current super frame and the next super frame, which includes the next NGH frame.

A RESERVED_2 field is assigned with 32 bits and corresponds to a field that is reserved for a future usage.

Subsequently, a "for loop" (hereinafter referred to as an auxiliary stream loop), which is repeated as many times as the number of auxiliary streams (NUM_AUX field value-1), is signaled, a 32-bit AUX_RFU field, which is reserved for a future usage, is included herein.

Subsequently, a "for loop" (hereinafter referred to as a PLP loop), which is repeated as many times as the number of PLPs within the current super frame (NUM_PLP field value-1), is signaled.

Hereinafter, fields being included in the PLP loop will be described in detail.

A PLP_ID field is assigned with 8 bits and may indicate an identifier identifying the corresponding PLP.

A PLP_TYPE field is assigned with 3 bits and may indicate whether the corresponding PLP corresponds to a common PLP, a Type1 data PLP, or a Type2 data PLP. Additionally, the PLP_TYPE field may indicate whether the corresponding PLP corresponds to a PLP being included in a plurality of PLP groups, or to a group PLP being included in a single PLP group.

A PLP_PAYLOAD_TYPE field is assigned with 5 bits and may indicate the type of a PLP payload. More specifically, the data included in the payload of the PLP may correspond to GFPS, GCS, GSE, TS, IP, and so on, and such identification may use the PLP_PAYLOAD_TYPE field.

The PLP_PROFILE field is assigned with 2 bits and may indicate a profile of the corresponding PLP. More specifically, this field indicates whether the corresponding field is a mandatory (or required) PLP or an optional (or selective) PLP. For example, when the PLP of the video data is identified as a PLP for transmitting a base layer and a PLP for transmitting an enhancement layer, the PLP transmitting the base layer becomes the mandatory PLP, and the PLP transmitting the enhancement layer becomes the optional PLP. Additionally, the common PLP corresponds to a mandatory PLP. More specifically, depending upon the receiver characteristic, such as a mobile receiver, a fixed-type receiver, and so on, the receiver may use the PLP_PROFILE field so as to verify by which receiver the component of the broadcast service being transmitted to the current PLP may be used, and depending upon the receiver characteristic, the receiver may determine whether or not to receive the current PLP.

An FF_FLAG field is assigned with 1 bit and, when 2 or more RF channels are being used, this field may indicate a fixed frequency mode.

A FIRST_RF_IDX field is assigned with 3 bits and may indicate an RF index of a first signal frame of the corresponding PLP.

A FIRST_FRAME_IDX field is assigned with 8 bits and may indicate a frame index of the first signal frame of the corresponding PLP.

A PLP_GROUP_ID field is assigned with 8 bits and may indicate an identifier identifying a PLP group related to the corresponding PLP.

A PLP_COD field is assigned with 3 bits and may indicate the code rate of the corresponding PLP. In the present invention, any one of the code rates of ¼, ⅓, ⅖, ½, ⅗, ⅔, ¾, ⅘, ⅚ may be used in the corresponding PLP.

A PLP_MOD field is assigned with 3 bits and may indicate a constellation size (i.e., modulation format) of the corresponding PLP. In the present invention, any one of the modulation formats (or modulations types) of BPSK, QPSK, 16QAM, 64QAM, 256QAM may be used.

A PLP_MIMO_TYPE field is assigned with 2 bits and may indicate whether the corresponding PLP corresponds to an MIMO type or an MISO type.

For example, a PLP_MOD field value, i.e., the constellation size may be decided by a combination with the PLP_MIMO_TYPE field. If the PLP_MIMO_TYPE field value indicates the MISO, the PLP_MOD field may be used for symbol re-mapping. If the PLP_MIMO_TYPE field value indicates the MIMO, after performing MIMO processing, the PLP_MOD field may be interpreted as a constellation size having a spectrum effect, as a result of the MIMO processing.

A PLP_ROTATION field is assigned with 1 bit and may indicate whether or not constellation rotation and re-mapping of the PLP has been used.

A PLP_FEC_TYPE field is assigned with 2 bits and may indicate an FEC type of the corresponding PLP.

A PLP_NUM_BLOCKS_MAX field is assigned with 10 bits and may indicate a maximum number of PLPs included in the FEC blocks.

A FRAME_INTERVAL field is assigned with 8 bits and may indicate a T2 frame interval within a super frame, when inter-frame interleaving is applied.

A TIME_IL_LENGTH field is assigned with 8 bits and may indicate a time interleaver length (or depth).

A TIME_IL_TYPE field is assigned with 1 bit and may indicate the time interleaver type.

An IN_BAND_FLAG field is assigned with 1 bit and may indicate whether or not in-band signaling exists.

A RESERVED_1 field is assigned with 16 bits and corresponds to a field that is reserved in the PLP loop for a future usage.

The PLP loop may further include a PLP_COMPONENT_TYPE field. The PLP_COMPONENT_TYPE field is assigned with 8 bits and may indicate the type of data (or service component) being transmitted through the corresponding PLP. Therefore, based upon the PLP_COMPONENT_TYPE field, the receiver may be capable of determining whether the type of the component being transmitted through the corresponding PLP corresponds to base layer video component, an enhancement layer video component, an audio component, or a data component.

According to an embodiment of the present invention, the PLP group may also be referred to as an LLP (Link-Layer-Pipe), and the PLP_GROUP_ID field may also be referred to as an LLP_ID field. Most particularly, an NIT, which is to be described later on, includes a PLP_GROUP_ID field, which is identical to the PLP_GROUP_ID field included in the L1 signaling information. And, the NIT may also include a transport_stream_id field for identifying a transmission stream related to the PLP group. Therefore, by using the NIT, the receiver may be capable of knowing to which PLP group a specific stream is related. More specifically, in order to simultaneously decode streams (e.g., TSs) being transmitted through PLPs having the same PLP_GROUP_ID, the streams that are indicated by the transport_stream_id field of the NIT may be merged, thereby being capable of recovering a single service stream.

If the broadcast signal is transmitted in an IP format, the receiver may use the PLP_GROUP_ID field, so as to locate and find the service components related to a single service. And, by merging such service components, a single service may be recovered. Accordingly, the receiver should be capable of simultaneously receiving PLPs having the same PLP_GROUP_ID.

In FIG. 21, since the fields included in the configurable L1-post-signaling information and significance of the values of each field are merely examples given to facilitate the understanding of the present invention, and since the fields that can be included in the configurable L1-post-signaling information and the significance of the respective field values may be easily modified by anyone skilled in the art, the present invention will not be limited only to the examples given herein.

FIG. 22 illustrates an exemplary syntax structure of dynamic L1-post-signaling information according to an embodiment of the present invention.

The dynamic L1-post-signaling information may include parameters required by the receiver for decoding a PLP and, more particularly, the dynamic L1-post-signaling information may include characteristic information corresponding to a signal frame that is currently being transmitted. Additionally, the dynamic L1-post-signaling information may also be signaled to an in-band, so that that the receiver can efficiently process slicing.

The fields being included in the dynamic L1-post-signaling information of FIG. 22 will hereinafter be described in detail.

A FRAME_IDX field is assigned with 8 bits and may indicate an index of a current signal frame within the super frame. For example, an index of the first signal frame within the super frame may be set to 0.

A SUB_SLICE_INTERVAL field is assigned with 22 bits and may indicate a number of OFDM cell existing between two sub-slices within the same PLP.

A TYPE_2_START field is assigned with 22 bits and may indicate a starting position among the OFDM cells of the Type2 data PLPs.

An L1_CHANGE_COUNTER field is assigned with 8 bits and may indicate a number of super frame that remain before the L1 configuration (e.g., contents of the fields included in the L1 pre signaling or content of a configurable part in the L1 post signaling).

A START_RF_IDX field is assigned with 3 bits and may indicate a start RF index of a next signal frame.

A RESERVED_1 field is assigned with 8 bits and corresponds to a field that is reserved for a future usage.

A NEXT_NGH_FRAME field is assigned with 8 bits and corresponds to a field that is used only when the LSB of the S2 field is equal to 1, i.e., when the S2 field is expressed as S2='xxx1'. A NEXT_NGH_SUPERFRAME field indicates a number of T2 or FEF frames existing between the first T2 frame within the next super frame, which includes an NGH frame, and the next NGH frame. The NEXT_NGH_FRAME field and the NEXT_NGH_SUPERFRAME field may be used by the receiver for calculating a hopping amount for hopping to the next NGH frame. More specifically, the NEXT_NGH_FRAME field and the NEXT_NGH_SUPERFRAME field provide an efficient hopping mechanism, when a large number of T2 frames are mixed with the FEF, and when not all of the FEFs are used only for the NGH frames. Most particularly, the receiver may perform hopping to the next NGH frame without having to detect the P1 signaling information of all signal frames existing in the super frame and to decode the detected P1 signaling information.

Subsequently, a "for loop" (hereinafter referred to as a PLP loop), which is repeated as many times as the number of PLPs existing within the current super frame (NUM_PLP field value-1), is signaled.

A PLP_ID field, a PLP_START field, and a PLP_NUM_BLOCKS field are included in the PLP loop. And, each field will hereinafter be described in detail.

The PLP_ID field is assigned with 8 bits and may indicate an identifier identifying a PLP.

The PLP_START field is assigned with 22 bits and may indicate a starting position of OFDM cells of the current PLP.

The PLP_NUM_BLOCKS field is assigned with 10 bits and may indicate a number of FEC blocks related to the current PLP.

A RESERVED_2 field is assigned with 8 bits and corresponds to a field included in the PLP loop that is reserved for a future usage.

A RESERVED_3 field is assigned with 8 bits and corresponds to a field that is reserved for a future usage.

Field included in an auxiliary stream loop will hereinafter be described.

Subsequently, a "for loop" (hereinafter referred to as an auxiliary stream loop), which is repeated as many times as the number of auxiliary streams (NUM_AUX field value-1), is signaled, and a 48-bit AUX_RFU field is included herein for a future usage.

In FIG. 22, since the fields included in the dynamic L1-post-signaling information and significance of the values of each field are merely examples given to facilitate the understanding of the present invention, and since the fields that can be included in the dynamic L1-post-signaling information and the significance of the respective field values may be easily modified by anyone skilled in the art, the present invention will not be limited only to the examples given herein.

Meanwhile, the present invention may signal a PLP or a correlation between a PLP and service components, by using at least one of the PLP_GROUP_ID field, the PLP_TYPE field, and the PLP_COMPONENT_TYPE field of the PLP loop within the configurable L1-post-signaling information. Additionally, the present invention may also know the operation characteristics, such as the mobile performance and data communication characteristics, of the PLP by using the PLP_COD field and the PLP_MOD field.

Hereinafter, when a broadcast signal is a IP format, a signaling method for signaling a PLP or a correlation between a PLP and service components, by using the PLP_GROUP_ID field, the PLP_TYPE field, and the PLP_COMPONENT_TYPE field, will be described in detail.

More specifically, when a broadcast signal is transmitted in an IP format according to an embodiment of the present invention, the receiver may merge components being transmitted by the PLPs included in the same PLP group, by using a correlation between a service and a PLP, which transmits the components included in the service and then the receiver may recover single service.

The signaling of L1 signaling information, L2 signaling information, PAT/PMT, and so on, respective to the correlation between the PLPs, IP streams, the service, and the components according to an embodiment of the present invention may be performed by the input pre-processor 100000 or input processor 100100 of the broadcast signal transmitting apparatus (or transmitter), or may be performed by the BICM module 100200.

The input pre-processor shown in FIG. 8 may perform signaling of the L1 signaling information and L2 signaling information, and may generate PLPS including ESG, provider information, bootstrap information, and so on, and component PLPs configuring a service. In this case, the L2 signaling information may an IP information table.

According to yet another embodiment of the present invention, signaling of the L1 signaling information, shown in FIG. 20 to FIG. 22, may be performed by an L1 signaling generator included in the input processor or an L1 signaling generator included in the BICM module.

At this point, PLPs generated from the input pre-processor may be encoded by using the MISO method and then transmitted, or may be encoded by using the MIMO method and then transmitted. In the present invention, the PLP data being transmitted by using the MISO method may be referred to as MISO PLP data, and the PLP data being transmitted by using the MIMO method may be referred to as MIMO PLP data.

Meanwhile, according to an embodiment of the present invention, in the broadcast signal receiving apparatus (also referred to as a receiver), any one of the frame demapper, the BICM decoder, and the output processor may perform decoding on a PLP, a TS (or an IP stream), a service, L1/L2 signaling information to which the correlation between the components is signaled, PAT/PMT or ESG, provider information, bootstrap information, and so on.

Figure 23:
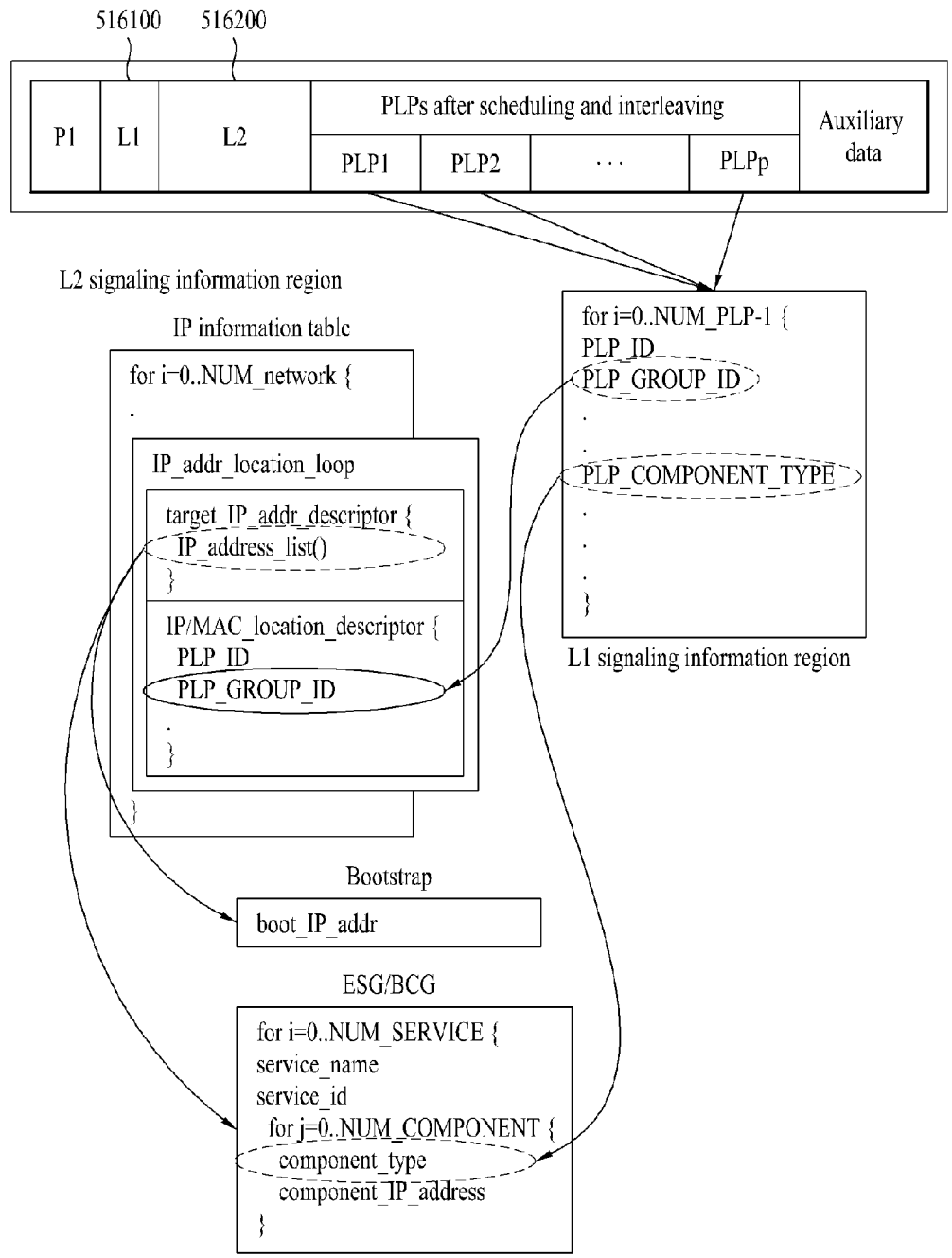
FIG. 23 illustrates a conceptual diagram of a correlation between a service and a PLP according to an embodiment of the present invention.

FIG. 23 illustrates a conceptual diagram of a correlation between a service and a PLP group according to an embodiment of the present invention.

In case of transmitting a broadcast signal of a IP format as shown in FIG. 23, the receiver may acquire information on a service IP address, a component type included in a PLP and a component address, and merge PLPs being included in the same PLP group, thereby recovering a transport stream. As shown in FIG. 23, the L1 signaling information region 516100 according to an embodiment of the present invention may include information related to each of the multiple PLPs, i.e., a PLP_GROUP_ID field, a PLP_ID field, and so on. Also, the L2 signaling information region 516200 may include an IP information table, and the IP information table may include a IP_address_list( ) field and a descriptor. The IP_address_list( ) field may include IP address information for receiving a Bootstrap, and the descriptor may include the same PLP_GROUP_ID field and PLP_ID field that are included in the L1 signaling information region 516100. Since the IP_address_list( ) field and the descriptor form a pair, by using this pair, the receiver may be capable of knowing which PLP group is correlated to a specific IP stream. Thereafter, the receiver may use the IP_address_list( ) field, so as to receive Bootstrap information. Herein, the bootstrap information includes a boot_IP_address field. And, by using the boot_IP_address field, the receiver may acquire an IP address that can receiver (or acquire) a service guide information or broadcast content guide information.

Subsequently, by using the received bootstrap information, the receiver may receiver service guide information, such as ESG (Electronic Service Guide)/BCG (Broadcast Contents Guide). The service guide information or broadcast contents guide information may be transmitted through an interactive channel and may be received through an IP stream, which is included in a specific PLP. This may vary depending upon the intentions of the system designer. The receiver may use the service_id field, the component_type field, and the component_IP_address field, which are included in the ESG/BCG, so as to decode a desired (or wanted) service and service components.

Eventually, by using the component_IP_address included in the ESG/BCG, or by using the boot_IP_address field of the bootstrap, the receiver may acquire an IP address for each service and service components. And, by using the IP_address_list( ) field and the PLP_GROUP_ID field of the IP information table, the receiver may be capable of knowing which IP stream/packet is correlated to the PLP group. Thereafter, the receiver may merge the service components that are included in a PLP having the same PLP_GROUP_ID field included in the L1 signaling information region 516100, so as to recover a service.

Hereinafter, the L1 signaling information, the IP information table, a bootstrap, and an ESG/BCG will be described in detail.

The L1 signaling information may include the same fields included in the L1 signaling information, which is described in FIG. 20 to FIG. 22. And, the receiver may use the PLP_COMPONENT_TYPE field so as to determine whether or not the L1 signaling information is matched with the component_type field included in the ESG/BCG.

The IP information table corresponds to a table include IP-related information, i.e., information on an IP address and so on. Herein, the receiver may be capable of knowing how the IP stream is being transmitted from the IP information table through the transport stream.

The IP information table may include an IP_addr_location loop, and the IP_addr_location loop may include a target_IP_add_descriptor( ) and an IP/MAC_location_descriptor.

The target_IP_add_descriptor( ) may include an IP_address_list( ) field, and the IP_address_list( ) field may include information related to the IP address. According to the embodiment of the present invention, the present invention includes an IP address/port field. Depending upon the number of ports, a plurality of the IP address/port fields may be included. The IP/MAC_location_descriptor may also be referred to as an IP/MAC_location_information field, which may be used for connecting the PLP_COMPONENT_TYPE field included in the L1 signaling information to the IP stream. The IP/MAC_location_descriptor may include the same PLP_ID field and PLP_GROUP_ID field as the PLP_ID field and the PLP_GROUP_ID field, which are included in the L1 signaling information.

Hereinafter, each field included in the bootstrap and ESG/BCG shown in FIG. 23 will be described in detail.

Herein, the Bootstrap may include a boot_IP_addr field, and the boot_IP_addr field may identify a booting address of the IP.

The ESG/BCG may include a NUM_SERVICE loop. Herein, the NUM_SERVICE loop may include a respective service_name field, service_id field, and a NUM_COMPONENT loop for each of the multiple services.

The service_name field may be used for indicating the name of each service, and the service_id field may be used for identifying each service.

The NUM_COMPONENT loop corresponds to a loop include information on the multiple components, which are included in a service. Herein, the NUM_COMPONENT loop may include a component_type field and a component_IP_address field.

The component_type field may be used for identifying component types of the service. And, examples of the components according to the present invention may include a video component of the base layer, a video component of the enhancement layer, audio components, data components, and so on. Also, the component_type field may be matched with the PLP_COMPONENT_TYPE field, which is included in the L1 signaling information.

The component_IP_address field may identify the IP address of each component.

FIG. 24 illustrates an exemplary IP/MAC_location_descriptor according to an embodiment of the present invention.

As shown in FIG. 24, the IP/MAC_location_descriptor according to an embodiment of the present invention may include a PLP_ID field and a PLP_GROUP_ID field. Since the description of each field is identical to the PLP_ID field and the PLP_GROUP_ID field included in the L1 signaling information, detailed description of the same will be omitted for simplicity.

Figure 25:
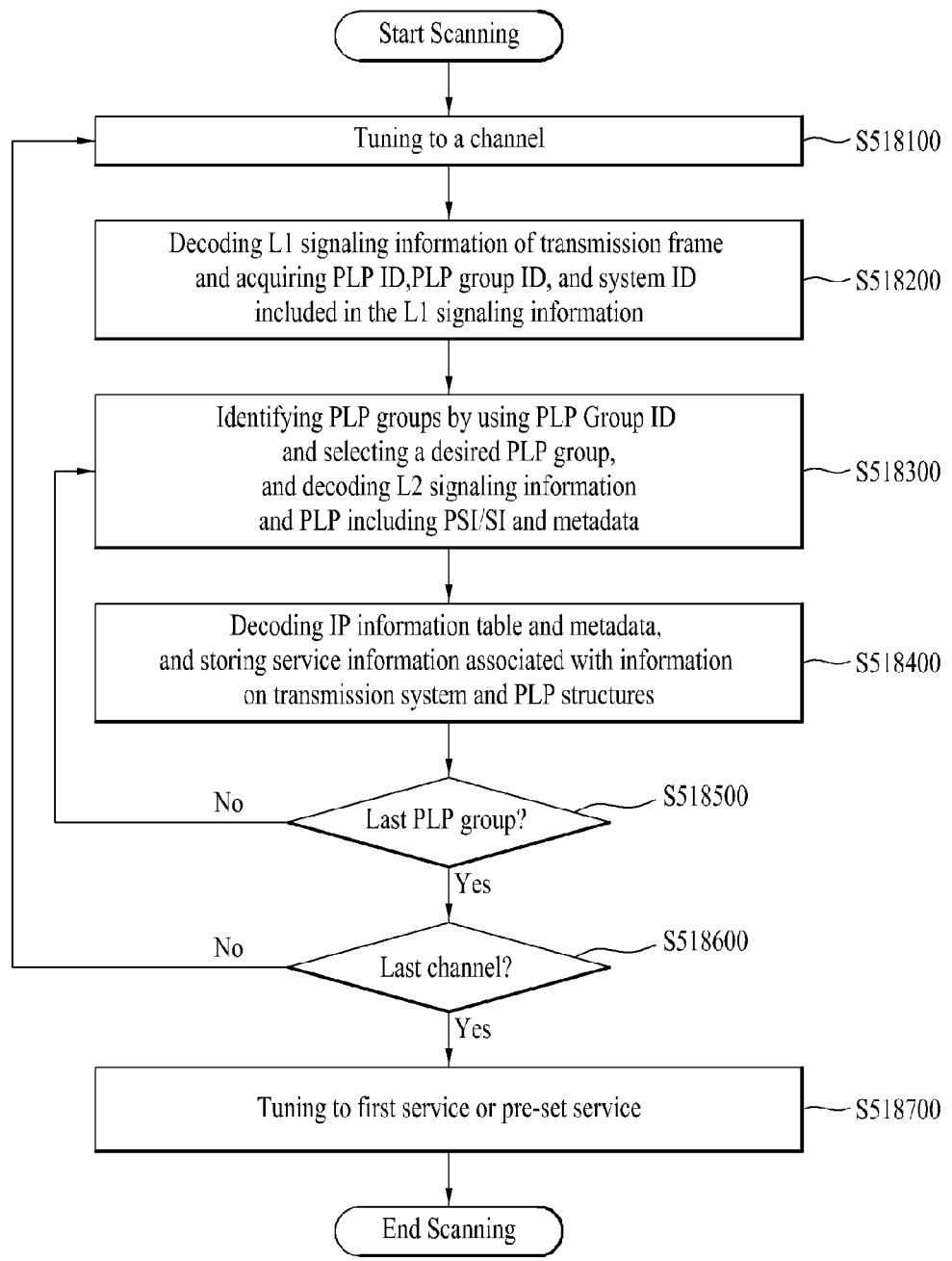
FIG. 25 illustrates a flow chart showing the process steps of a service scanning method of the receiver according to an embodiment of the present invention.

FIG. 25 illustrates a flow chart showing the process steps of a service scanning method of the receiver according to an embodiment of the present invention.

The receiver tunes to receive an IP type broadcast signal (S518100). In this case, in order to receive a service desired by the user, the receiver requires information on the service included in the transmission frame, which is being transmitted through the respective channel. Although this process step is not shown in the drawing, this process step may be performed by the tuner of the receiver and may be modified or varied in accordance with the intentions of the system designer.

Then, the receiver may decode the L1 signaling information included in the transmission frame, so as to acquire a PLP ID and a PLP Group ID (S518200). Thereafter, the receiver may identify the PLP groups by using the decoded PLP group ID so as to select a desired PLP group, and the receiver may then decode the L2 signaling information and the PLP including the PSI/SI and metadata (S518300).

The receiver may decode the IP information table included in the decoded L2 signaling information, and the receiver may also decode the metadata included in the PLP (S518400). Additionally, the receiver may acquire service information associated with information on the transmitting system and PLP structures, thereby being capable of storing the acquired service information (S518400). The service information according to the present invention may include a service IP address, a component IP address, and so on. Subsequently, the receiver may determine whether or not the currently selected PLP group corresponds to the last PLP group (S518500).

Based upon the determined result, when it is determined that the selected PLP group does not correspond to the last PLP group, the receiver may return to the process step S518300, so as to select the next PLP group. Alternatively, when it is determined that the selected PLP group corresponds to the last PLP group, the receiver may determine whether or not the current channel corresponds to the last channel (S518600).

Then, based upon the determined result, when it is determined that the current channel does not correspond to the last channel, the receiver may return to the process step S518100, so as to tune to the next channel. And, alternatively, when it is determined that the current channel corresponds to the last channel, the receiver may use the stored service information so as to tune to a first service or a pre-set service (S518700).

In an embodiment of the present invention, if a broadcast signal is configured in an IP format, a broadcast service is transmitted in one of two schemes, Open Mobile Alliance-BroadCAST (OMA-BCAST) or DVB-Internet Protocol DataCasting (DVB-IPDC).

A BCAST standardization work under development in the OMA standardization organization is a system technology supporting a broadcast service that a subgroup of the Browser and Contents (BAC) Working Group (WG) is working on. OMA-BCAST supports a broadcast service, an interactive service, and a hybrid service. The OMA-BCAST standard provides a service management framework for providing an IP-based multicast broadcast service.

DVB-IPDC is a system technology for transmitting an IP-based mobile TV service. DVB-IPDC may support a system structure including DVB PSI/SI signaling, an ESG Content Delivery Protocols (CDPs), etc.

The above-described two schemes support a broadcast service through an ESG and invoke a physical layer by a Session Description Protocol (SDP).

The SDP is a protocol for transmitting multi-media session information such as media details, a transmission address, metadata of other sessions, etc. during initialization for delivering a plurality of multimedia over the Internet. The SDP is an Internet Engineering Task Force (IETF) standard table. Session information is largely divided into a single session description, zero or more time descriptions, and zero or more media descriptions, expressed in text. The single session description may include a protocol version, a session Identifier (ID), a session name, session attributes, etc. The time description may include the active time and repetition number of the session. The media description may include a medium name and IP address, connection information such as a port number, medium features, etc.

If SVC is used for an NGH broadcast service in the present invention, SVC information is transmitted by the session attribute information or media feature information of the SDP in an embodiment. Accordingly, the session attribute information or media feature information may include SVC codec information of the broadcast service. If a medium included in the session corresponds to an enhancement layer of the broadcast service, the session attribute information or media feature information may include information about a base layer.

Each broadcast service may be identified by an IP address, a service component such as video/audio may be identified by a TCP/UDP port number, and the base layer and enhancement layer of SVC may also be identified by TCP/UDP numbers. Each PLP included in a signal frame may be identified by PLP_ID, LLP_ID, etc.

Figure 26:
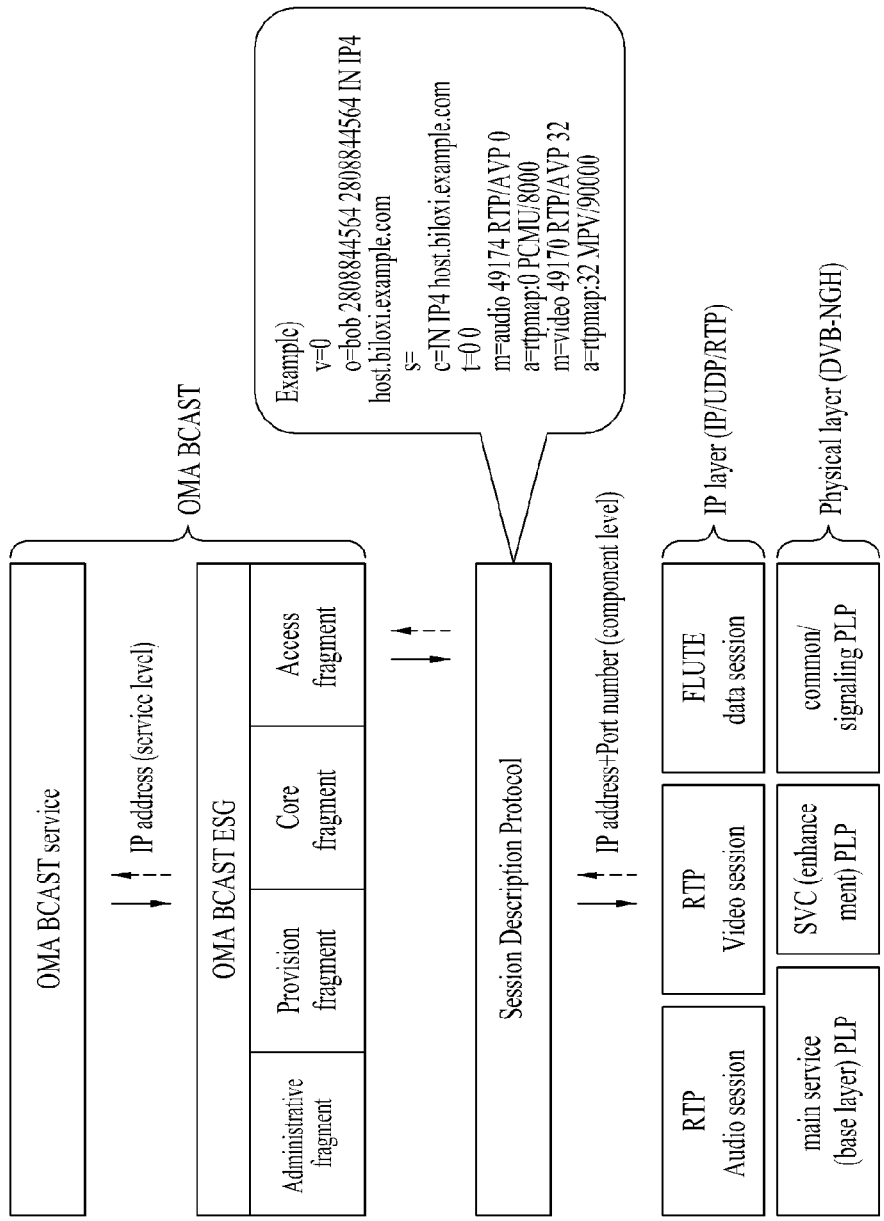
FIG. 26 illustrates a conceptual diagram showing NGH broadcast service signaling in the case of OMA-BCAST according to an embodiment of the present invention.

FIG. 26 is a conceptual view illustrating NGH broadcast service signaling in the case of OMA-BCAST according to an embodiment of the present invention.

A transmitter may transmit information related to an OMA-BCAST broadcast service, that is, a service IP address, etc. by an OMA-BCAST ESG.

The OMA-BCAST ESG may include an administrative fragment, a provision fragment, a core fragment, and an access fragment.

The administrative fragment may include information about the structure and acquisition of the OMA-BCAST ESG.

The provision fragment may include information about purchase of services that users can buy.

The core fragment may include information about a service provided to users, for example, a conventional TV channel, metadata of content, and scheduling information about content of the service.

The access fragment may include information about access to a service or content. Particularly, the access fragment may indicate a specific SDP.

The SDP may include a Real-time Transport Protocol (RTP) audio session, an RTP video session, and a FLUTE data session.

The sessions of an exemplary SDP illustrated in FIG. 26 will be described below in brief.

V represents the protocol version of a session, o represents a session ID, s represents a session name, c indicates connection information, t represents the active time of the session, m represents a media type and IP address, and a indicates media features.

In an IP layer, the audio and video components of a broadcast service may be encapsulated into RTP audio and video sessions, for transmission, while L2 signaling information may be transmitted in a FLUTE data session.

A signal frame may include a common/signaling PLP, a base-layer PLP carrying a base layer, and an enhancement PLP carrying an enhancement layer. The common/signaling PLP may include an L1 signaling region and an L2 signaling region according to the present invention.

The base-layer PLP may deliver data corresponding to the base layer from among the audio and video components encapsulated in the RTP audio and video sessions, and the enhancement PLP may deliver video data corresponding to the enhancement layer from among the video data encapsulated in the RTP video session.

A receiver may decode the signal frame and acquire an IP information table, etc. from the decoded common/signaling PLP, and the IP addresses of a bootstrap and an ESG from the IP information table. Then the receiver may receive the ESG using the acquired IP addresses of the bootstrap and the ESG.

The receiver is now capable of accessing the access fragment of the ESG and acquiring the IP address and port number of a service by a specific SDP indicated by the access fragment of the ESG. In addition, the receiver may acquire information about the purchase of each service from a purchase/bundle fragment or a provision fragment and may select an intended service.

The SDP may provide the IP address, component port number, and SVC information of each service.

The receiver may acquire the IP address and component port number of each service and SVC information from the SDP and may selectively decode the base-layer PLP or the enhancement PLP using the information.

Figure 27:
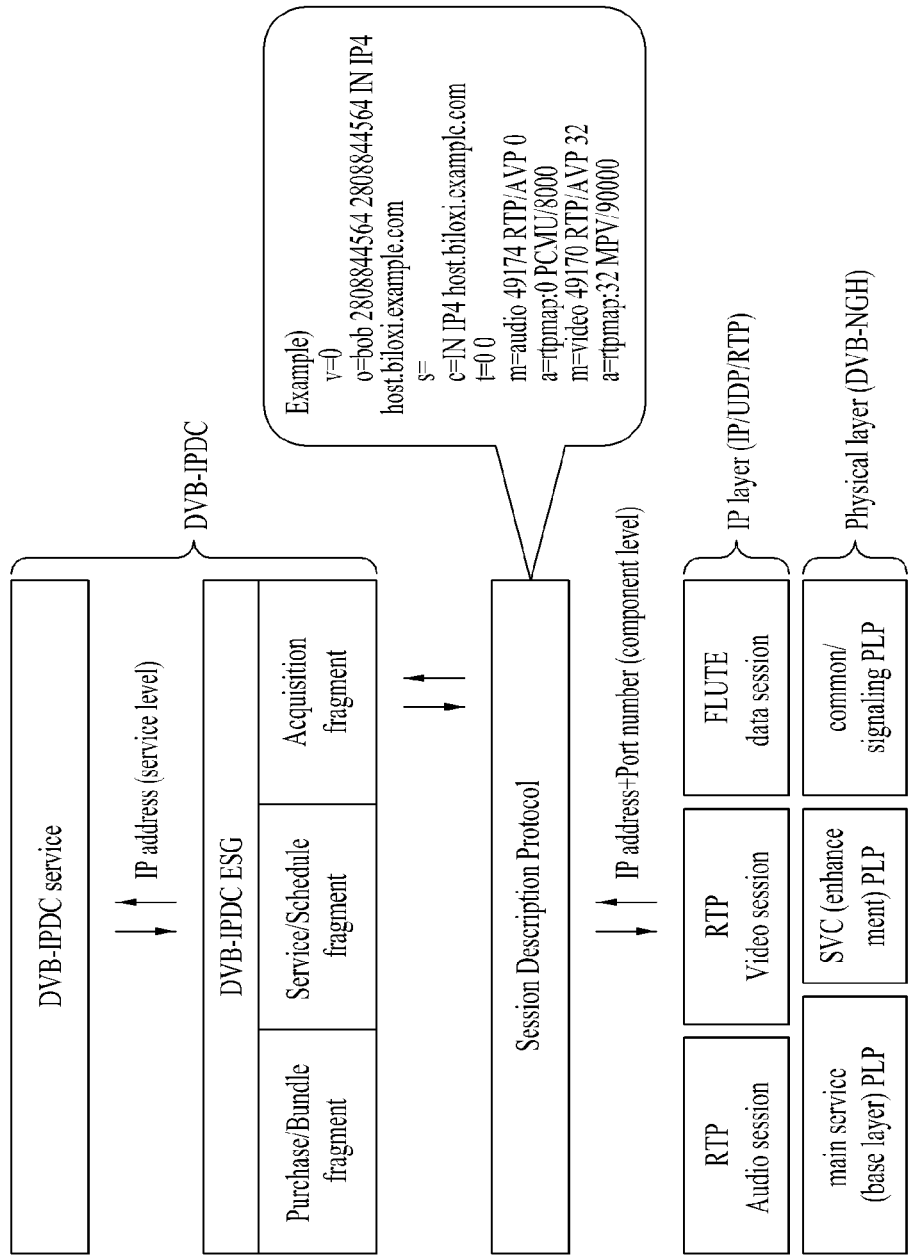
FIG. 27 illustrates a conceptual diagram showing NGH broadcast service signaling in the case of DVB-IPDC according to an embodiment of the present invention.

FIG. 27 is a conceptual view illustrating NGH broadcast service signaling in the case of DVB-IPDC according to an embodiment of the present invention.

A transmitter may transmit information related to a DVB-IPDC broadcast service, that is, a service IP address, etc. in a DVB-IPDC ESG. The DVB-IPDC ESG is the same as the OMA-BCAST ESG illustrated in FIG. 26 except that the former includes a purchase/bundle fragment, a service/schedule fragment, and an acquisition fragment.

The purchase/bundle fragment is identical to the provision fragment described with reference to FIG. 26, the service/schedule fragment is identical to the core fragment described with reference to FIG. 26, and the acquisition fragment is identical to the access fragment described with reference to FIG. 26. Thus, a detailed description of the purchase/bundle fragment, the service/schedule fragment, and the acquisition fragment is not provided herein.

Figure 28:
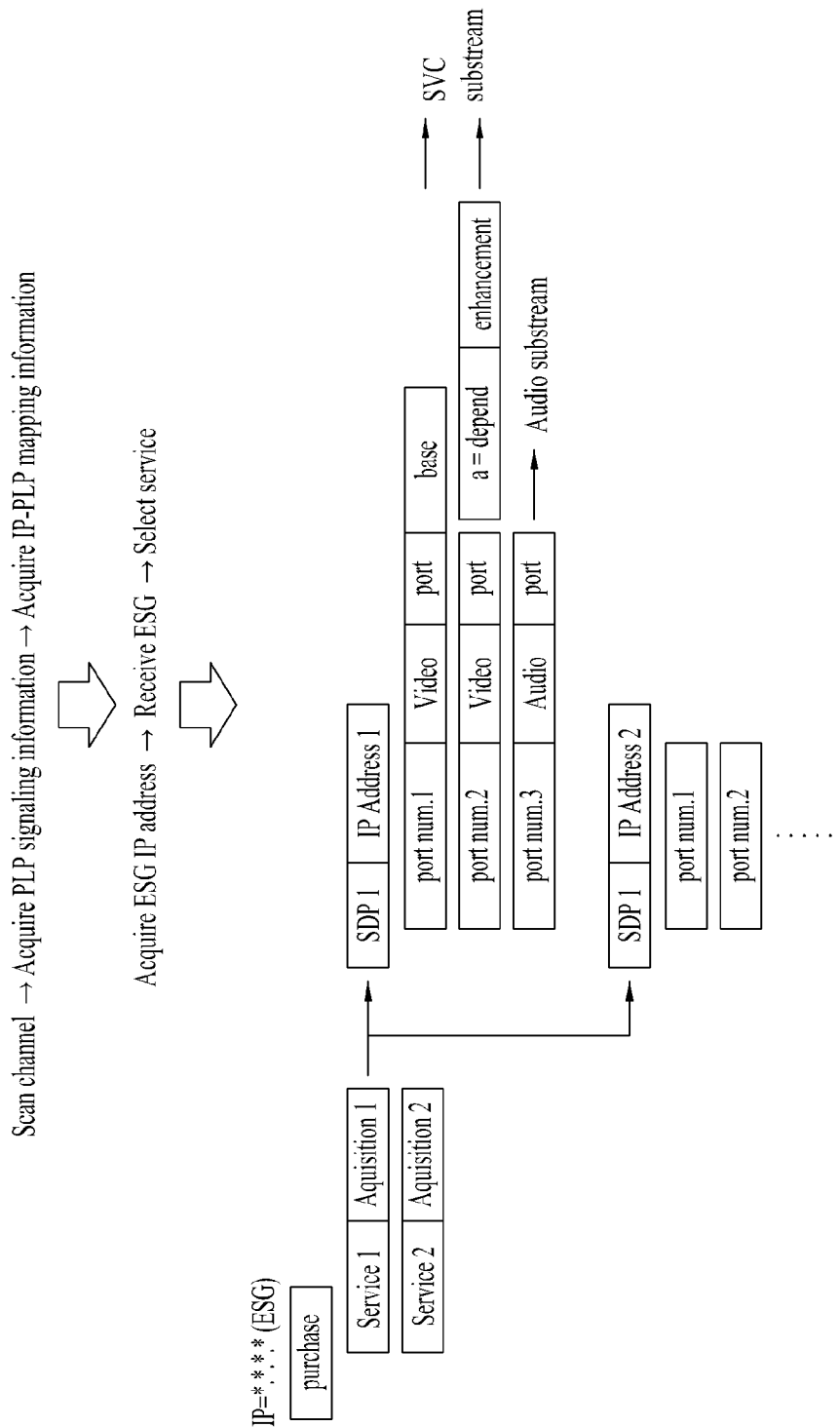
FIG. 28 illustrates a conceptual diagram showing an operation for recovering an SVC substream using an ESG and an SDP according to an embodiment of the present invention.

FIG. 28 is a conceptual view illustrating an operation for recovering an SVC substream using an ESG and an SDP according to an embodiment of the present invention.

As described before with reference to FIG. 27, the receiver may scan a channel and decode a signal frame, thereby acquiring IP-PLP mapping information. Then the receiver may acquire the IP address of an ESG from an IP information table by decoding an L2 signaling information region. As described before, the ESG may be received on an interactive channel or in an IP stream included in a specific PLP. The receiver may select a service from the received ESG.

FIG. 28 illustrates an operation for recovering an SVC substream using an ESG and an SDP.

The receiver may acquire information about the purchase of broadcast service 1 from a provision fragment or a purchase/bundle fragment of the received ESG. The receiver may acquire the IP address of broadcast service 1 by SDP 1 indicated by an access fragment or an acquisition fragment of the ESG and may acquire port number 1, port number 2, and SVC information of a video included in broadcast service 1, thereby recovering an SVC substream.

In this case, the IP address of each service, the port numbers of components in each service, and IP-PLP mapping information for connecting to a PLP carrying each service component are needed for the receiver to select a PLP carrying an intended component and decode the PLP. The IP-PLP mapping information may be transmitted in the L1 signaling information region, L2 signaling information region, or common PLP of a signal frame, depending on the designer's intention.

If the IP-PLP mapping information is transmitted in the L2 signaling information region or the common PLP, it may be transmitted in IP/MAC_location_descriptor of the IP information table, as described with reference to FIGS. 24 and 25.

Or the IP-PLP mapping information may be transmitted through an independent session in an IP layer.

FIGS. 29 and 30 illustrate formats of IP-PLP mapping information.

The IP-PLP mapping information may be configured in one of a binary data format, a TS private packet format, and an XML format, depending on the designer's intention.

If the IP-PLP mapping information is configured in the TS private packet format, it may be transmitted in IP/MAC_location_descriptor of the IP information table.

As described with reference to FIG. 24, the IP information table may include an IP_address_list( ) field and descriptor. The IP_address_list( ) field may include IP address information by which to receive bootstrap information and an ESG in an embodiment. The descriptor may include a system_ID field, a PLP_ID field, a PLP_GROUP_ID field, etc. Since the IP_address_list( ) field and descriptor are paired, the receiver may determine from the pair what PLP group is associated with a specific IP stream.

FIG. 29 illustrates the syntax of a binary data format including IP-PLP mapping information according to an embodiment of the present invention.

Referring to FIG. 29, the syntax of the binary data format may include a "for loop" for an IP_FORMAT field, a NUM_PLP_IP_PAIR field, and a NUM_PLP_IP_PAIR field. The "for loop" for the NUM_PLP_IP_PAIR field may include IP-PLP mapping information such as a PLP ID, the IP address of a broadcast service, and the port number of a broadcast service transmitted in the PLP. Each field will be described below briefly.

IP_FORMAT may indicate a format type.

NUM_PLP_IP_PAIR may indicate the number of pieces of IP-PLP mapping information.

The "for loop" for the NUM_PLP_IP_PAIR field may include the IP-PLP mapping information and may be iterated as many times as the number of pieces of IP-PLP mapping information indicated by the NUM_PLP_IP_PAIR field.

Specifically, the "for loop" for the NUM_PLPIP_PAIR field may include a NUM_IP_PORT_ADDR field, a "for loop" for the NUM_IP_PORT_ADDR field, and a PLP_ID field.

The NUM_IP_PORT_ADDR field may indicate the number of the port addresses of components transmitted in a PLP.

The "for loop" for the NUM_IP_PORT_ADDR field may include an IP_ADDRESS field and a PORT_NUMBER field and may be iterated as many times as the number of the port addresses of components of a broadcast service indicated by the NUM_IP_PORT_ADDR field.

The IP_ADDRESS field may indicate the IP address of a broadcast service. The PORT_NUMBER field may indicate the port number of a broadcast service component. The PLP_ID field may identify a PLP.

Therefore, the receiver may determine a format type from the IP_FORMAT field and identify a PLP associated with a specific IP stream from the NUM_PLP_IP_PAIR field and the "for loop" for the NUM_PLP_IP_PAIR field.

FIG. 30 illustrates the syntax of an XML format including IP-PLP mapping information according to an embodiment of the present invention.

In this case, while the XML syntax may be transmitted as it is, it may also be compressed to a Binary format for Metadata/GNU ZIP (BiM/GZIP) prior to transmission.

Referring to FIG. 30, the XML syntax may include an IP_FORMAT tag and a PLP_IP_PAIR tag. The PLP_IP_PAIR tag may include a plurality of IP_PORT tags and PLP_ID tags.

The contents of each tag are identical to the contents of its counterpart illustrated in FIG. 29 and thus a detailed description of each tag will not be provided herein.

The receiver may identify the current version of the XML syntax from the IP_FORMAT tag and determine what PLP is associated with a specific IP stream from the PLP_ID tags and IP_PORT tags defined under the PLP_IP_PAIR tag.

Figure 31:
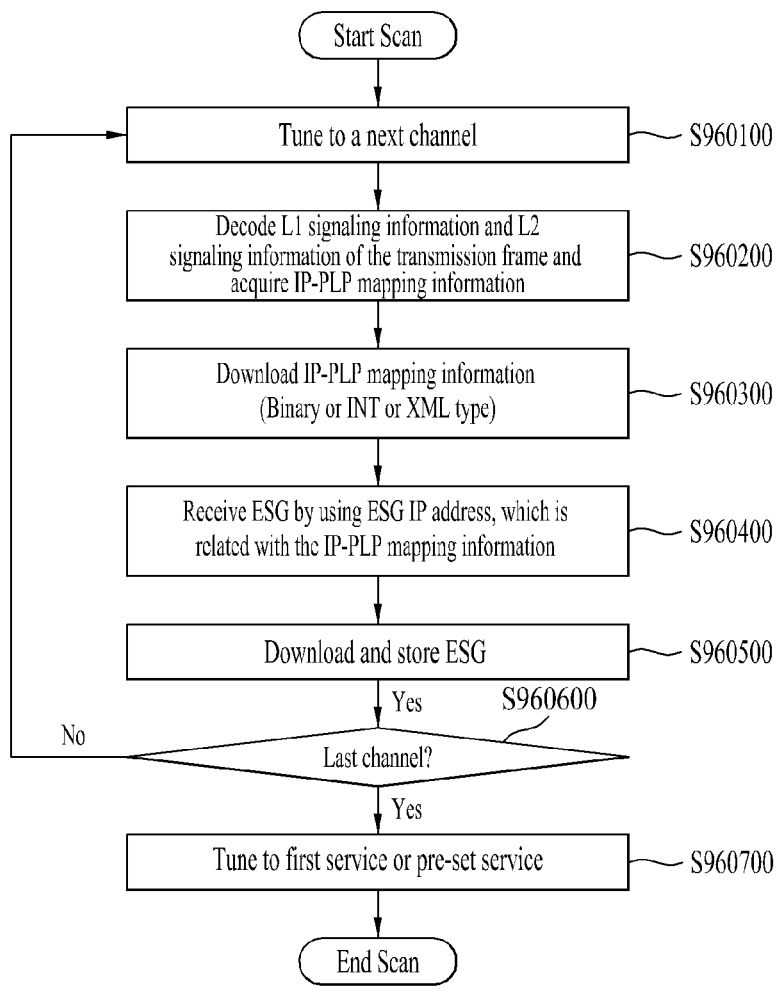
FIG. 31 illustrates a flowchart showing a channel scanning method according to an embodiment of the present invention.

FIG. 31 is a flowchart illustrating a channel scanning method according to an embodiment of the present invention.

The receiver receives a broadcast signal of an IP format on a specific channel by tuning to the specific channel (S960100). To receive a desired service, a user needs information about services included in a transmission frame transmitted on a channel. While this operation is not shown in FIG. 31, the tuner of the receiver may perform this operation depending on the designer's intention.

The receiver may acquire IP-PLP mapping information by decoding L1 signaling information and L2 signaling information included in a transmission frame (S960200). As described before, the IP-PLP mapping information may be transmitted in the L1 signaling information or the L2 signaling information, or through an independent session in an IP layer depending on the designer's intention.

Then the receiver downloads the acquired IP-PLP mapping information (S960300). As described before, the IP-PLP mapping information may be configured in one of the binary data format, the TS private packet format, and the XML format depending on the designer's intention.

The receiver may acquire an ESG IP address related to the IP-PLP mapping information from the decoded L1 signaling information and L2 signaling information and receive an ESG using the ESG IP address (S960400). As described above, the ESG may be received on an interactive channel or in an IP stream included in a specific PLP.

The receiver downloads the received ESG and stores the ESG (S960500).

The receiver may determine whether the current channel is the last channel (S960600).

If the current channel is not the last channel, the receiver may return to step S960100 and tune to the next channel. On the other hand, if the current channel is the last channel, the receiver may tune to a first service or a preset service using the stored service information (S960700).

As described above, if a broadcast signal has the IP format, each service is provided through an ESG and the afore-described OMA-BCAST and DVB-IPDC may invoke a physical layer by an SDP. In this case, a bootstrap IP address with which to receive a bootstrap may exist inside the receiver and the bootstrap may include signaling information about an ESG, for example, an ESG IP address. The bootstrap and the ESG may be received in specific PLPs using their IP addresses. Accordingly, the receiver should acquire signaling information about the bootstrap and the ESG rapidly to start a service. If it takes a long time to acquire the signaling information about the bootstrap and the ESG; the service start may be delayed. In this context, there exists a need for a signaling method that enables a receiver to fast acquire a bootstrap and an ESG.

Now a description will be given of two signaling methods that enable a receiver to fast acquire signaling information about a bootstrap and an ESG.

In an embodiment, signaling information about a bootstrap and an ESG is transmitted in an L1 signaling information region.

In another embodiment, signaling information about a bootstrap and an ESG is transmitted in a common PLP.

Hereinafter, signaling information about a bootstrap and an ESG will be referred to as bootstrap signaling information and ESG signaling information.

Because both the L1 signaling information region and the common PLP reside at the start of a signal frame, the receiver may acquire bootstrap and ESG signaling information rapidly by receiving and decoding the L1 signaling information region or the common PLP. The common PLP may also be called a signaling PLP depending on the designer's intention in the present invention. The signaling PLP may be PLP data in a data region, which may vary depending on the designer's intention.

Further, a PLP carrying bootstrap and ESG signaling information may be called a dedicated PLP. The concept of the dedicated PLP may cover the common PLP or PLP data depending on the designer's intention. The dedicated PLP may be positioned at the end of a P1 signaling information region. If the dedicated PLP does not include the L1 signaling information region, the dedicated PLP may be disposed at the end of the L1 signaling information region depending on the designer's intention.

According to the present invention, both the bootstrap signaling information and the ESG signaling information or only the bootstrap signaling information may be transmitted in the L1 signaling information or the common PLP. In the latter case, the ESG signaling information may be transmitted in a bootstrap, depending on the designer's intention.

Figure 32:
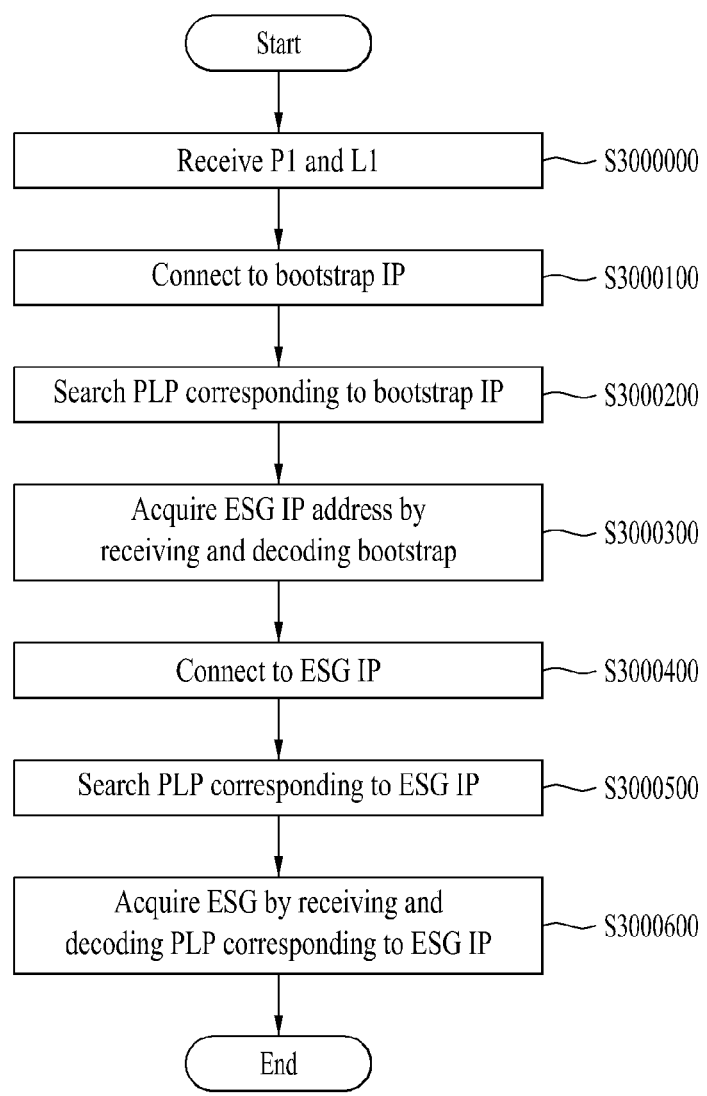
FIG. 32 illustrates a flowchart showing a boot-up service according to an embodiment of the present invention.

FIG. 32 is a flowchart illustrating a boot-up service according to an embodiment of the present invention.

After tuning to a current received channel, the receiver may receive a P1 signaling information region and an L1 signaling information region (S3000000). As described before, a bootstrap IP address may be preserved in the receiver. Accordingly, the receiver may connect to a bootstrap IP using the bootstrap IP address (S3000100).

The receiver may detect a PLP corresponding to the bootstrap IP (S3000200). As described before, bootstrap signaling information may be transmitted in the L1 signaling information region or a common PLP depending on the designer's intention. Thus the receiver may detect the PLP corresponding to the bootstrap IP using the bootstrap signaling information transmitted in the L1 signaling information region.

Then the receiver may receive and decode the bootstrap and acquire an ESG IP address from the decoded bootstrap (S3000300). As described before with reference to FIG. 23, the bootstrap may include ESG signaling information. Or the ESG signaling information may be transmitted together with the bootstrap signaling information in the L1 signaling information region or the common PLP. In this case, the ESG signaling information may be acquired from the L1 signaling information region or the common PLP. Or after the bootstrap is received, the ESG signaling information may be acquired from the bootstrap, which will be described later in detail.

The receiver may connect to an ESG IP using the ESG IP address (S3000400).

Further the receiver may detect a PLP corresponding to the ESG IP (S3000500).

The receiver may receive and decode the PLP, thus acquiring the ESG (S3000600).

FIG. 33 illustrates the syntax structure of an L1 signaling information region according to an embodiment of the present invention.

As described before, bootstrap and ESG signaling information may be transmitted in the L1 signaling information region according to the first embodiment of the present invention.

FIG. 33 illustrates the syntax of the bootstrap and ESG signaling information transmitted in the L1 signaling information region. In an embodiment of the present invention, this syntax is added to the syntax of the L1 signaling information region illustrated in FIG. 21. As described before, the ESG signaling information may be transmitted in a bootstrap, not in the L1 signaling information region, depending on the designer's intention.

Referring to FIG. 33, the bootstrap and ESG signaling information may further include a PLP_BOOT field, a FLAG_ESG_PRE_INFO field, a NUM_ESG field, and a "for loop" for the NUM_ESG field.

Each field will be described below.

The PLP_BOOT field is an 8-bit field that may indicate a PLP carrying full information about a bootstrap. In this case, the PLP indicated by the PLP_BOOT field may carry an IP packet stream, including information for delivering an ESG by a file delivery protocol and details about an ESG provider. The PLP indicated by the PLP_BOOT field may be the afore-described dedicated PLP.

The FLAG_ESG_PRE_INFO field is a 1-bit field that may indicate whether the ESG signaling information is transmitted in the L1 signaling information region. In this case, the receiver may acquire the ESG signaling information along with the bootstrap signaling information in the L1 signaling information region. On the other hand, if the ESG signaling information is not transmitted in the L1 signaling information region, the receiver may acquire the ESG signaling information in other PLP data.

The NUM_ESG field indicates an ESG type. If a plurality of ESG providers exist, there may be a plurality of ESGs.

In the case of a plurality of ESGs, a "for loop" may be used to provide information about each ESG. The "for loop" may include a PROVIDER_ID field, a VERSION field, an IP_ADDRESS field, a PORT_NUMBER field, a SESSION_ID field, and a PLP_ID field. These fields will be described below.

The PROVIDER_ID field is a 16-bit field that may identify an ESG provider.

The VERSION field is an 8-bit field that may indicate the version of ESG connection information.

The IP_ADDRESS field is a 32-bit or 48-bit field that may indicate the IP address of an ESG.

The PORT_NUMBER field is a 16-bit field that may indicate the port number of the ESG.

The SESSION_ID field is a 16-bit field that may indicate the session ID of the ESG.

The PLP_ID field is an 8-bit field that may indicate a PLP carrying the ESG.

Hence, the receiver may detect a PLP corresponding to the bootstrap IP address preserved in the receiver, using the PLP_BOOT field. The receiver may determine the presence or absence of the ESG signaling information in the current L1 signaling information region using the FLAG_ESG_PRE_INFO field. In the absence of the ESG signaling information in the L1 signaling information region, the receiver may receive the bootstrap by receiving and decoding the PLP indicated by the PLP_BOOT field. After decoding the received bootstrap and acquiring the ESG signaling information from the decoded bootstrap, the receiver may detect a PLP carrying an ESG and receive the ESG in the PLP.

On the contrary, in the presence of the ESG signaling information in the L1 signaling information region, the receiver may receive the ESG signaling information in the L1 signaling information region and detect a PLP corresponding to an ESG IP address. Subsequently, the receiver may receive and decode the PLP, thereby receiving the ESG.

As described before, bootstrap and ESG signaling information may be transmitted in a common PLP according to the second embodiment of the present invention. In this case, the bootstrap and ESG signaling information may be configured in one of the binary data format, the PST/SI data format, and the XML data format depending on the designer's intention.

Bootstrap and ESG signaling information configured in each format will be described below. Depending on the designer's intention, the ESG signaling information may not be added and instead, it may be transmitted in a bootstrap.

FIG. 34 illustrates the syntax of a binary data format including bootstrap and ESG signaling information according to an embodiment of the present invention.

The bootstrap and ESG signaling information illustrated in FIG. 34 may be included in the syntax of the binary data format including IP-PLP mapping information illustrated in FIG. 29.

Referring to FIG. 34, the bootstrap and ESG signaling information may further include a PLP_BOOT field, a FLAG_ESG_PRE_INFO field, a NUM_ESG field, and a "for loop" for the NUM_ESG field.

The description of FIG. 33 may be referred to for each field and the receiver also operates in the same manner as described with reference to FIG. 33. Thus, a detailed description of the above fields and a related operation of the receiver will not be provided herein.

FIG. 35 illustrates the syntax of a PSI/SI data format including bootstrap and ESG signaling information according to an embodiment of the present invention.

The syntax of the PSI/SI data format illustrated in FIG. 35 may be included as a simple bootstrap descriptor in the IP information table described with reference to FIG. 23.

Referring to FIG. 35, the syntax of the PSI/SI data format including bootstrap and ESG signaling information may include a descriptor tag field, a descriptor length field, a bootstrap_PLP field, an ESG_info_flag field, an IPv6_flag field, and a reserved field.

Each field will be described below.

The descriptor tag field is an 8-bit field that may identify the descriptor.

The descriptor length field is an 8-bit field that may indicate the length of the descriptor.

The bootstrap_PLP field is an 8-bit field identical to the PLP_BOOT field illustrated in FIG. 33, although their names are different.

The ESG_info_flag field is a 1-bit field identical to the FLAG_ESG_PRE_INFO field illustrated in FIG. 33, although their names are different. That is, the ESG_info_flag field may indicate whether ESG signaling information is included in the current descriptor.

The IPv6_flag field is a 1-bit field that may indicate IP version 6. IP version 6 is the official standard of the IETF, also called IP next generation (IPng).

The reserved field is a 6-bit field reserved for future use for another field.

If the ESG_info_flag field indicates the presence of ESG signaling information, the NUM_ESG field and the "for loop" for providing information about each ESG may exist, as described before with reference to FIG. 33. Thus a detailed description of the NUM_ESG field and the "for loop" will not be provided herein.

Therefore, the receiver may detect a PLP corresponding to the bootstrap IP address preserved in the receiver using the bootstrap_PLP field. The receiver may determine from the FLAG_infor_flag field whether the ESG signaling information is transmitted in the current common PLP. If the ESG signaling information is not transmitted in the common PLP, the receiver may receive and decode a PLP indicated by the bootstrap_PLP field and thus receive a bootstrap. After acquiring ESG signaling information by decoding the received bootstrap, the receiver may detect a PLP carrying an ESG and thus receive the ESG.

On the contrary, if the ESG signaling information is transmitted in the common PLP, the receiver may acquire the ESG signaling information from the common PLP and thus detect a PLP corresponding to an ESG IP address. Then the receiver may receive and decode the PLP, thereby receiving an ESG.

FIG. 36 illustrates the syntax of an XML data format including bootstrap and ESG signaling information according to an embodiment of the present invention.

Because the XML data format can be extended freely, information about the address of a bootstrap, information about an ESG provider, etc. may be added, extended, or deleted.

Referring to FIG. 36, the XML syntax may include a BOOT_PLP_INFO tag and the BOOT_PLP_INFO tag may include a BOOTSTRAP_INFO tag and an ESG_PRE_INFO tag. The contents of each tag are identical to those of its counterpart illustrated in FIGS. 33, 34 and 35 and thus a detailed description of each tag is not provided herein. A PROVIDER_NAME tag included in the ESG_PRE_INFO tag is newly added and will be described below.

The PROVIDER_NAME tag indicates the name of an ESG provider. In FIG. 36, the ESG provider is shown as LG U+ myLGTV ESG in an embodiment of the present invention.

Referring to FIG. 36, the BOOTSTRAP_INFO tag and the ESG_PRE_INFO tag have the same PLP_ID, 0X01. Hence, it is noted from FIG. 36 that a bootstrap and an ESG are transmitted in the same PLP, PLP 1.

That is, the receiver may acquire the IP addresses of a bootstrap and an ESG from the XML syntax, receive and decode PLP 1 corresponding to the IP addresses of the bootstrap and the ESG, and acquire the bootstrap and the ESG from PLP 1.

Figure 37:
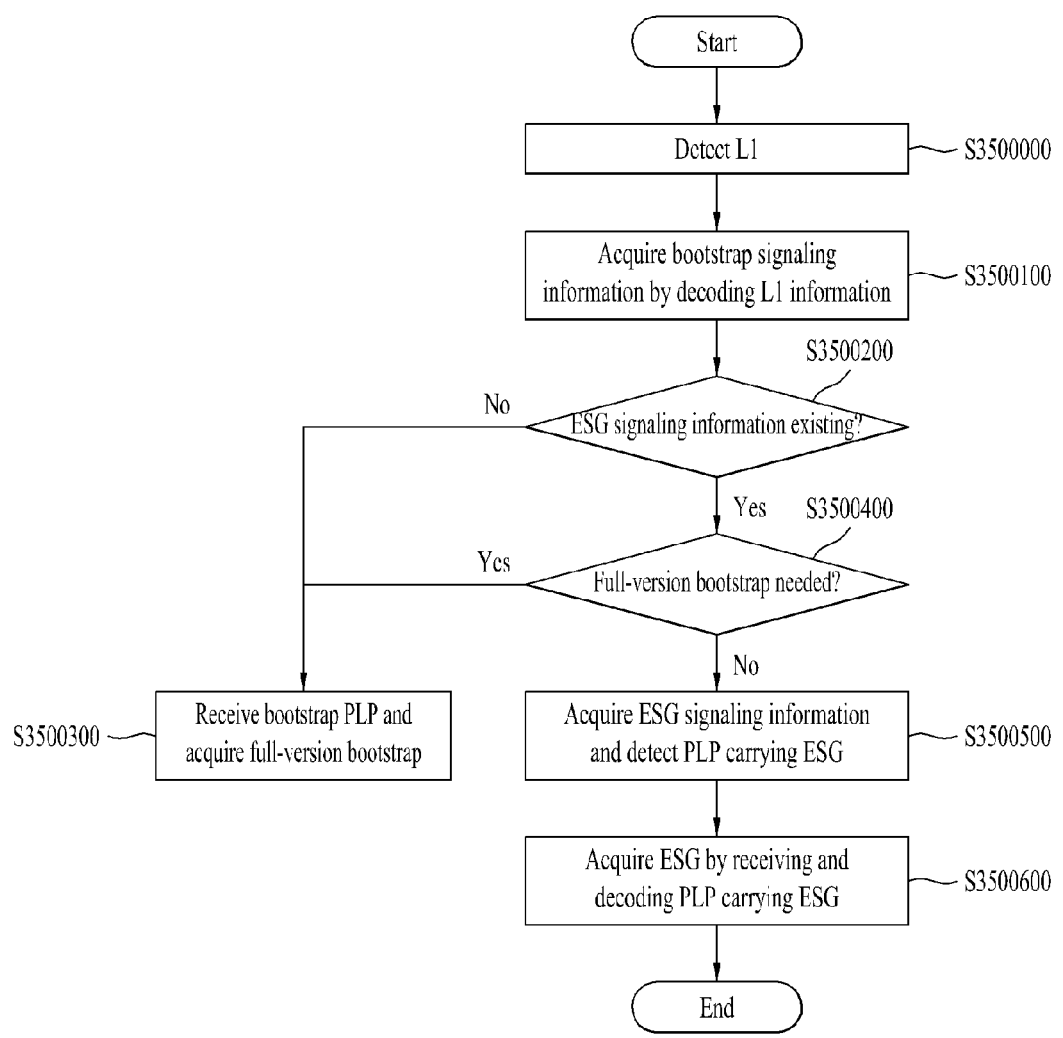
FIG. 37 illustrates a flowchart showing an operation for starting a service according to a first embodiment of the present invention.

FIG. 37 is a flowchart illustrating an operation for starting a service according to the first embodiment of the present invention.

The receiver may detect an L1 signaling information region by decoding a P1 signaling information region (S3500000). P1 signaling information transmitted in the P1 signaling information region is used to detect a signal frame and may include tuning information and information for identifying a preamble itself. The L1 signaling information region may reside at the end of the P1 signaling information region in the signal frame.

The receiver may decode L1 signaling information included in the detected L1 signaling information region and acquire bootstrap signaling information from the decoded L1 signaling information (S3500100).

As described before with reference to FIG. 33, bootstrap and ESG signaling information may be added to the syntax of the L1 signaling information region described with reference to FIG. 21. Depending on the designer's intention, the ESG signaling information may not be added and instead, it may be transmitted in a bootstrap.

Therefore, the receiver determines whether ESG signaling information is transmitted in the current L1 signaling information region, that is, ESG signaling information is present in the current L1 signaling information region (S3500200).

In the absence of ESG signaling information, the receiver may receive a bootstrap PLP using the bootstrap signaling information and acquire a full-version bootstrap (S3500300).

On the contrary, in the presence of ESG signaling information, the receiver may determine whether the full-version bootstrap information is needed (S3500400). It may occur that an ESG cannot be received due to lack of information included the current ESG signaling information. In this case, the receiver may need to receive the full-version bootstrap and use ESG signaling information included in the bootstrap.

If determining that the full-version bootstrap is needed, the receiver may return to step S3500300. Thus the receiver may receive a PLP carrying the bootstrap and acquire the bootstrap. Then the receiver may receive and decode a PLP carrying an ESG using the ESG signaling information included in the bootstrap, thereby acquiring the ESG (S3500600).

On the other hand, if determining that the full-version bootstrap is not needed, the receiver may acquire the ESG signaling information included in the L1 signaling information region and detect a PLP carrying an ESG using the ESG signaling information (S3500500). Specifically, the receiver may identify the PLP carrying the ESG using PLP_ID included in the ESG signaling information, as described before with reference to FIG. 33. Subsequently, the receiver may acquire the ESG by receiving and decoding the PLP carrying the ESG (S3500600).

Figure 38:
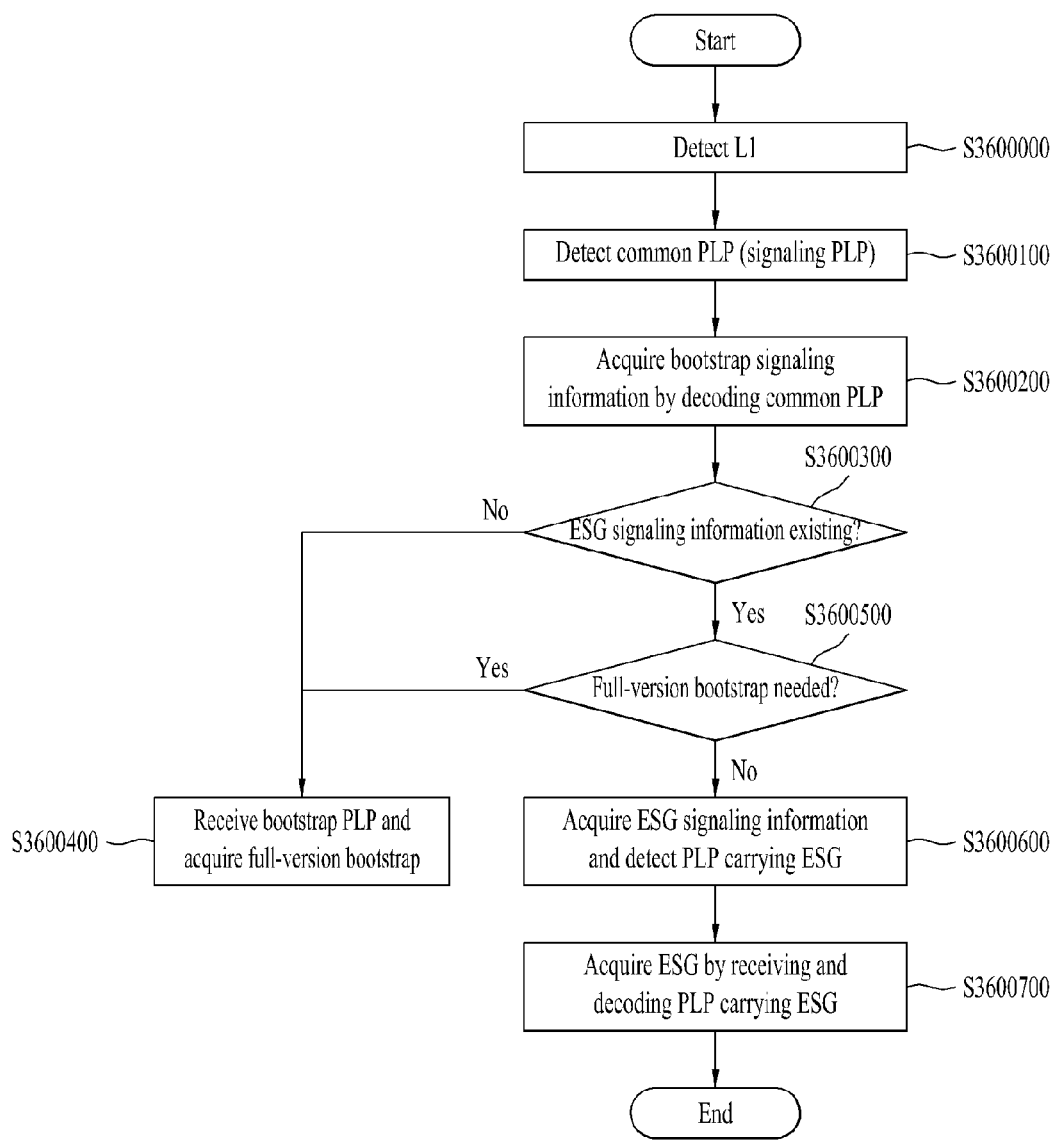
FIG. 38 illustrates a flowchart showing an operation for starting a service according to a second embodiment of the present invention.

FIG. 38 is a flowchart illustrating an operation for starting a service according to the second embodiment of the present invention.

The receiver may detect an L1 signaling information region by decoding a P1 signaling information region (S3600000). P1 signaling information transmitted in the P1 signaling information region is used to detect a signal frame and may include tuning information and information for identifying a preamble itself, as described before. The L1 signaling information region may reside at rear end of the P1 signaling information region in the signal frame.

The receiver may detect a common PLP using L1 signaling information included in the decoded L1 signaling information region (S3600100). The common PLP may reside at the end of the L1 signaling information region and may include L2 signaling information.

The receiver may decode the common PLP and acquire bootstrap signaling information (S3600200).

As described before, the common PLP may deliver bootstrap and ESG signaling information or only the bootstrap signaling information depending on the designer's intention according to the second embodiment of the present invention.

Therefore, the receiver determines whether ESG signaling information is transmitted in the current common PLP, that is, ESG signaling information is present in the current common PLP (S35004\300).

In the absence of ESG signaling information, the receiver may receive a bootstrap PLP using the bootstrap signaling information and acquire a full-version bootstrap (S3500400).

In the presence of ESG signaling information, the receiver may determine whether full-version bootstrap information is needed (S3500500). It may occur that an ESG cannot be received due to lack of information included the current ESG signaling information. In this case, the receiver may need to receive the full-version bootstrap and use ESG signaling information included in the bootstrap.

If determining that the full-version bootstrap is needed, the receiver may return to step S3500400. Thus the receiver may receive a PLP carrying the bootstrap and acquire the full-version bootstrap. Then the receiver may receive and decode a PLP carrying an ESG using the ESG signaling information included in the bootstrap, thereby acquiring the ESG (S3500700).

On the other hand, if determining that the full-version bootstrap is not needed, the receiver may acquire the ESG signaling information included in the L1 signaling information region and detect the PLP carrying the ESG using the ESG signaling information (S3500600). Specifically, the receiver may identify the PLP carrying the ESG using PLP_ID described before with reference to FIGS. 34, 35 and 36. Subsequently, the receiver may acquire the ESG by receiving and decoding the PLP carrying the ESG (S3500700).

Figure 39:
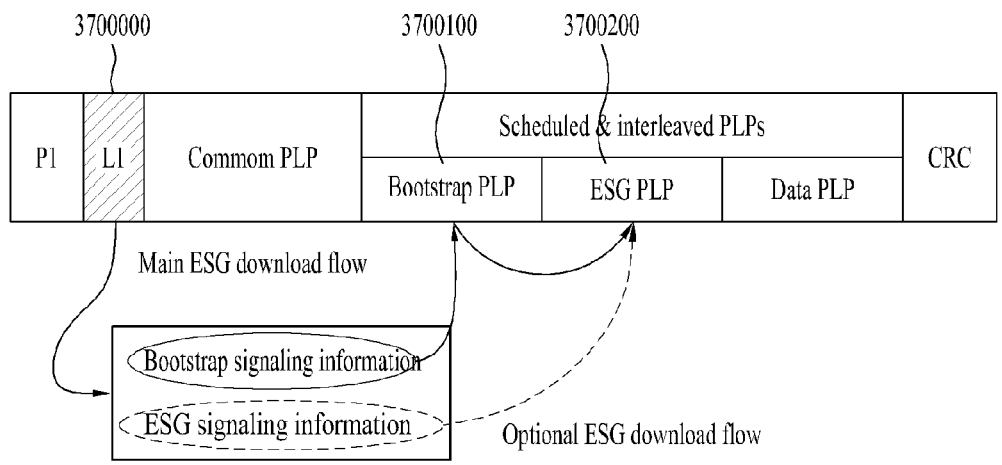
FIG. 39 illustrates a conceptual diagram showing a structure of a signal frame and an operation for receiving a bootstrap and an ESG according to a first embodiment of the present invention.

FIG. 39 is a conceptual view illustrating the structure of a signal frame and an operation for receiving a bootstrap and an ESG according to the first embodiment of the present invention.

In accordance with the first embodiment of the present invention, bootstrap signaling information and ESG signaling information may be transmitted together in an L1 signaling information region 3700000 of a signal frame. Depending on the designer's intention, only the bootstrap signaling information may be transmitted in the L1 signaling information region 3700000. A bootstrap may include the ESG signaling information.

In FIG. 39, a solid line denotes an operation of the receiver in the case where the ESG signaling information is not transmitted along with the bootstrap signaling information, and a broken line denotes an operation of the receiver in the case where the ESG signaling information is transmitted along with the bootstrap signaling information.

The operations of the receiver will be described respectively.

In the case where only the bootstrap signaling information such as bootstrap PLP information is transmitted in the L1 signaling information region 3700000, the receiver may decode the L1 signaling information region 3700000 and acquire the bootstrap PLP information. Subsequently, the receiver may acquire a bootstrap by receiving and decoding a PLP 3700100 carrying the bootstrap using the bootstrap PLP information. The receiver may receive a PLP 3700200 carrying an ESG using ESG signaling information included in the bootstrap and thus may acquire the ESG.

In the case where the bootstrap signaling information and the ESG signaling information are transmitted together in the L1 signaling information region 3700000, the receiver may acquire bootstrap PLP information and ESG PLP information by decoding the L1 signaling information region 3700000. Subsequently, the receiver may receive the bootstrap by receiving and decoding the PLP 3700100 carrying the bootstrap using the bootstrap PLP information. The receiver may also acquire the ESG by receiving and decoding the PLP 3700200 carrying the ESG using the ESG PLP information. As described before, the receiver may acquire the ESG by additionally using ESG signaling information included in the bootstrap.

Figure 40:
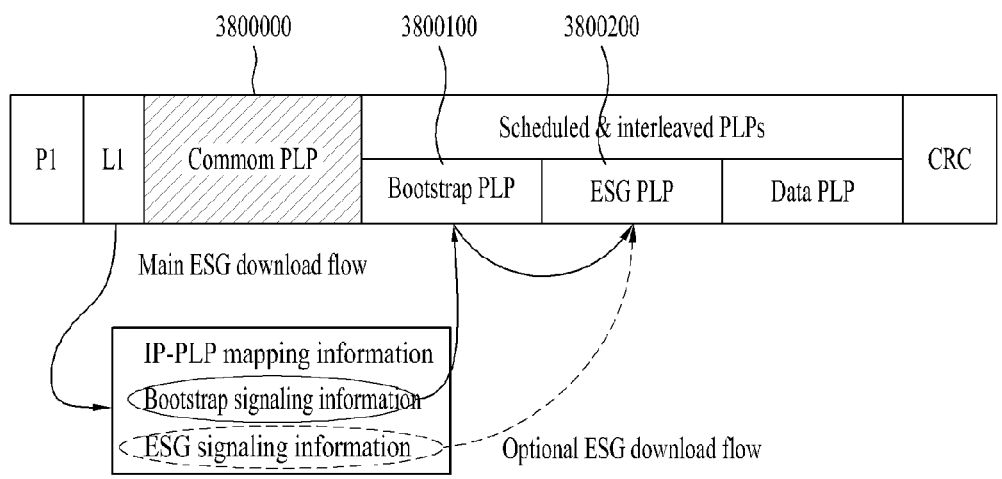
FIG. 40 illustrates a conceptual diagram showing a structure of a signal frame and an operation for receiving a bootstrap and an ESG according to a second embodiment of the present invention.

FIG. 40 is a conceptual view illustrating the structure of a signal frame and an operation for receiving a bootstrap and an ESG according to the second embodiment of the present invention.

In accordance with the second embodiment of the present invention, bootstrap signaling information and ESG signaling information may be transmitted together in a common PLP 3800000 of a signal frame. Depending on the designer's intention, only the bootstrap signaling information may be transmitted in the common PLP 3800000. A bootstrap may include the ESG signaling information.

In FIG. 40, a solid line denotes an operation of the receiver in the case where the ESG signaling information is not transmitted along with the bootstrap signaling information, and a broken line denotes an operation of the receiver in the case where the ESG signaling information is transmitted along with the bootstrap signaling information.

The operations of the receiver will be described respectively.

In the case where only the bootstrap signaling information is transmitted in the common PLP 3800000, the receiver may decode the common PLP 3800000 and acquire the bootstrap PLP information. Subsequently, the receiver may acquire a bootstrap by receiving and decoding a PLP 3800100 carrying the bootstrap using the bootstrap PLP information. The receiver may receive a PLP 3800200 carrying an ESG using ESG signaling information included in the bootstrap and thus acquire the ESG.

In the case where the bootstrap signaling information and the ESG signaling information are transmitted together in the common PLP 3800000, the receiver may acquire bootstrap PLP information and ESG PLP information by decoding the common PLP 3800000. Subsequently, the receiver may receive the bootstrap by receiving and decoding the PLP 3800100 carrying the bootstrap using the bootstrap PLP information. The receiver may also acquire the ESG by receiving and decoding the PLP 3800200 carrying the ESG using the ESG PLP information. As described fore, the receiver may acquire the ESG by additionally using ESG signaling information included in the bootstrap.

Figures 41, 42:
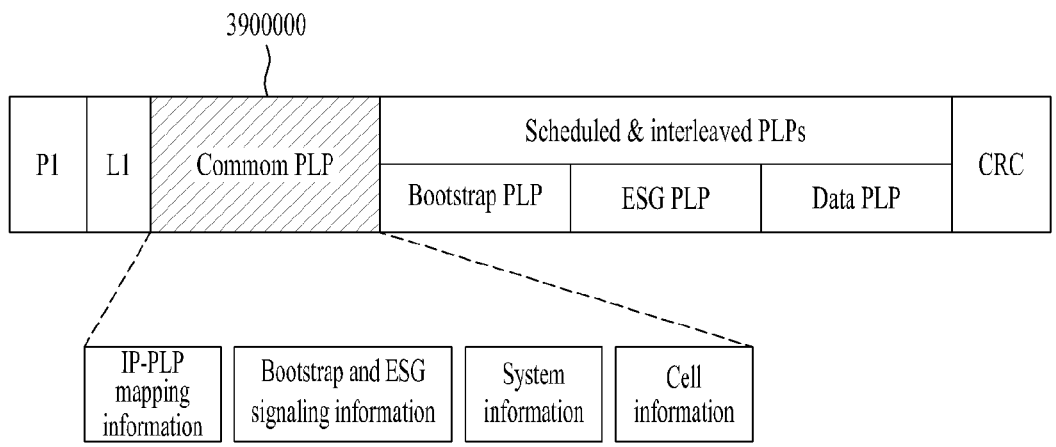
FIG. 41 illustrates a structure of a common PLP according to a second embodiment of the present invention.
FIG. 42 illustrates a syntax of system information according to an embodiment of the present invention.

FIG. 41 illustrates the structure of a common PLP according to the second embodiment of the present invention.

A common PLP 3900000 according to the present invention may include IP-PLP mapping information and bootstrap and ESG signaling information, as described before. In this case, the data format of system information and cell information may be determined according to the data format of the common PLP. That is, as described before, if the IP-PLP mapping information and the bootstrap and ESG signaling information are configured in one of the binary, PSI/SI and XML data format, they may be expressed according to the data format.

In the present invention, the IP-PLP mapping information, the system information, and the cell information may be referred to as L2 information.

FIG. 42 illustrates the syntax of system information according to an embodiment of the present invention.

System information included in a common PLP according to the embodiment of the present invention may include a SISO/MISO field, a BANDWIDTH field, a GUARD_INTERVAL field, and an FFT_SIZE field. The fields will be described below.

The SISO/MISO field is a 2-bit field indicating a SISO/MISO mode supported by each PLP. In an embodiment of the present invention, if the SISO/MISO field is 0X00, this indicates SISO/SIMO and if the SISO/MISO field is 0X01, this indicates MISO/MIMO.

The BANDWIDTH field is a 4-bit field that may indicate the bandwidth of a broadcast signal.

The GUARD_INTERVAL field is a 3-bit field identical to the GUARD_INTERVAL field described with reference to FIG. 16.

The FFT_SIZE field is a 3-bit field that may indicate an FFT size and a transmission mode.

Figures 43, 44:
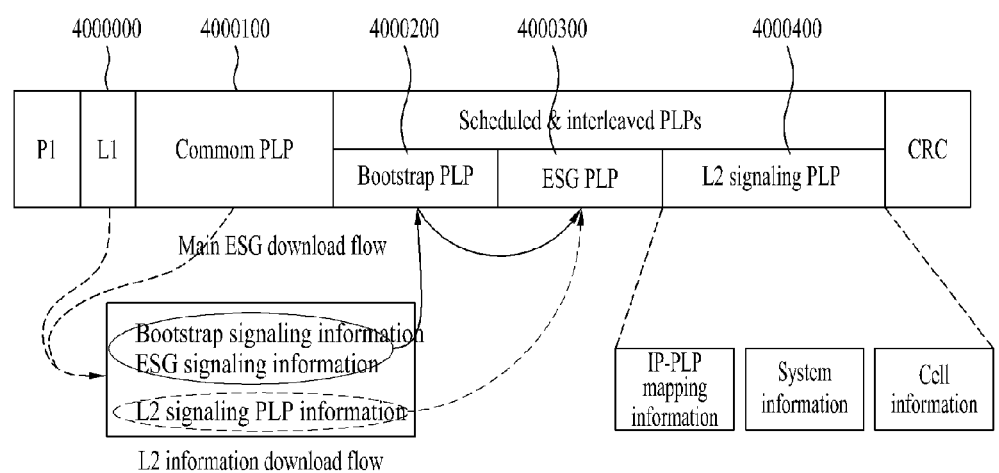
FIG. 43 illustrates a syntax of cell information according to an embodiment of the present invention.
FIG. 44 illustrates a conceptual diagram showing a structure of a signal frame and a method for signaling L2 signaling information according to an embodiment of the present invention.

FIG. 43 illustrates the syntax of cell information according to an embodiment of the present invention.

Cell information included in a common PLP according to the embodiment of the present invention may include a NUM_CELL field and a "for loop" for the NUM_CELL field.

NUM_CELL is a 16-bit field that may indicate the total number of cells to which a broadcast signal is transmitted.

The "for loop" for the NUM_CELL field is iterated as many times as the number of cells, including fields indicating corresponding information for each cell. Specifically, the "for loop" may include a CELL_ID field, a CENTRE_FREQUENCY field, a NUM_SUBCELL field, and a "for loop" for the NUM_SUBCELL field. These fields will be described below.

The CELL_ID field is an 8-bit field that may indicate a unique cell defining a broadcast signal transmission zone.

The CENTRE_FREQUENCY field may indicate the reception frequency of each cell.

The NUM_SUBCELL field is an 8-bit field that may indicate the number of subcells included in each cell.

The "for loop" for the NUM_SUBCELL field is iterated as many times as the number of subcells, including fields indicating corresponding information for each subcell. Specifically, the "for loop" for the NUM_SUBCELL field may include a CELL_ID_EXTENSION field and a TRANSPOSER_FREQUENCY field. These fields will be described.

The CELL_ID_EXTENSION field may identify each subcell.

The TRANSPOSER_FREQUENCY field indicates a transposer frequency used in a subcell.

As described above, while the IP-PLP mapping information, the system information, and the cell information, that is, the L2 information may be transmitted in the common PLP, it may be transmitted in PLP data depending on the designer's intention. In this case, the receiver needs signaling information about the L2 information in order to receive a PLP carrying the L2 information. In the present invention, the signaling information about the L2 information may be referred to as L2 signaling information.

In an embodiment of the present invention, a bootstrap and L2 information may be transmitted in the same PLP depending on the designer's intention. This PLP may be referred to as a dedicated PLP.

Now a description will be given of a method for signaling L2 signaling information. The method for signaling L2 signaling information is applicable to both of the first and second embodiments of the present invention.

FIG. 44 is a conceptual diagram illustrating the structure of a signal frame and a method for signaling L2 signaling information according to an embodiment of the present invention.

Referring to FIG. 44, L2 signaling information may be transmitted together with bootstrap and ESG signaling information in an L1 signaling information region 4000000 or a common PLP 4000100.

If the L2 signaling information and the bootstrap and ESG signaling information are transmitted together in the L1 signaling information region 4000000, the receiver may acquire the bootstrap and ESG signaling information and the L2 signaling information by receiving and decoding the L1 signaling information region 4000000.

Subsequently, the receiver may acquire a bootstrap by receiving and decoding a PLP 4000200 carrying the bootstrap using the bootstrap signaling information. In addition, the receiver may acquire an ESG by receiving and decoding a PLP 4000300 carrying the ESG using the ESG signaling information. As described before, the receiver may acquire the ESG using ESG signaling information included in the bootstrap depending on the designer's intention.

The receiver may acquire the L2 information by receiving and decoding a PLP 4000400 carrying the L2 information using the L2 signaling information. In this case, the L2 information is configured in the form of a file and may be received by a file delivery protocol such as FLUTE, etc.

If the L2 signaling information and the bootstrap and ESG signaling information are transmitted together in a common PLP 4000100, the receiver may receive the common PLP 4000100 by receiving and decoding the L1 signaling information region 4000000 and may acquire the bootstrap and ESG signaling information and the L2 signaling information by receiving and decoding the common PLP 4000100.

Subsequently, the receiver may acquire the bootstrap by receiving and decoding the PLP 4000200 carrying the bootstrap using the bootstrap signaling information. In addition, the receiver may acquire the ESG by receiving and decoding the PLP 4000300 carrying the ESG using the ESG signaling information. As described before, the receiver may acquire the ESG using ESG signaling information included in the bootstrap depending on the designer's intention.

The receiver may acquire the L2 information by receiving and decoding the PLP 4000400 carrying the L2 information using the L2 signaling information. In this case, the L2 information is configured in the form of a file and may be received by a file delivery protocol such as FLUTE, etc.

FIG. 45 illustrates the syntax of L2 signaling information according to an embodiment of the present invention.

Referring to FIG. 45, the L2 signaling information may be added to the syntaxes of bootstrap and ESG signaling information according to the first and second embodiments of the present invention. The L2 signaling information may include an L2_IP_ADDRESS field, an L2_PORT_NUMBER field, an L2_SESSION_ID field, and an L2 PLP field. Fields other than the L2 signaling information illustrated in FIG. 41 are identical to the fields described with reference to FIG. 33 and thus a detailed description of the other fields will not be provided herein. The fields of the L2 signaling information will be described below.

The L2_IP_ADDRESS field is a 32-bit or 48-bit field that may indicate the IP address of the L2 information.

The L2_PORT_NUMBER field is a 16-bit field that may indicate the port number of the L2 information.

The L2_SESSION_ID field is a 16-bit field that may identify the session of the L2 information.

The L2_PLP field is an 8-bit field that may identify a PLP carrying the L2 information.

Therefore, the receiver may identify a PLP carrying the L2 information from the L2 PLP field and may receive the L2 information using the L2_IP_ADDRESS field, the L2_PORT_NUMBER field, and the L2_SESSION_ID field.

Figure 46:
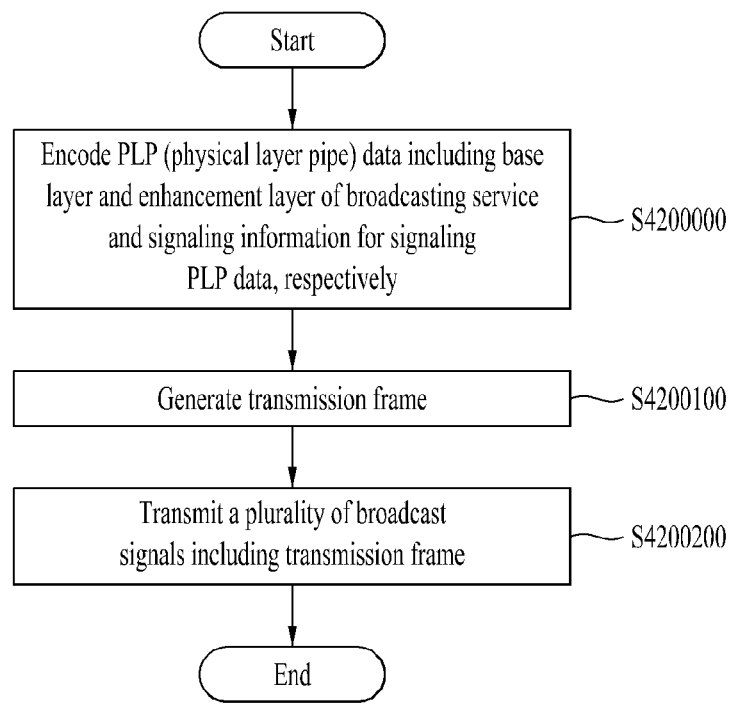
FIG. 46 illustrates a flowchart showing a method for transmitting a broadcast signal according to an embodiment of the present invention.

FIG. 46 is a flowchart illustrating a method for transmitting a broadcast signal according to an embodiment of the present invention.

As described before with reference to FIG. 6, the BICM module 100200 according to the embodiment of the present invention may encode PLP data including a base layer and an enhancement layer of a broadcast service and signaling information for signaling the PLP data, respectively (S4200000).

The frame builder 100300 may generate a transmission frame (S4200100). As described before, the transmission frame may include a preamble and a plurality of PLPs. The preamble may include a P1 signaling information region and an L1 signaling information region. The preamble may or may not include a common PLP, depending on the designer's intention. The plurality of PLPs may correspond to the afore-described data region.

In accordance with the first embodiment of the present invention, bootstrap and ESG signaling information may be transmitted in the L1 signaling information region, whereas in accordance with the second embodiment of the present invention, bootstrap and ESG signaling information may be transmitted in the common PLP. In the second embodiment, the bootstrap and ESG signaling information may be configured in one of the binary data format, the PST/SI data format, and the XML data form a depending on the designer's intention.

As described before, a bootstrap and an ESG may be transmitted in at least one of the plurality of PLPs included in the data region. Therefore, the bootstrap and ESG signaling information may include identification information for identifying PLPs carrying the bootstrap and the ESG, that is, PLP_IDs, as described with reference to FIGS. 33 to 36. The bootstrap signaling information and the ESG signaling information or only the bootstrap signaling information may be transmitted together in the L1 signaling information or the common PLP. In the latter case, the receiver may acquire the ESG signaling information by receiving the bootstrap, which may depend on the designer's intention.

When the bootstrap and ESG signaling information is transmitted in the common PLP according to the second embodiment of the present invention, the common PLP may also deliver L2 information such as IP-PLP mapping information, system information, and cell information. Or the L2 information may be transmitted in a PLP of the data region. In this case, L2 signaling information for signaling the L2 information may be transmitted along with the bootstrap and ESG signaling information as described with reference to FIGS. 44 and 45.

Then the OFDM generator 100400 may transmit a plurality of broadcast signals including the generated transmission frame (S4200200).

Figure 47:
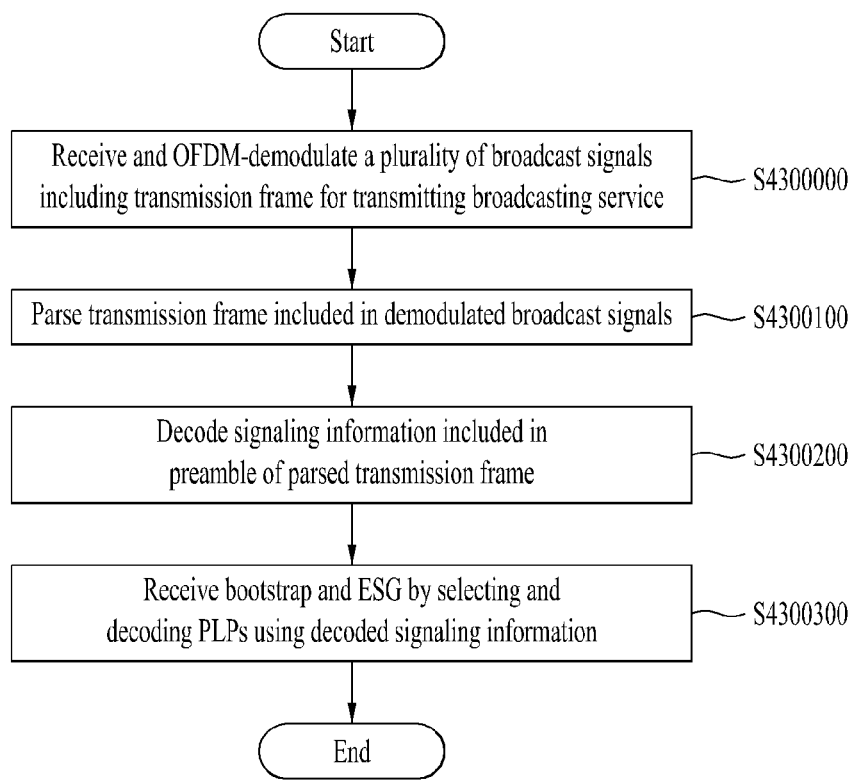
FIG. 47 illustrates a flowchart showing a method for receiving a broadcast signal according to an embodiment of the present invention.

FIG. 47 is a flowchart illustrating a method for receiving a broadcast signal according to an embodiment of the present invention.

As described before, the OFDM demodulator 138100 according to the embodiment of the present invention may receive a plurality of broadcast signals including a transmission frame for providing a broadcast service and may OFDM-demodulate the broadcast signals (S4300000).

The frame demapper 138200 according to the embodiment of the present invention may parse the transmission frame included in the demodulated broadcast signals (S4300100). As described before, the transmission frame may include a preamble and a plurality of PLPs. The preamble may include a P1 signaling information region and an L1 signaling information region. The preamble may or may not include a common PLP, depending on the designer's intention. The plurality of PLPs may correspond to the afore-described data region.

Then the first decoder 612300 may decode the signaling information included in the preamble of the parsed transmission frame (S4300200).

In accordance with the first embodiment of the present invention, bootstrap and ESG signaling information may be transmitted in the L1 signaling information region, whereas in accordance with the second embodiment of the present invention, bootstrap and ESG signaling information may be transmitted in the common PLP. In the second embodiment, the bootstrap and ESG signaling information may be configured in one of the binary data format, the PST/SI data format, and the XML data form a depending on the designer's intention.

As described before, a bootstrap and an ESG may be transmitted in at least one of the plurality of PLPs included in the data region. Therefore, the bootstrap and ESG signaling information may include identification information for identifying PLPs carrying the bootstrap and the ESG, that is, PLP_IDs, as described with reference to FIGS. 33 to 36.

The bootstrap signaling information and the ESG signaling information or only the bootstrap signaling information may be transmitted together in the L1 signaling information or the common PLP. In the latter case, the receiver may acquire the ESG signaling information by receiving the bootstrap, which may depend on the designer's intention.

When the bootstrap and ESG signaling information is transmitted in the common PLP according to the second embodiment of the present invention, the common PLP may also deliver L2 information such as IP-PLP mapping information, system information, and cell information. Or the L2 information may be transmitted in a PLP of the data region. In this case, L2 signaling information for signaling the L2 information may be transmitted along with the bootstrap and ESG signaling information as described with reference to FIGS. 44 and 45.

Then the second decoders 612100 and 612200 may receive a bootstrap and an ESG by selecting and decoding PLPs using the decoded signaling information (S4300300).

In accordance with the first embodiment of the present invention as described above, the receiver may identify PLPs carrying a bootstrap and an ESG using a PLP_BOOT field and a PLP_ID field described before with reference to FIG. 29. In accordance with the second embodiment of the present invention as described above, the receiver may identify PLPs carrying a bootstrap and an ESG using a PLP_BOOT field (or a bootstrap_PLP field) and a PLP_ID field described before with reference to FIGS. 34, 35 and 36. Then the receiver may receive the bootstrap and the ESG by decoding the respective PLPs.

The description of the present invention will not be limited only to the above-described exemplary embodiments of the present invention. And, as it is shown in the appended claims of the present invention, it will be apparent to those skilled in the art that various modifications and variations can be made in the present invention, and that such modifications and variations cover the scope of the present invention.

MODE FOR CARRYING OUT THE PRESENT INVENTION

As described above, the present invention is described with respect to the best mode for carrying out the present invention.

INDUSTRIAL APPLICABILITY

As described above, the present invention may be fully (or entirely) or partially applied to digital broadcast systems.

What is claimed is:
1. A method of processing broadcast data in a transmitter, the method comprising:
Forward Error Correction (FEC) encoding Physical Layer Pipe (PLP) data of Physical Layer Pipes (PLPs);
FEC encoding first signaling data;
FEC encoding second signaling data;
time interleaving the FEC-encoded PLP data;
frequency interleaving the time-interleaved PLP data; and
modulating the frequency-interleaved PLP data, the FEC-encoded first signaling data, and the FEC-encoded second signaling data by an Orthogonal Frequency Division Multiplexing (OFDM) method,
wherein the first signaling data include FEC type information of the second signaling data and wherein the second signaling data include FEC type information of the PLP data, wherein the second signaling data further includes Multi-Input Multi-Output (MIMO) information and modulation information for PLPs,
wherein the modulation information represents a spectrum efficiency for two antennas when the MIMO information represents the MIMO processing is applied to the PLP data, and
wherein a specific PLP among the PLPs includes bootstrap information and Electronic Service Guide (ESG) signaling information,
wherein mapping information between the PLPs and IP address/ports is further included in the specific PLP, and
wherein the second signaling data further includes information indicating whether a PLP is the specific PLP including the bootstrap information, the ESG signaling information and the mapping information.
2. The method of claim 1, further comprising:
MIMO processing the FEC-encoded PLP data.
3. A transmitter for processing broadcast data, the transmitter comprising:
a first encoder for Forward Error Correction (FEC) encoding Physical Layer Pipe (PLP) data of Physical Layer Pipes (PLPs);
a second encoder for FEC encoding first signaling data;
a third encoder for FEC encoding second signaling data;

a time interleaver for time interleaving the FEC-encoded PLP data;

a frequency interleaver for frequency interleaving the time-interleaved PLP data; and a modulator for modulating the frequency-interleaved PLP data, the FEC-encoded first signaling data, and the FEC-encoded second signaling data by an Orthogonal Frequency Division Multiplexing (OFDM) method, wherein the first signaling data include FEC type information of the second signaling data and wherein the second signaling data include FEC type information of the PLP data, wherein the second signaling data further includes Multi-Input Multi-Output (MIMO) information and modulation information for PLPs, and wherein the modulation information represents a spectrum efficiency for two antennas when the MIMO information represents the MIMO processing is applied to the PLP data, and wherein a specific PLP among the PLPs includes bootstrap information and Electronic Service Guide (ESG) signaling information, wherein mapping information between the PLPs and IP address/ports is further included in the specific PLP, and wherein the second signaling data further includes information indicating whether a PLP is the specific PLP including the bootstrap information, the ESG signaling information and the mapping information.

4. The transmitter of claim 3, further comprising:

a fourth encoder for MIMO processing the FEC-encoded PLP data.

* * * * *